United States Patent
Mancini et al.

(10) Patent No.: US 11,807,067 B2
(45) Date of Patent: Nov. 7, 2023

(54) OPTIMAL SOURCE ELECTRIC VEHICLE HEAT PUMP WITH EXTREME TEMPERATURE HEATING CAPABILITY AND EFFICIENT THERMAL PRECONDITIONING

(71) Applicant: Tesla, Inc., Austin, TX (US)

(72) Inventors: Nicholas Mancini, San Jose, CA (US); Joseph Stratford Maxwell Mardall, San Francisco, CA (US); Jan Kopitz, Fremont, CA (US); Curt Raymond O'Donnell, Erie, PA (US); Daniel F. Hanks, Palo Alto, CA (US); Huize Li, Stanford, CA (US)

(73) Assignee: Tesla, Inc., Austin, TX (US)

( * ) Notice: Subject to any disclaimer, the term of this patent is extended or adjusted under 35 U.S.C. 154(b) by 198 days.

(21) Appl. No.: 17/249,954

(22) Filed: Mar. 19, 2021

(65) Prior Publication Data

US 2021/0331554 A1 Oct. 28, 2021

Related U.S. Application Data

(63) Continuation of application No. 16/124,285, filed on Sep. 7, 2018, now Pat. No. 10,967,702.

(51) Int. Cl.
*B60H 1/00* (2006.01)
*B60H 1/22* (2006.01)
(Continued)

(52) U.S. Cl.
CPC ..... *B60H 1/00278* (2013.01); *B60H 1/00564* (2013.01); *B60H 1/00907* (2013.01);
(Continued)

(58) Field of Classification Search
CPC ............ B60H 1/00278; B60H 1/00564; B60H 1/00907; B60H 1/00921; B60H 1/22;
(Continued)

(56) References Cited

U.S. PATENT DOCUMENTS 3,629,627 A 12/1971 Dafler
4,246,761 A * 1/1981 Phillips ................... F25B 30/04
62/232

(Continued)

FOREIGN PATENT DOCUMENTS

| CN | 204906069 U | 12/2015 |
| CN | 108180212 | 6/2018 |
| JP | 2007-300800 | 11/2007 |

OTHER PUBLICATIONS

Leighton, Daniel. "Combined Fluid Loop Thermal Management for Electric Drive Vehicle Range Improvement"; Published Apr. 14, 2015. SAE 2015 World Congress & Exhibition. (see attached PDF version) (Year: 2015).*

*Primary Examiner* — Michael V Kerrigan
(74) *Attorney, Agent, or Firm* — Knobbe, Martens, Olson & Bear, LLP

(57) ABSTRACT

A vehicle thermal management system includes a vehicle heat pump system, a battery system coolant loop, a drive train coolant loop, and control electronics. The vehicle heat pump system includes a compressor, a cabin condenser, a cabin evaporator, a cabin blower, and a chiller. The battery system coolant loop is in thermal communication with a battery system and with the chiller and selectively in thermal communication with the drive train coolant loop. The control electronics control the components of the vehicle thermal management system to heat the cabin, cool the cabin, heat the battery system, cool the battery system, and cool the drive train. The control electronics may control the compressor to operate in an efficient mode or a lossy mode in (Continued)

which the compressor generates heat. The control electronics may also control the components of the vehicle thermal management system to precondition the battery.

20 Claims, 36 Drawing Sheets

Related U.S. Application Data

(60) Provisional application No. 62/639,915, filed on Mar. 7, 2018, provisional application No. 62/555,325, filed on Sep. 7, 2017.

(51) Int. Cl.
  *B60H 1/26* (2006.01)
  *B60L 58/26* (2019.01)
  *B60H 1/32* (2006.01)
  *B60H 1/14* (2006.01)

(52) U.S. Cl.
  CPC .......... *B60H 1/00921* (2013.01); *B60H 1/22* (2013.01); *B60H 1/26* (2013.01); *B60H 1/32281* (2019.05); *B60L 58/26* (2019.02); *B60H 1/00392* (2013.01); *B60H 1/143* (2013.01); *B60H 1/3213* (2013.01); *B60H 2001/00307* (2013.01); *B60H 2001/00928* (2013.01); *B60H 2001/00949* (2013.01); *B60H 2001/2246* (2013.01); *B60H 2001/327* (2013.01)

(58) Field of Classification Search
  CPC .. B60H 1/26; B60H 1/32281; B60H 1/00392; B60H 1/143; B60H 1/3213; B60H 2001/00307; B60H 2001/00928; B60H 2001/00949; B60H 2001/2246; B60H 2001/327; B60L 58/26; Y02T 10/70
  See application file for complete search history.

(56) References Cited

U.S. PATENT DOCUMENTS

| | | | |
|---|---|---|---|
| 6,191,511 B1 | 2/2001 | Zysset | |
| 6,329,731 B1 | 12/2001 | Arbanas | |
| 6,360,835 B1 | 3/2002 | Skala | |
| 6,394,207 B1 | 5/2002 | Skala | |
| 7,156,195 B2 | 1/2007 | Yamagishi | |
| 7,789,176 B2 | 9/2010 | Zhou | |
| 8,232,319 B2 | 1/2012 | Kohno | |
| 8,448,696 B2 | 5/2013 | Johnston | |
| 8,970,075 B2 | 3/2015 | Rippel | |
| 9,306,433 B2 | 4/2016 | Sten | |
| 10,128,705 B2 | 11/2018 | Yang | |
| 10,587,162 B2 | 3/2020 | Yang et al. | |
| 10,967,702 B2 | 4/2021 | Mancini | |
| 2002/0190598 A1 | 12/2002 | Bartman | |
| 2003/0057783 A1 | 3/2003 | Melfi | |
| 2005/0156471 A1 | 7/2005 | Kobayashi | |
| 2006/0169790 A1* | 8/2006 | Caesar | B60H 1/00785 237/12 |
| 2010/0001602 A1 | 1/2010 | Bossaller et al. | |
| 2010/0127585 A1 | 5/2010 | Fee et al. | |
| 2010/0320850 A1 | 12/2010 | Lemmers, Jr. et al. | |
| 2011/0309697 A1 | 12/2011 | Kirkley, Jr. et al. | |
| 2011/0309698 A1 | 12/2011 | Kirkley, Jr. et al. | |
| 2012/0104884 A1 | 5/2012 | Wagner et al. | |
| 2012/0153718 A1 | 6/2012 | Rawlinson et al. | |
| 2012/0299404 A1 | 11/2012 | Yamamoto et al. | |
| 2013/0038182 A1 | 2/2013 | Obata | |
| 2013/0071057 A1 | 3/2013 | Fischer et al. | |
| 2016/0023532 A1 | 1/2016 | Gauthier | |
| 2016/0099633 A1 | 4/2016 | Yoshinori et al. | |
| 2016/0209099 A1 | 7/2016 | Liu | |
| 2018/0072181 A1* | 3/2018 | Christen | H01M 10/625 |
| 2018/0083515 A1 | 3/2018 | Graves et al. | |
| 2019/0118610 A1 | 4/2019 | Johnston | |
| 2020/0350796 A1 | 11/2020 | Yang | |

* cited by examiner

OPTIMAL SOURCE ELECTRIC VEHICLE HEAT PUMP WITH EXTREME TEMPERATURE HEATING CAPABILITY AND EFFICIENT THERMAL PRECONDITIONING

CROSS-REFERENCES TO RELATED APPLICATIONS

The present U.S. Utility patent application claims priority to, and is a continuation of, U.S. patent application Ser. No. 16/124,285, which claims priority pursuant to 35 U.S.C. § 119(e) to U.S. Provisional Application No. 62/555,325, entitled "VEHICLE CABIN HEAT PUMP SYSTEM", filed Sep. 7, 2017, and to U.S. Provisional Application No. 62/639,915, entitled "VEHICLE THERMAL MANAGEMENT SYSTEM", filed Mar. 7, 2018, each of which are hereby incorporated herein by reference in their entirety and made part of the present U.S. Utility patent application for all purposes.

BACKGROUND

Technical Field

The present invention relates to electric vehicles; and more particularly to the heating and cooling of vehicle components, including the cabin of an electric vehicle.

Description of Related Art

An extremely large percentage of the world's vehicles run on gasoline using an internal combustion engine. The use of such vehicles, more specifically the use of vehicles which rely on fossil fuels, i.e., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. One of the principal issues involved in designing an efficient electric drive train as well as a vehicle that is "user friendly" is thermal management, primarily due to the required configured conditions of the battery system cells and the need to provide on-demand heating and cooling within the passenger cabin. As a result, the thermal management systems used in many electric and hybrid vehicles have limited capabilities and/or are overly complex. For example, early generation electric vehicles used multiple independent thermal management subsystems. Such an approach was inherently inefficient as each subsystem required its own components (e.g., pumps, valves, refrigerant systems, etc.).

To overcome some of the problems associated with the use of independent thermal subsystems, U.S. Pat. No. 6,360, 835 and related U.S. Pat. No. 6,394,207 disclose a thermal management system utilizing multiple heat transfer circuits which share the same heat transfer medium. The heat transfer circuits are in fluid communication with one another, thus allowing hot heat transfer medium to flow from the high temperature circuit into the low temperature circuit, and cooler heat transfer medium to flow from the low temperature circuit into the high temperature circuit. Although this system appears to overcome some of the limitations of the prior systems, it is still relatively complex due to the interaction of the two heat transfer circuits.

In alternate thermal control systems disclosed in U.S. Pat. Nos. 7,789,176 and 7,841,431, efficient cooling systems are disclosed that utilize multiple cooling loops and a single heat exchanger. The cooling loops in at least one disclosed embodiment include a cooling loop associated with the battery system, a cooling loop associated with the HVAC system, and a cooling loop associated with the drive system (e.g., motor). U.S. Pat. Nos. 8,232,319 and 8,448,696 describe other efficient cooling systems that utilize multiple cooling loops and a single heat exchanger.

These prior art thermal control systems were focused on the cooling of a passenger compartment but not on the heating of the passenger compartment. In prior electric vehicles, electric heaters were used to heat the passenger compartment, which heaters consumed relatively large amounts of energy from the servicing batteries, which could significantly reduce range. An attractive alternative to passenger compartment heating and cooling would be the use of a vehicle heat pump system that is capable of both heating and cooling. However, conventional vehicle heat pump systems suffer from low heating capacity in extremely cold ambient conditions, e.g., minus 10 degrees Celsius and are not suitable for colder environments.

SUMMARY

In order to overcome the above-described shortcomings, among other shortcomings, a first embodiment of the present disclosure is directed towards a vehicle thermal management system that includes a vehicle heat pump system, a battery system coolant loop, a drive train coolant loop, a coolant circulation system, and control electronics. The vehicle heat pump system includes a compressor, a cabin condenser, a cabin evaporator, a cabin blower, and a chiller. The battery system coolant loop is in thermal communication with a battery system. The drive train coolant loop is in thermal communication with at least one drive train component. The coolant circulation system is configured to selectively cause the battery system coolant loop and the drive train coolant loop to be in thermal communication with the chiller. The control electronics are configured to, based upon at least an ambient temperature, a cabin temperature and a battery system temperature, control the coolant circulation system, and control at least one of the compressor or the cabin blower to operate in one of an efficient mode and a lossy mode, wherein in the lossy mode the compressor generates a greater amount of heat than when in the efficient mode.

The first embodiment of the present disclosure provides important benefits as compared to the prior systems. By having a compressor and/or cabin blower that may operate in a lossy mode, heat is generated for the cabin by the compressor and/or cabin blower without the need of inefficient high-voltage cabin heaters, which reduces cost. Further, the compressor and/or the cabin blower may be operated across a range of efficient and inefficient operations based upon ambient temperature, battery system temperature, drive train component temperatures, and cabin temperature. As compared to prior heat pump systems, which were ineffective in very low ambient temperatures, the first embodiment supports more efficient heating of the cabin in very low ambient temperatures.

The first embodiment (and subsequently described embodiments) include aspects, which may be included singularly or in any various combination to enhance operations. According to a first aspect of the first embodiment, the coolant circulation system is configured to, in a first mode, cause the battery system coolant loop to operate in parallel with the drive train coolant loop, in a second mode, cause the battery system coolant loop to operate in series with the drive train coolant loop, and in a third mode, cause the battery system coolant loop to be partially in parallel and partially in series with the drive train coolant loop. This first aspect of the first embodiment provides the important benefit of using heat stored in the battery and/or generated by the drive train to assist in heating the cabin. Further, this first aspect also supports using the vehicle heat pump system to provide heat and/or to remove heat to/from the battery.

According to a second aspect of the first embodiment, the lossy mode includes a plurality of sub-lossy modes of differing loss characteristics producing differing respective amounts of heat. This second aspect provides the important benefit of gradation of usage of the lossy mode to generate heat within the vehicle heat pump system.

According to a third aspect of the first embodiment, the drive train coolant loop includes a motor oil cooling loop in thermal communication with a traction motor and a transmission and an oil heat exchanger configured to exchange heat between the motor oil cooling loop and the drive train coolant loop. This third aspect of the first embodiment supports collecting heat from the traction motor to assist in cabin and/or battery heating.

According to a fourth aspect of the first embodiment, in controlling the at least one of the compressor and the cabin blower to operate in one of an efficient mode and a lossy mode, the control electronics considers at least one of vehicle range, battery performance, and cabin temperature. Thus, with this fourth aspect of the first embodiment, the overall efficiency of the vehicle heat pump system may be adjusted based upon heating needs and ambient temperature.

According to a fifth aspect of the first embodiment, the vehicle heat pump system further includes a cabin HVAC case that contains the cabin evaporator and the cabin condenser. The cabin HVAC case may be configured to operate in an air recirculation mode to recirculate air within the cabin or a fresh air mode that communicates air between the cabin and the ambient or a combination of these modes. The particular operation may be selected based upon ambient temperature, cabin temperature, and/or cabin humidity levels.

According to a sixth aspect of the first embodiment, the cabin evaporator and the cabin condenser may be configured in at least one heating mode to operate concurrently. By operating in this heating mode, the vehicle heat pump system is in a positive feedback operation to accelerate cabin heating.

The first through sixth aspects of the first embodiment may be combined to accelerate cabin heating, to manage battery temperature, and to otherwise increase the efficiency and quality of operation of the vehicle thermal management system.

A second embodiment of the present disclosure is directed to a vehicle thermal management system that includes a vehicle heat pump system and control electronics. The vehicle heat pump system includes a compressor, a cabin condenser, a cabin evaporator, a cabin blower, and a chiller. The control electronics are configured to, based upon at least an ambient temperature and a cabin temperature, control the compressor to operate, during a first time interval, in an efficient mode, and during a second time interval, in a lossy mode in which the compressor generates a greater amount of heat than when in the efficient mode. The second embodiment provides same/similar important benefits as were described previously herein with reference to the first embodiment.

The second embodiment also includes various aspects that may be included singularly or in combination. According to a first aspect of the second embodiment, in controlling the compressor to operate in one of the efficient mode and the lossy mode, the control electronics considers at least one of vehicle range, battery performance, and cabin temperature. According to a second aspect of the second embodiment, the lossy mode includes a plurality of sub-lossy modes of differing loss characteristics producing differing respective amounts of heat. According to a third aspect of the second embodiment, the control electronics are further configured to, based upon at least an ambient temperature and a cabin temperature, control the cabin blower to operate, during a first time interval, in an efficient mode, and, during a second time interval, in a lossy mode in which the cabin blower generates a greater amount of heat than when in the efficient mode.

According to a fourth aspect of the second embodiment, the lossy mode includes a plurality of sub-lossy modes of differing loss characteristics producing respective amounts of heat. According to a fifth aspect of the second embodiment, the vehicle heat pump system further includes a cabin HVAC case that contains the cabin evaporator and the cabin condenser, the cabin HVAC case configured to operate in an air recirculation mode to recirculate air within the cabin and in a fresh air mode that communicates air between the cabin and the ambient. According to a sixth aspect of the second embodiment, the cabin evaporator and the cabin condenser are configured in at least one heating mode to operate concurrently. According to a seventh aspect of the second embodiment, the vehicle heat pump system further includes at least one inverter to drive at least one of the compressor and the cabin blower and the control electronics are further configured to control the at least one inverter to operate, during the first time interval, in an efficient mode, and during the second time interval, in a lossy mode to generate a greater amount of heat than when in the efficient mode.

The first through seventh aspects of the second embodiment provide important benefits same/similar to the benefits described above with reference to the aspects of the first embodiment. The first through seventh aspects of the second embodiment may be applied singularly or applied in any combination available.

A third embodiment of the present disclosure is directed to a vehicle thermal management system that includes a vehicle heat pump system, a battery system coolant loop, and control electronics. The vehicle heat pump system includes a compressor, a cabin condenser, a cabin evaporator, a cabin blower, and a chiller. The battery system coolant loop is in thermal communication with a battery system and with the chiller. The control electronics are configured to, based upon at least an ambient temperature, a cabin temperature and a battery system temperature operate in a first operational mode and in a second operational mode. In the first operational mode, the control electronics operate the compressor in an efficient mode to transfer heat from an ambient source to the battery system. In the second operational mode, the control electronics operate the compressor in a lossy mode to generate heat and to transfer the generated heat to the battery system. Benefits provided According to a first aspect of the third embodiment, in controlling the compressor to operate in one of the efficient mode and the lossy mode, the control electronics considers at least one of vehicle range, battery performance, and cabin temperature. According to a second aspect of the third embodiment, the lossy mode includes a plurality of sub-lossy modes of differing loss characteristics producing respective amounts of heat. According to a third aspect of the third embodiment, the control electronics are further configured to, based upon at least an ambient temperature and a cabin temperature, control the cabin blower to operate, during a first time interval, in an efficient mode, and, during a second time interval, in a lossy mode in which the cabin blower generates a greater amount of heat than when in the efficient mode. According to a sub-aspect of the third aspect, the lossy mode includes a plurality of sub-lossy modes of differing loss characteristics producing respective amounts of heat.

According to a fourth aspect of the third embodiment, the vehicle heat pump system further includes a cabin HVAC case that contains the cabin evaporator and the cabin condenser. The cabin HVAC case is configured to operate in an air recirculation mode to recirculate air within the cabin or in a fresh air mode that communicates air between the cabin and the ambient. The cabin HVAC may also be configured to operate in a mode in which air is partially recirculated. According to a fifth aspect of the third embodiment, the cabin evaporator and the cabin condenser are configured in at least one heating mode to operate concurrently. According to a sixth aspect of the third embodiment, the vehicle heat pump system further includes at least one inverter to drive at least one of the compressor and the cabin blower and the control electronics are further configured to control the at least one inverter to operate, during a first time interval, in an efficient mode, and during a second time interval, in a lossy mode to generate a greater amount of heat than when in the efficient mode.

According to a seventh aspect of the third embodiment, the cabin evaporator and the cabin condenser are configured in at least one heating mode to operate concurrently. According to an eight aspect of the third embodiment, the ambient source is the cabin and according to an eighth aspect of the third embodiment, the ambient source is external air. The various aspects of the third embodiment provide important benefits same/similar to the benefits described previously above with reference to the aspects of the first and second embodiments.

DETAILED DESCRIPTION OF THE DISCLOSURE

Figure 1:
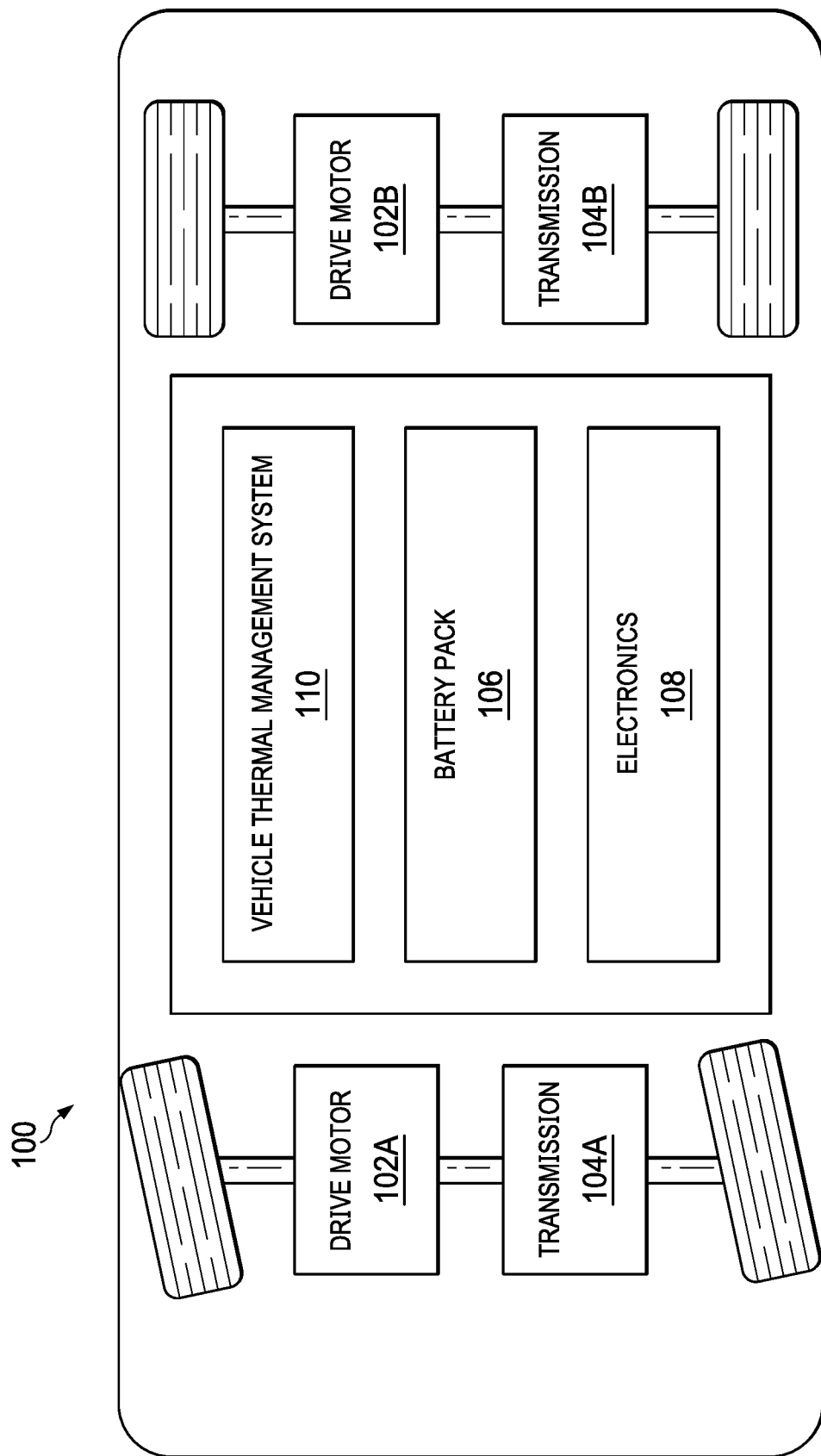
FIG. 1 is a block diagram illustrating the components of a battery powered electric vehicle constructed according to a described embodiment.

FIG. 1 illustrates the basic components of a battery powered electric vehicle (electric vehicle) 100. The electric vehicle 100 includes at least one drive motor (traction motor) 102A and/or 102B, at least one transmission 104A and/or 104B coupled to a corresponding drive motor 102A and/or 102B, a battery system 106 and electronics 108 (including drive motor electronics). Generally, the battery system 106 provides electricity to the electronics 108 of the electric vehicle 100 and to propel the electric vehicle 100 using the drive motor 102A and/or 102B. The battery system 106 includes an array of individual batteries constructed according to one or more embodiments of the present invention. The battery system 106, in some embodiments, includes thousands of individual batteries.

The electric vehicle 100 further includes a vehicle thermal management system 110, which is described herein with reference to a number of embodiments. This vehicle thermal management system 110 includes a vehicle heat pump system 202 that operates to heat and cool a vehicle cabin. The vehicle thermal management system 110 includes structure and operations that support the collection of heat not only from the ambient environment but from other vehicle components, including the battery system 106, the drive motors 102A/102B, the transmission 104A/104B, and/or the electronics 108 and also the inefficient operations of various system components, e.g., compressor 214 and/or cabin blower 222 motors to generate heat.

The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles.

Figure 2:
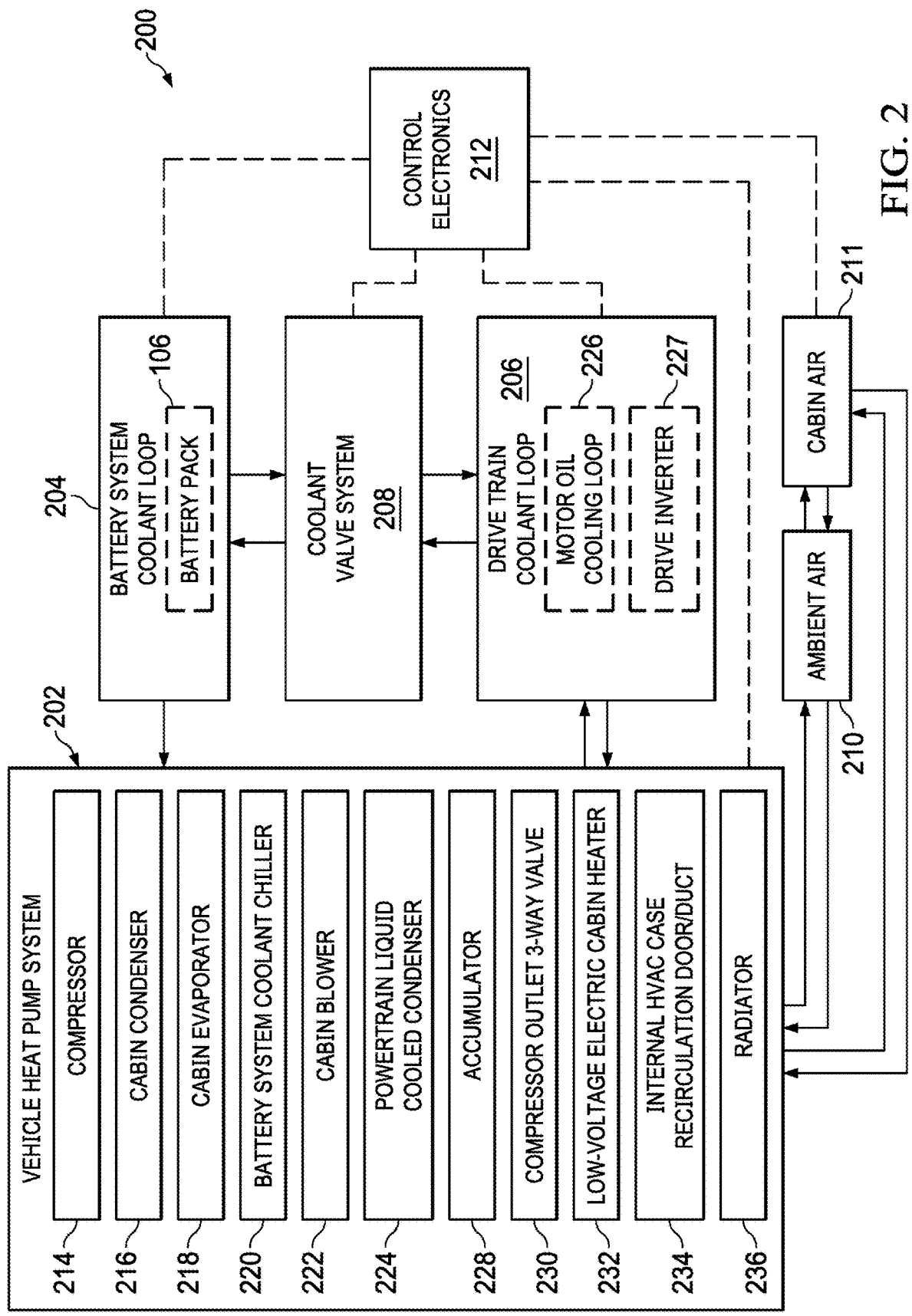
FIG. 2 is a block diagram illustrating a vehicle thermal management system of an electric vehicle constructed according to a described embodiment.

FIG. 2 is a block diagram illustrating a vehicle thermal management system of an electric vehicle constructed according to a described embodiment. The vehicle thermal management system 200 includes a vehicle heat pump system 202, a battery system coolant loop 204 in thermal communication with a battery system 106, and a drive train coolant loop 206 in thermal communication with at least one drive train component (e.g., 102A, 102B, 104A, and/or 104B) and selectively in thermal communication with the battery system coolant loop 204 via a coolant valve system 208. Control electronics 212 control operation of the components of the vehicle thermal management system 200 shown in FIG. 2 and the components of the various embodiments of the vehicle thermal management system shown in FIG. 3 and thereafter. The components of the vehicle thermal management system 200 interconnect via tubing and/or piping. Generally, tubing describes a structure that supports the transport of refrigerant while piping describes structure that supports the transport of coolant. Control electronics 212 control the vehicle heat pump system 202, the battery system coolant loop 204, the coolant valve system 208, the drive train coolant loop 206 and cabin air 211 and ambient air 210 ducting via wired and/or wireless communication paths.

The vehicle heat pump system 202 includes a compressor 214, a cabin condenser 216, a cabin evaporator 218, a plurality of expansion valves (shown in subsequent FIGS.), a battery system 106 coolant chiller 220, a cabin blower 222, a drive train liquid-cooled condenser 224, an accumulator 228, a compressor 214 outlet 3-way valve 230, a low-voltage electric cabin heater 232, an internal HVAC case recirculation duct 234, and a radiator 236. Each of the components of the vehicle thermal management system 200 of FIG. 2 is powered by the battery system 106 and controlled by the control electronics 212. The coolant valve system 208 operates to cause the battery system coolant loop 204 to operate in parallel with and separate from the drive train coolant loop 206 when in a first mode. Further, the coolant valve system 208 operates to cause the battery system coolant loop 204 to be serially coupled to the drive train coolant loop 206 when in a second mode. The coolant valve system 208 may be further configured to cause the battery system coolant loop 204 to be partially in parallel and partially in serial with the drive train coolant loop 206 when in a third mode. The vehicle thermal management system 200 is configured to operate to exchange heat between and among the battery system 106, the at least one drive train component 102A/B and a cabin of the vehicle.

The drive train coolant loop 206 may further include a motor oil cooling loop 226 in thermal communication with a traction motor 102A/B and a transmission 104A/B and a drive inverter coolant path 227. In such construction, the drive train coolant loop 206 further includes an oil heat exchanger configured to exchange heat between the traction motor 102A/B and the drive train coolant loop 206.

With one construct of the vehicle thermal management system 200, the vehicle heat pump system 202 further comprises a cabin HVAC case that contains the cabin evaporator 218 and the cabin condenser 216. In this construct, the cabin evaporator 218 and the cabin condenser 216 are configured in at least one heating mode to operate concurrently to more rapidly heat the vehicle cabin. Further, in another operation, a compressor drive circuit drives the compressor 214 in a lossy mode to generate heat within the vehicle cabin. The cabin blower 222 may be operated in both an efficient mode and an inefficient mode. In the inefficient mode, the cabin blower 222 generates heat at a rate greater than a heat generated in the efficient mode, which further increases a rate of heating within the vehicle cabin.

With the structure of the vehicle thermal management system 200 of FIG. 2, the vehicle heat pump system 202 heat source heat from the drive train coolant loop 206, the battery system coolant loop 204, and/or the ambient. Further, the manners of running the compressor 214 and cabin blower 222 in inefficient modes also aids in faster cabin heating when required. These components and their operation support less usage or no usage of a high-voltage cabin heater and adds range to the vehicle due to less battery system 106 use for cabin heating.

The ability of the vehicle heat pump system 202 to source low-grade waste heat produced naturally or deliberately by the powertrain (102A/B and/or 104A/B) and/or the battery system 106 and/or to run the compressor 214 as an electrical heater in any proportion provides significant efficiencies for vehicle cabin heating. Initial startup conditions (battery system 106 temperature and charge and vehicle cabin temperature), ambient/weather data, trip plans, or other specific user meta-data are available to inform the vehicle heat pump system 202 for source optimization. For example, for short trips, it is energetically favorable to prioritize heating of the vehicle cabin for immediate comfort of the driver/passengers at the expensive of battery system 106 temperature/DC resistance, which requires a significant number of miles driven to amount to a significant range delta (compared to if you did not withdraw thermal energy from the battery system 106). Therefore, there are energy/capacity tradeoffs that can be made in-situ and according to the specific drive context and tendencies of each particular user. With the vehicle thermal management system 200 of FIG. 2, the vehicle heat pump system 202 opportunistically trades lower-temperature thermal energy stored in the battery system 106 for higher-temperature energy for cabin heating by using the coolant valve system 208 to isolate the battery system 106 from everything except the vehicle heat pump system 202.

The ability of the vehicle heat pump system 202 to operate the cabin evaporator 218 and the cabin condenser 216 at the same time and to operate the compressor 214 as a High Voltage (HV) heater, allows for the removal of expensive high-voltage cabin heater. The option for the vehicle heat pump system 202 to run the motor of the compressor 214 in a deliberately inefficient speed vs. slip configured condition further enhances cabin heating capacity as needed without adding additional electrical heaters. The option to run the cabin blower 222 in a deliberately inefficient speed vs. slip configured condition further enhances the heating power of the vehicle heat pump system 202. Embodiments described herein with reference to subsequent FIGS. build on these configured modes, while adding new ones such as "cabin thermal energy recovery" which moves thermal energy from a hot cabin and stores it in the battery system 106 (where it is more isolated from ambient) and "Supplemental power train cooling" which uses an additional chiller 220 in hot and high-power configured conditions.

Figure 3:
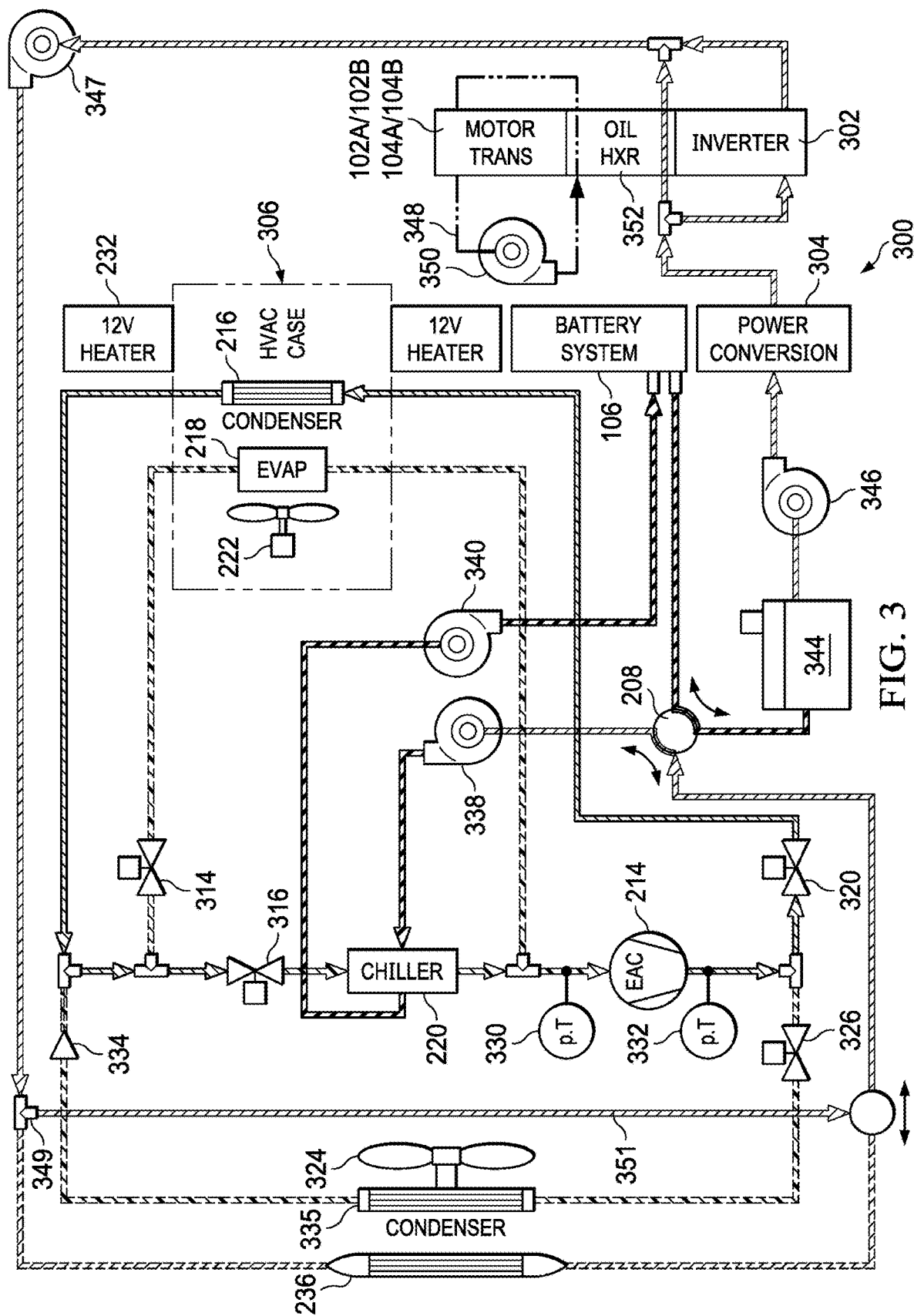
FIG. 3 is a schematic diagram illustrating a vehicle thermal management system of an electric vehicle of the present disclosure configured in a first heating mode.

FIG. 3 is a schematic diagram illustrating a vehicle thermal management system of an electric vehicle of the present disclosure configured in a first heating mode. The vehicle thermal management system 300 includes example components of the following elements which are illustrated in FIG. 2, vehicle heat pump system 202, a battery system coolant loop 204 in thermal communication with the battery system 106, and a drive train coolant loop 206 in thermal communication with at least one drive train component and selectively in thermal communication with the battery system coolant loop 204 via a coolant valve system 208. Control electronics (not shown) control operation of the components of the vehicle thermal management system 300 shown in FIG. 3 (and subsequent FIGS. 4-32). The components of the vehicle thermal management system 300 interconnect via tubing and/or piping. Generally, tubing describes structure that supports the transport of refrigerant while piping describes structure that supports the transport of coolant.

The vehicle heat pump system 202 includes a compressor 214 (electric motor driven), a cabin condenser 216, a cabin evaporator 218, a plurality of expansion valves 314, 316, 320, and 326, a chiller 220 (e.g., battery system coolant chiller 220), pressure/temperature gauges 330 and 332, and a cabin blower 222. The cabin condenser 216, the cabin evaporator 218 and the cabin blower 222 may be contained within an HVAC case 306 within the vehicle cabin. The embodiment of FIG. 3 may also include a low voltage electric heater 232 that operates to heat the vehicle cabin. In some constructs, the compressor 214 is located within the vehicle cabin to assist in heating. The vehicle heat pump system 202 further includes an ambient cooled condenser and one-way valve 334. In a cooling mode, the cabin evaporator 218 and the ambient condenser 335 (and external fan 324) are operational to cool the vehicle cabin. The components of the vehicle heat pump system 202 are intercoupled by tubing and filled with a suitable refrigerant.

The battery system coolant loop 204 includes pumps 338 and 340, a heat exchange structure within battery system 106, the chiller 220, and piping that intercouples these components. The drive train coolant loop 206 includes reservoir 344, pumps 346 and 347, tee fitting 349 and piping that circulates coolant through power conversion electronics 304, inverter 302, and radiator 236. The tee fitting 349 is controllable to direct coolant via bypass path 351 instead of via radiator 236 to preserve heat in the circulated coolant. When excess heat is generated by the battery system 106 and/or the drive train components 304, 302 and/or 102A/102B, coolant is directed to the radiator 236 to sink the excess heat.

The drive train coolant loop 206 may further include a motor oil cooling loop 226 in thermal communication with a traction motor 102A/B and a transmission 104A/B. In such construction, the drive train coolant loop 206 further includes an oil heat exchanger 352 and an oil loop having a pump 350 and piping 348 that passes through the traction motor 102A/B and the transmission 104A/B and circulates oil to collect heat. The oil heat exchanger 352 is configured to exchange heat between the traction motor 102A/B traction motor and transmission 104A/B and the drive train coolant loop 206. The components of both the battery system coolant loop 204 and the drive train coolant loop 206 are filled with a coolant such as an alcohol based or other coolant. The oil loop is filled with oil that serves both to lubricate the moving components of the traction motor 102A/102B and the transmission 104A/104B.

The coolant valve system 208 couples to both the battery system coolant loop 204 and the drive train coolant loop 206. The coolant valve system 208 operates, when in a first mode, to cause the battery system coolant loop 204 to operate in parallel with and separate from the drive train coolant loop 206. When in a second mode, the coolant valve system 208 operates to cause the battery system coolant loop 204 to be serially coupled to the drive train coolant loop 206. The coolant valve system 208 may be further configured to cause the battery system coolant loop 204 to be partially in parallel and partially in series with the drive train coolant loop 206 when in a third mode. The vehicle thermal management system 200 is configured so that the battery system coolant loop 204 and the drive train coolant loop 206 transfer heat from at least one of the battery system 106 and the at least one drive train component 102A/B and/or 104A/B to the vehicle heat pump system 202.

In a first heating mode illustrated in FIG. 3, the battery system coolant loop 204 and the drive train coolant loop 206 operate in series via operation of the coolant valve system 208. In the first heating mode, piping shown in solid lines transports coolant, piping shown in dashed lines does not transport coolant, tubing shown in sold lines transports refrigerant, and tubing shown in dashed lines does not transport refrigerant. This convention will continue in FIGS. 4-8 as well. Expansion valves 314, 316, 320, and 326 are controlled by control electronics 212 to control not only the flow of refrigerant but also the rate of flow. The control electronics 212 use pressure and temperature data obtained via pressure/temperature gauges 330 and 332, battery temperature data captured via temperature sensors in the battery system 106, drive train temperature sensors mounted upon or within the power conversion electronics 304, inverter 302, the traction motor 102A/102B, and/or the transmission 104A/104B, ambient air temperature sensors, vehicle cabin temperatures sensors, and other data to determine how to operate the components of the vehicle thermal management system 300.

In nominal configured conditions where heating is required, there is typically ample waste heat produced naturally by the drive train components to heat the vehicle cabin. Heat is captured by the drive train coolant loop 206 and exchanged with the vehicle heat pump system 202 via the battery system coolant loop 204. However, in low ambient conditions, the vehicle heat pump system 202 cannot immediately source sufficient heat from the ambient (air) or the drive train to heat the cabin. In a typical configured situation, the vehicle 100 has been outside of a heated garage for an hour or two and parked in a very cold ambient, e.g., negative 10 degrees C. In this one or two-hour period, the vehicle cabin has equalized with the ambient to reach negative 10 degrees C. However, due to the mass and structure of the battery system 106, the temperature of the battery system 106 is above ambient temperature and, thus, has available heat to source for vehicle cabin heating.

Thus, the vehicle thermal management system 300 of FIG. 3 efficiently draws heat from both the battery system 106 and the drive train components. Specifically, heat is produced by the traction motor 102A/102B, the transmission 104A/B, the inverter 302, and the power conversion electronics 304. This heat is captured by the drive train coolant loop 206 and exchanged with the vehicle heat pump system 202 via the battery system coolant loop 204 and chiller 220. This heat is then lifted/drawn by the vehicle heat pump system 202 via the chiller 220 and then deposited into the vehicle cabin by the cabin condenser 216. Such structure and operation cause the vehicle thermal management system 300 to efficiently warm the vehicle cabin without having to accommodate potentially difficult ambient conditions.

Thermal energy withdrawn from the battery system coolant loop 204 negatively impacts battery system 106 performance. However, when vehicle cabin and battery system 106 heating are both necessary, it is far more efficient to spend energy of the battery system 106 preferentially for heating the vehicle cabin. Battery system 106 resistance improves with temperature, but because the thermal mass of the battery system 106 is so large, it requires tremendous energy and time to recover energy spent heating the battery system 106. In other words, given a free external heating source, it makes more sense thermodynamically to spend this energy preferentially on the vehicle cabin first until all needs are met.

In an additional operation to accelerate vehicle cabin heating, the drive train components can be controlled to generate waste heat by configured in a "waste heat mode" in which the stator is powered in a manner to generate heat within the traction motor 102A/102B without driving the traction motor 102A/102B. Co-pending Patent Application Serial No. PCT/US2017/03629, filed on Jun. 7, 2017 and entitled ELECTRIC MOTOR WASTE HEAT MODE TO HEAT BATTERY describes the waste heat mode operation of a traction motor 102A/102B and is incorporated herein by reference in its entirety for all purposes. This heat is exchanged with the drive train coolant loop 206 via oil heat exchanger 352.

One or more enhanced heating modes may be enacted with the vehicle thermal management system 300 of FIG. 3. In a compressor as a heater mode, a compressor drive circuit drives the compressor 214 in a lossy mode to generate heat. Further, the cabin blower 222 may be configured to operate in both an efficient mode and an inefficient mode that cause the cabin blower 222 to generate heat at a rate greater than a heat generated in the efficient mode.

Figure 4:
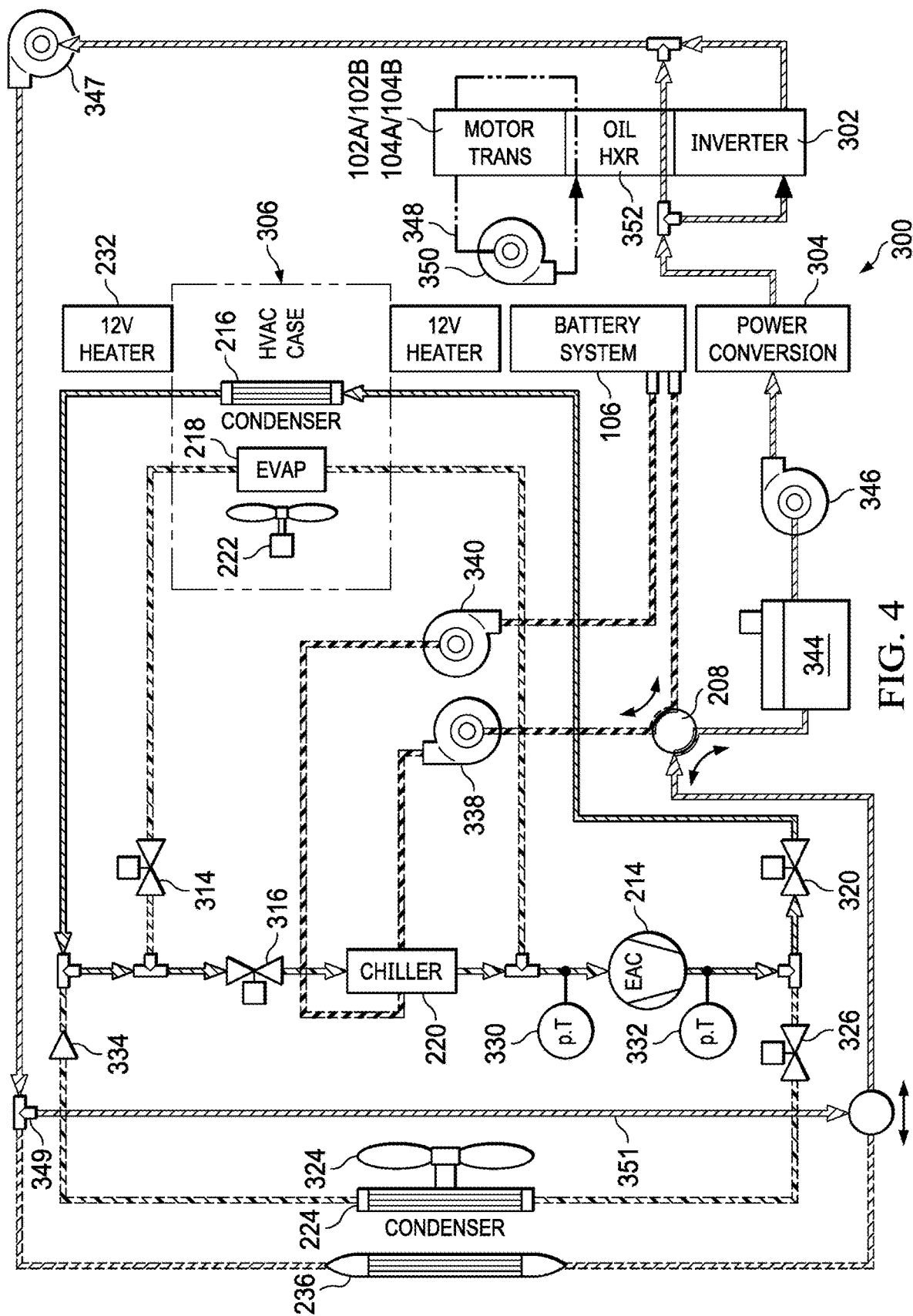
FIG. 4 is a schematic diagram illustrating the vehicle thermal management system of FIG. 3 configured in a second heating mode.

FIG. 4 is a schematic diagram illustrating the vehicle thermal management system 300 of FIG. 3 configured in a second heating mode. In the second heating mode, the coolant valve system 208 causes the battery system coolant loop 204 to operate in series with the drive train coolant loop 206. In a modified version of the second heating mode, the coolant valve system 208 causes the battery system coolant loop 204 to operate partially in series and partially in parallel with the drive train coolant loop 206.

Further, in the second heating mode, the vehicle thermal management system 300 of FIG. 4 supports at least one enhanced heating mode to increase a heating rate of the vehicle cabin. In a first enhanced heating mode, the vehicle thermal management system 300 causes a compressor drive circuit to operate the compressor 214 in a lossy mode to generate heat, i.e., the electric motor of the compressor 214 is operated directly as a high-voltage electrical heater in extremely cold startup conditions. For example, if the compressor 214 motor is rated up to 8 kW continuous power consumption, in theory, it could be used to deliver 8 kW of heating power to the vehicle cabin.

For further enhanced heating, the cabin evaporator 218 and cabin condenser 216 operate at the same time. By sourcing heat exclusively from the vehicle cabin, the vehicle heat pump system 202 heat source (cabin evaporator 218) has access to the warmest suction conditions as the vehicle cabin warms up. The heating process is exponential; the temperature rise rate is proportional to the heating power which is in turn proportional to the temperature itself. During warm-up, the density at the inlet rises which allows the compressor 214 to process more mass flow, which adds more heat to the vehicle cabin, which further increases the rise rate. In this operation, the cabin evaporator 218 air inlet temperature is managed by the operation of low voltage electrical heater 232 to help speed things up, or by manipulating the HVAC case 306/cabin blower 222 in a particular way, e.g., withholding and managing cold air exchange. Even with no added heat, the vehicle heat pump system 202 cycle will add a significant heating rate to the vehicle cabin, rapidly increasing in time.

In some operations, the compressor 214 is used to cool the battery system 106 during charging. Thus, the compressor 214 creates a highly capable refrigeration system (compressor 214 volumetrically sized for supercharging), which supports rapid vehicle cabin heating in extremely cold conditions. As related above with reference to FIG. 3, the electric motor of the compressor 214 may be operated to reduce its motor efficiency in an attempt to transfer even more heat to the cabin in extreme cold startup conditions. This operation causes the electric motor of the compressor 214 to be operated at a sub-optimal point, e.g., with poor phasing between the rotating magnetic field generated by the stator windings and the permanent magnets on the rotor. These operations are commonly referred to as controlling the slip angle, and in theory any motor controller is capable of varying the slip angle for higher (or in the case lower) efficiency. The compressor 214 may be configured to always drive its discharge temperature to a 130° C. limit, maximizing its heating power. Analogously, the cabin blower 222, which is capable of consuming 400 W in some embodiments, may also be deliberately run in an inefficient manner to improve heating power. Since the value of any heat added early in the warm-up process is very important, these additional features are critical to providing adequate warm-up capacity in extremely cold-soaked cabin conditions.

Figure 5:
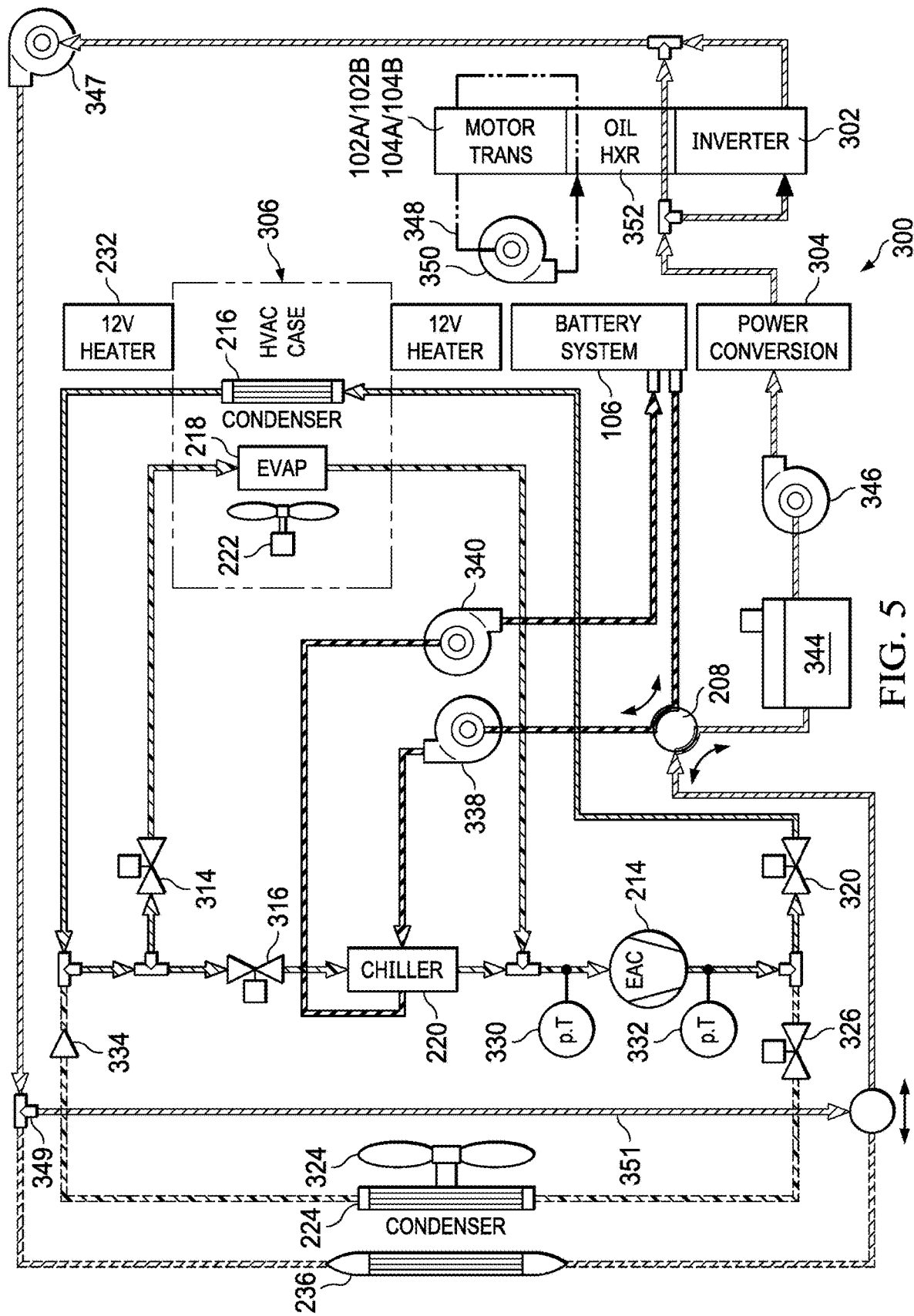
FIG. 5 is a schematic diagram illustrating the vehicle thermal management system of FIG. 3 configured in a third heating mode.

FIG. 5 is a schematic diagram illustrating the vehicle thermal management system 300 of FIG. 3 configured in a third heating mode. In the third heating mode of FIG. 5, coolant valve system 208 causes the battery system coolant loop 204 to operate in parallel with the drive train coolant loop 206. Thus, heat for the vehicle heat pump system 202 is sourced via the battery system 106. In this third heating mode, the battery system 106 has sufficient heat to support vehicle cabin heating. Further, in this third heating mode, the drive train coolant loop 206 utilizes bypass path 351 for coolant routing because the coolant temperature of the drive train coolant loop 206 is within an acceptable temperature range.

Figure 6:
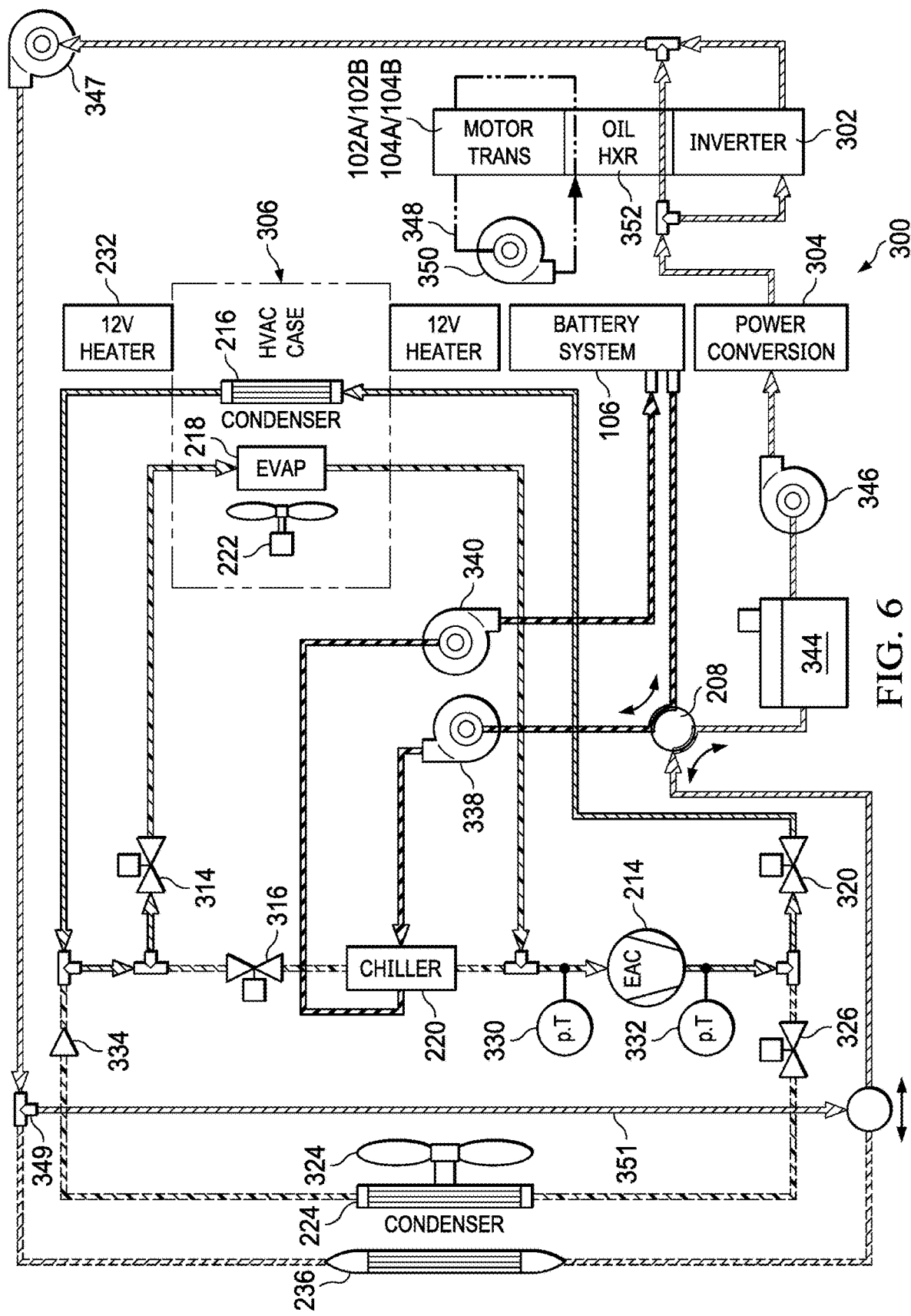
FIG. 6 is a schematic diagram illustrating the vehicle thermal management system of FIG. 3 configured in a fourth heating mode.

FIG. 6 is a schematic diagram illustrating the vehicle thermal management system 300 of FIG. 3 configured in a fourth heating mode. The fourth heating mode illustrated in FIG. 6 is similar to the second heating mode illustrated in FIG. 4. However, with the fourth heating mode, the chiller 220 does not exchange heat between the battery system coolant loop 204 and the drive train coolant loop 206. Thus, with the fourth heating mode, all heat collected by the vehicle heat pump system 202 is collected within the HVAC case 306. Optionally, the low voltage electric heater 232 may be operated to provide additional heating for the cabin evaporator 218. Further, the compressor 214 and/or the cabin blower 222 may be operated in a lossy mode.

Figure 7:
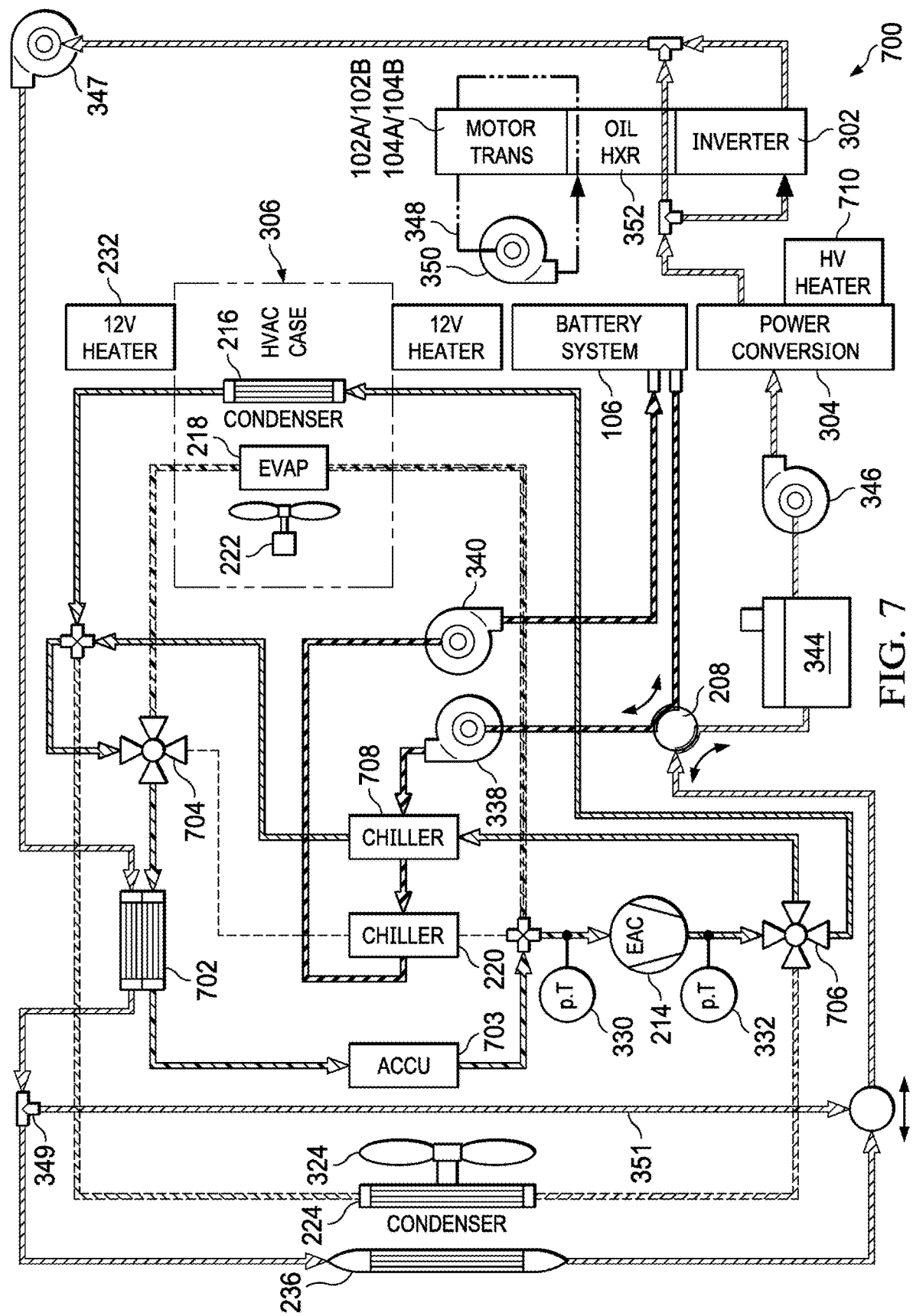
FIG. 7 is a schematic diagram illustrating a vehicle thermal management system of an electric vehicle constructed according to a third described embodiment.

FIG. 7 is a schematic diagram illustrating a vehicle thermal management system of an electric vehicle constructed according to a third described embodiment. The structure of the vehicle thermal management system 700 of FIG. 7 is similar to the structure of the vehicle thermal management system 300 of FIG. 3 with common/similar components sharing common numbering. Additional components of the vehicle thermal management system 700 of FIG. 7 include a drive train liquid-cooled chiller 702 configured to exchange heat between the drive train coolant loop 206 and the vehicle heat pump system 202. The vehicle heat pump system 202 includes an additional cabin condenser 708 configured to exchange heat between the vehicle heat pump system 202 and the battery system coolant loop 204. Four port expansion valves 704 and 706 intercouple components of the vehicle heat pump system 202. A supplemental coolant heater 710 is integrated with the power conversion electronics 304 and, when operational, assists in heating the coolant of the drive train coolant loop 206.

With the vehicle thermal management system 700 of FIG. 7, coolant valve system 208 operates to cause the battery system coolant loop 204 to operate in parallel with the drive train coolant loop 206. Expansion valve 704 operates to route refrigerant to the chiller 220 to support the capture of heat by the vehicle heat pump system 202 from the drive train coolant loop 206. The vehicle heat pump system 202 is also operated to support the transfer of heat between the battery system 106 and the vehicle heat pump system 202 via cabin condenser 216. Tee fitting 349 operates to direct coolant both via the bypass path 351 and through the radiator 236. The structure and configuration of the vehicle thermal management system 700 to heat the battery system 106 and the vehicle cabin. Accumulator 703 resides between drive train liquid-cooled chiller 702 and four-way connection just above compressor 214.

The vehicle thermal management system 700 of FIG. 7 may be operated in a "Supplemental power train cooling" which uses the chiller 220, in hot and high-power configured conditions, to provide additional drive train cooling using the vehicle heat pump system 202.

Figure 8:
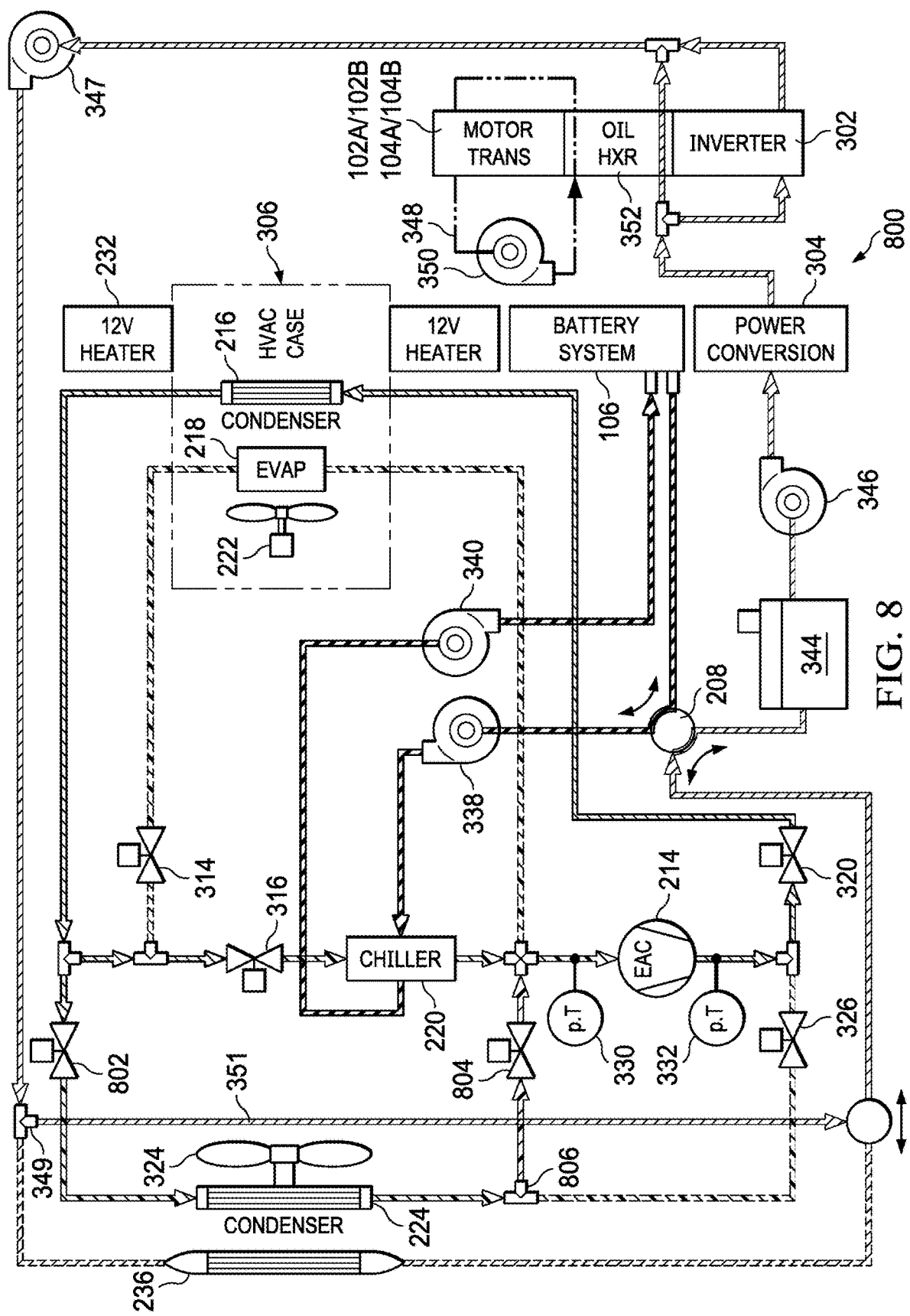
FIG. 8 is a schematic diagram illustrating a vehicle thermal management system of an electric vehicle constructed according to a fourth described embodiment.

FIG. 8 is a schematic diagram illustrating a vehicle thermal management system of an electric vehicle constructed according to a fourth described embodiment. The structure of the vehicle thermal management system 800 of FIG. 8 is similar to the structure of the vehicle thermal management system 300 of FIG. 3 with common/similar components sharing common numbering. Additional components of the vehicle thermal management system 800 of FIG. 8 include expansion valves 802 and 804, tee fitting 806 and tubing that interconnects the vehicle heat pump system 202 with the cabin condenser 216 in an additional manner.

With the vehicle thermal management system 800 of FIG. 8, coolant valve system 208 operates to cause the battery system coolant loop 204 to operate in series with the drive train coolant loop 206. Vehicle heat pump system 202 heats the cabin using expansion valves 802, 804 and 326 to route refrigerant from the cabin condenser 216 partially through the outdoor condenser 224 serving as an evaporator to source heat from ambient, and partially through the chiller 220 to source heat from the battery loop.

Figure 9A:
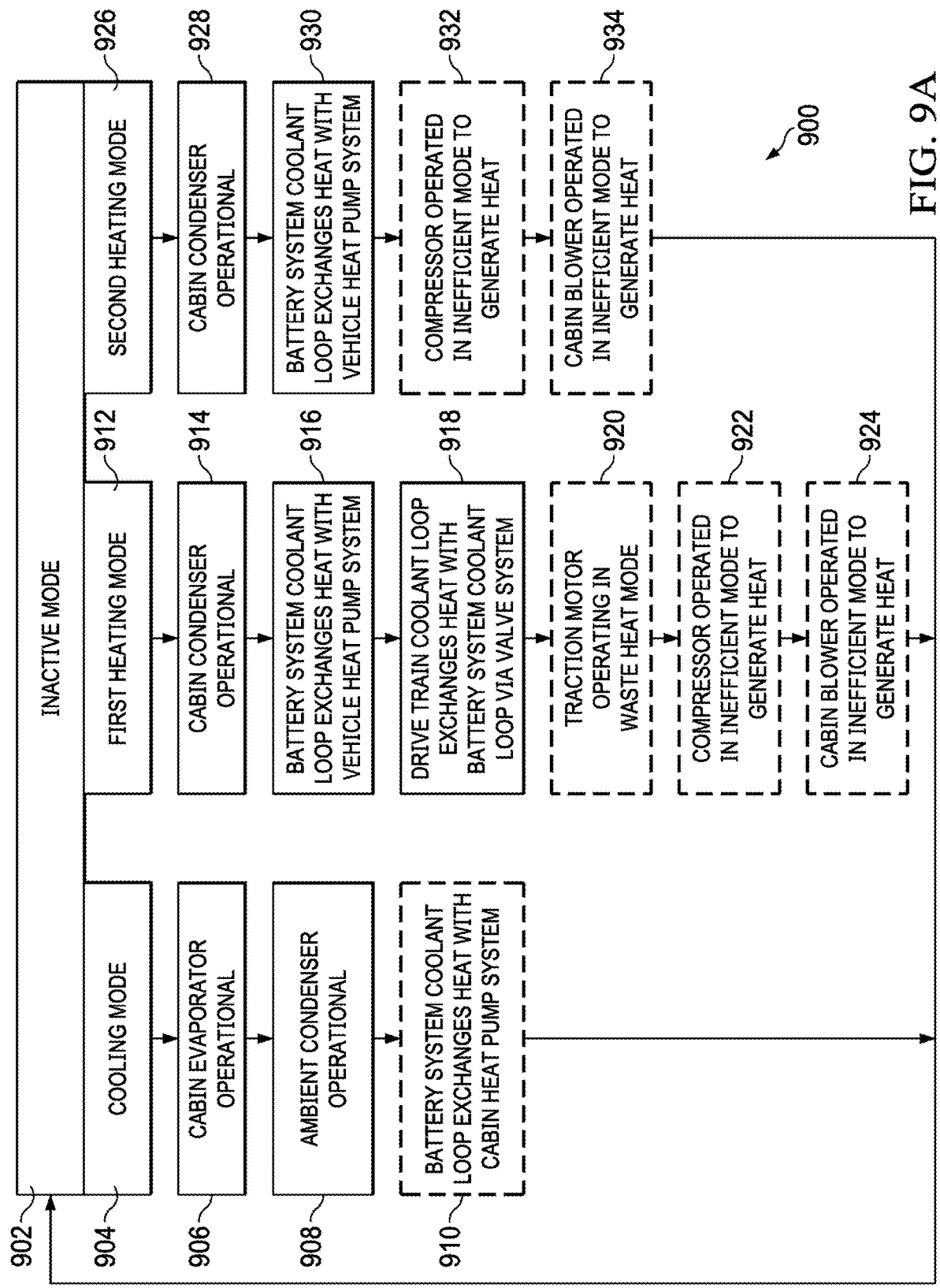
FIGS. 9A and 9B are flow diagrams illustrating operation of a vehicle thermal management system of an electric vehicle according to a number of described embodiments.
Figure 9B:
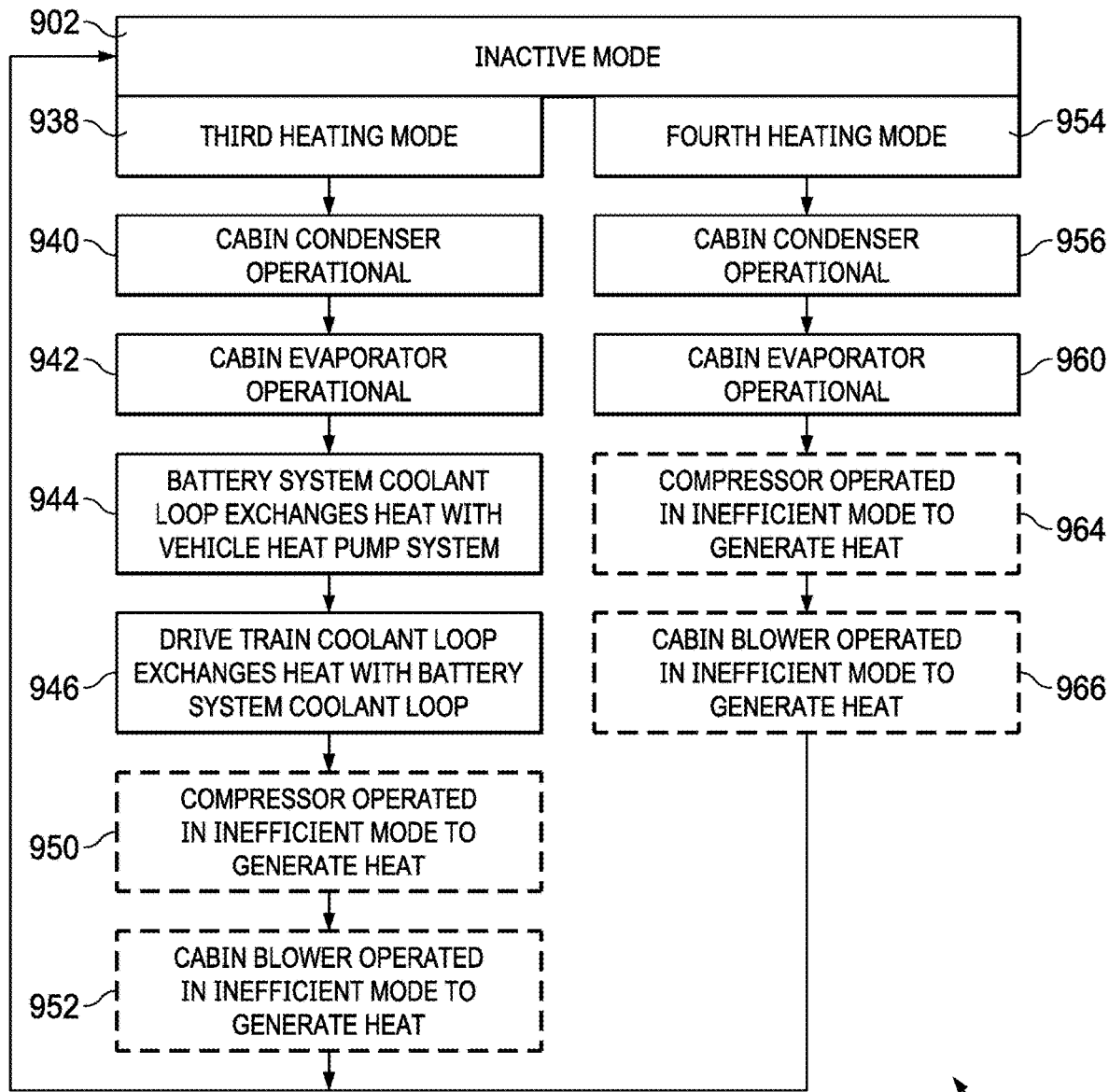

FIGS. 9A and 9B are flow diagrams illustrating operation 900 of a vehicle thermal management system of an electric vehicle according to a number of described embodiments. Referring to both of FIGS. 9A and 9B, operation of the vehicle thermal management system resides in an inactive mode (step 902) until entering a cooling mode (step 904), a first heating mode (step 912), a second heating mode (step 926), a third heating mode (step 938), and a fourth heating mode (step 954). Various of these heating modes have been described herein with reference to FIGS. 1-8. Thus, terminology used with reference to FIGS. 9A and 9B may be similar to such previously used terminology.

Referring to FIG. 9A, in the cooling mode (step 904), the cabin evaporator 218 is operational (step 906) and the ambient condenser 335 is operational (step 908). Further, optionally, in the cooling mode, the battery system coolant loop 204 exchanges heat with the vehicle heat pump system 202 (step 910).

Still referring to FIG. 9A, in the first heating mode (step 912), the cabin condenser 216 is operational (step 914). The battery system coolant loop 204 exchanges heat with the vehicle heat pump system 202 (step 916) and the drive train coolant loop 206 exchanges heat with the battery system coolant loop 204 (step 918). In optional steps of the first heating mode (step 912), the traction motor 102A/102B operates in a waste heat mode (step 920), the compressor 214 operates in an inefficient mode to generate heat (step 922) and/or the cabin blower 222 operates in an inefficient mode to generate heat within the vehicle cabin (step 924).

Still referring to FIG. 9A, in the second heating mode (step 926), the cabin condenser 216 is operational (step 928). The battery system coolant loop 204 exchanges heat with the vehicle heat pump system 202 (step 930). In optional steps of the second heating mode (step 926), the compressor 214 operates in an inefficient mode to generate heat (step 932) and/or the cabin blower 222 operates in an inefficient mode to generate heat within the vehicle cabin (step 934).

Referring now to FIG. 9B, in the third heating mode (step 938), the cabin condenser 216 is operational (step 940) and the cabin evaporator 218 is operational (step 942). The battery system coolant loop 204 exchanges heat with the vehicle heat pump system 202 (step 944) and the drive train coolant loop 206 exchanges heat with the battery system coolant loop 204 (step 946). In optional steps of the third heating mode (step 938), the compressor 214 operates in an inefficient mode to generate heat (step 950) and/or the cabin blower 222 operates in an inefficient mode to generate heat within the vehicle cabin (step 952).

Still referring to FIG. 9B, in the fourth heating mode (step 954), the cabin condenser 216 is operational (step 956) and the cabin evaporator 218 is operational (step 960). In optional steps of the fourth heating mode (step 954), the compressor 214 operates in an inefficient mode to generate heat (step 964) and/or the cabin blower 222 operates in an inefficient mode to generate heat within the vehicle cabin (step 966).

Referring to the prior and subsequent FIGS. herein, a flexible and efficient (Coefficient of Performance (COP) >>1) vehicle heat pump system 202 includes sourcing/blending of the drive train coolant loop, battery system coolant loop 204, and an inefficient, low-temperature tolerant, "electrical" (COP=1) heat mode provides enhanced heating. This allows the vehicle heat pump system 202 to balance multiple concurring constraints, e.g., cabin comfort, battery performance, and range. The superposition or blending of efficient states (COP>>1) and inefficient states (COP=1) is described further herein.

Using the compressor 214 as a high-voltage heater further enhances heating power/reduces noise using the compressor 214 motor and inverter/cabin blower 222 motor in waste heat mode and various thermodynamic recirculation schemes (air, coolant or refrigerant). These operations support the removal of the conventional high voltage cabin air electrical heater, and instead to repurpose the compressor 214 as an electrical (COP=1), e.g. an inefficient heater when required. An extreme version of compressor 214 waste heat mode, which uses the motor/inverter as a boiler, eliminates the need for recirculating loops.

The ability to precondition (heat) the battery system 106 before a trip by either efficiently sourcing ambient air (COP>>1), recovering thermal energy from the cabin (COP>>2), or generating thermal energy in a "compressor 214 as High Voltage heater" (COP=1) preconditions the vehicle so that range, driving performance, charging capability, and comfort objectives are maximized. Various of these preconditioning operations shift heating loads in new ways, e.g., heat the battery system 106 in order to later heat the cabin.

The energy required to heat the cabin varies by weather and occupant comfort needs, but on-average consumes approximately 10% of the total energy available for driving. However, even moderately cold weather (0° C.), consumption can increase this load to 25% or more of the total available energy. A vehicle heat pump system 202 consumes a small amount of electrical energy to thermodynamically "upgrade" low-temperature (less useful) thermal energy to higher-temperature (more useful) thermal energy, making it suitable for occupant comfort. That is, for a given electrical power input, a vehicle heat pump system 202 will return 1 to 5 times the useful heating power, as compared to an electrical cabin heater 232 that provides 1:1 in heating power, and therefore is far less efficient. Conventional automotive vehicle heat pump systems using an HFC/HFO refrigerant suffer from low heating capacity in extremely cold ambient conditions, e.g., minus 10° C. and below. Therefore, these conventional systems retain an expensive high-voltage cabin heater to cover heating deficits whenever the vehicle heat pump system 202 capacity is insufficient. This disclosure describes multiple methods to improve performance (COP/efficiency and capacity), and therefore also provides ways to remove a cabin air high voltage PTC heater.

The described vehicle heat pump system 202 conducts thermodynamic arbitrage from a finite thermal resource during driving, and has the ability efficiently augment said thermal resource between drives. This architecture achieves "efficiency on average" and "capacity in corner cases" at minimal cost and complexity. The novel architecture includes the overall cycle configuration/placement of key vehicle heat pump system 202 components, the use of existing components in an unconventional manner, and the utilization of unconventional thermal sources. This enables the vehicle heat pump system 202 source to be either the power-train coolant loop, e.g., low-temperature waste heat produced naturally, ambient air, the battery system 106 thermal mass, the cabin thermal mass, or combinations thereof—no other existing system can do this. Further, novel ways to run the compressor 214/cycle, compressor 214 motor, and cabin blower 222 motor in an effort to improve heating power (electrically) that allows for removal of the conventional/existing expensive high-voltage cabin heater.

The thermodynamic value of thermal energy is contextual—it depends on the source and target temperature, the performance sensitivity of the source and target to temperature (battery or cabin), and the time (used now vs. later). Currently all "free" low-grade/temperature thermal energy generated naturally while driving (by the powertrain) goes directly into heating the battery system 106 until a specific temperature, the passive target, is achieved. Unfortunately, this low-grade thermal energy is not generally hot enough to directly heat the cabin, unlike an ICE vehicle. It is also coupled to a rather large thermal mass, and therefore is not "available" on a suitable comfort timeline. Further, on longer trips where range is most important, the passive target is achieved somewhat early in the drive and subsequently all of the naturally-produced thermal energy, a potential resource, is discarded to ambient. The naturally-produced thermal energy (due to driving), as well as any stored thermal energy in the pack, ought to be a considered a finite low-grade thermal resource. The $2^{nd}$ Law of thermodynamics requires that thermal energy is strictly never equivalent to purer, more useful (lower entropy) forms of energy, e.g., electrical, mechanical, etc., except in the extreme limits of temperature. Therefore, using an appropriate thermodynamic cycle (herein, a typical refrigeration vapor compression system), thermal energy can be traded or exchanged at multiples of electrical energy, depending on the temperature levels of the thermal source and heating target. That is, a vehicle heat pump system 202 takes energy that otherwise would have warmed the battery system 106 and trades up (at small cost) to a higher temperature to efficiently heat the cabin; a vehicle heat pump system 202 can "buy low" and "sell high".

Although it is useful to heat the battery system 106, particularly when the battery system 106 is very cold, it is often more beneficial from a range perspective to use part or all of the available thermal energy (from driving or stored in the battery system 106 thermal mass) to heat the cabin. The vehicle heat pump system 202 can efficiently source this low-grade thermal energy from the battery system 106/powertrain coolant loop to efficiently heat the cabin (COP>>1). However, this in-turn would slow down heating of the battery system 106 (or even cool it down). In other words, we can trade efficient cabin heating (improved range) against a colder on-average battery system 106, which has downsides that depend on context. The trade-off strongly depends on the balance between cabin heating needs, dissipation available naturally (driving profile), battery performance requirements (driving profile), and initial battery temperature (stored thermal energy). The utility of heating the battery system 106 is particularly complex, and is a strong function of temperature, drive profile, state of charge, anticipated charging needs, and age. At the cold extreme, the battery system 106 will not accept charging (or will charge extremely slowly), has low discharge power capability, low regen capability, higher electrical resistance, and potentially ages more rapidly. As the battery system 106 warms up, these issues each diminish separately; heating the battery system 106 from 0 to 10° C. requires the same energy as 20° C. to 30° C., but the impact on driving experience and range are immensely different. In other words, the sourcing scheme must consider many objectives and adjust accordingly.

It is clear that when both the cabin and the battery system 106 are soaked to extremely cold temperatures, e.g., −10° C., both are in dire need of heating and cabin heating efficiency (but not comfort) should be sacrificed in an effort to heat both the battery system 106 and the cabin as quickly as possible. However, when the cabin is cold or needs heating, but the battery system 106 is at an intermediate temperature, there are significant opportunities. In cold conditions, the battery system 106 (a massive thermal mass at 85 W–h/° C.) is usually warmer than ambient at the start of the drive because it is relatively well isolated from ambient and therefore takes a long time to reach thermal equilibrium. Although the battery system 106 effectively already serves as a natural thermal reservoir, it can also function as an artificial thermal reservoir. The vehicle heat pump system 202 architecture provides a new way to efficiently utilize it as more deliberate energy storage medium. The battery temperature can be efficiently (COP>>1) topped up and drawn down to provide more efficient cabin warm-ups.

FIGS. 10-30 illustrate a vehicle thermal management system that is similar to the vehicle thermal management systems illustrated in FIGS. 3-8. Same/similar components retain common numbering. One difference between the systems of FIGS. 10-30 as compared to the structures of FIGS. 3-8 is the inclusion of a super manifold integration 1002 that contains a number of the components of the systems. This particular structure is described further in co-pending U.S. Utility patent application Ser. No. 15,688,963, entitled "TECHNOLOGIES FOR MANIFOLDS", filed Aug. 14, 2017, which is incorporated herein in its entirety. Another difference is the cabin internal recirculation door 1004 that supports the one of recirculation of air within the cabin, fresh air ingress into the cabin, or a mixture of recirculation and fresh air ingress. Still another difference is the inclusion of the autopilot ECU 1006 and differing pumping within the battery system coolant loop (a portion of which is referenced with the numeral 1014). Yet another difference is a slightly different structure of the drive train coolant loop (a portion of which is referenced with the numeral 1012). A compressor outlet 3-way valve 230 is new with the embodiment of FIGS. 10-30. In some of FIGS. 10-30, the valving of the coolant valve system 208 are shown in more than one location. The coolant valve system 208 may be described interchangeably as an 8-way valve hereinafter. Other differences will be apparent upon review of the FIGS.

Figure 10:
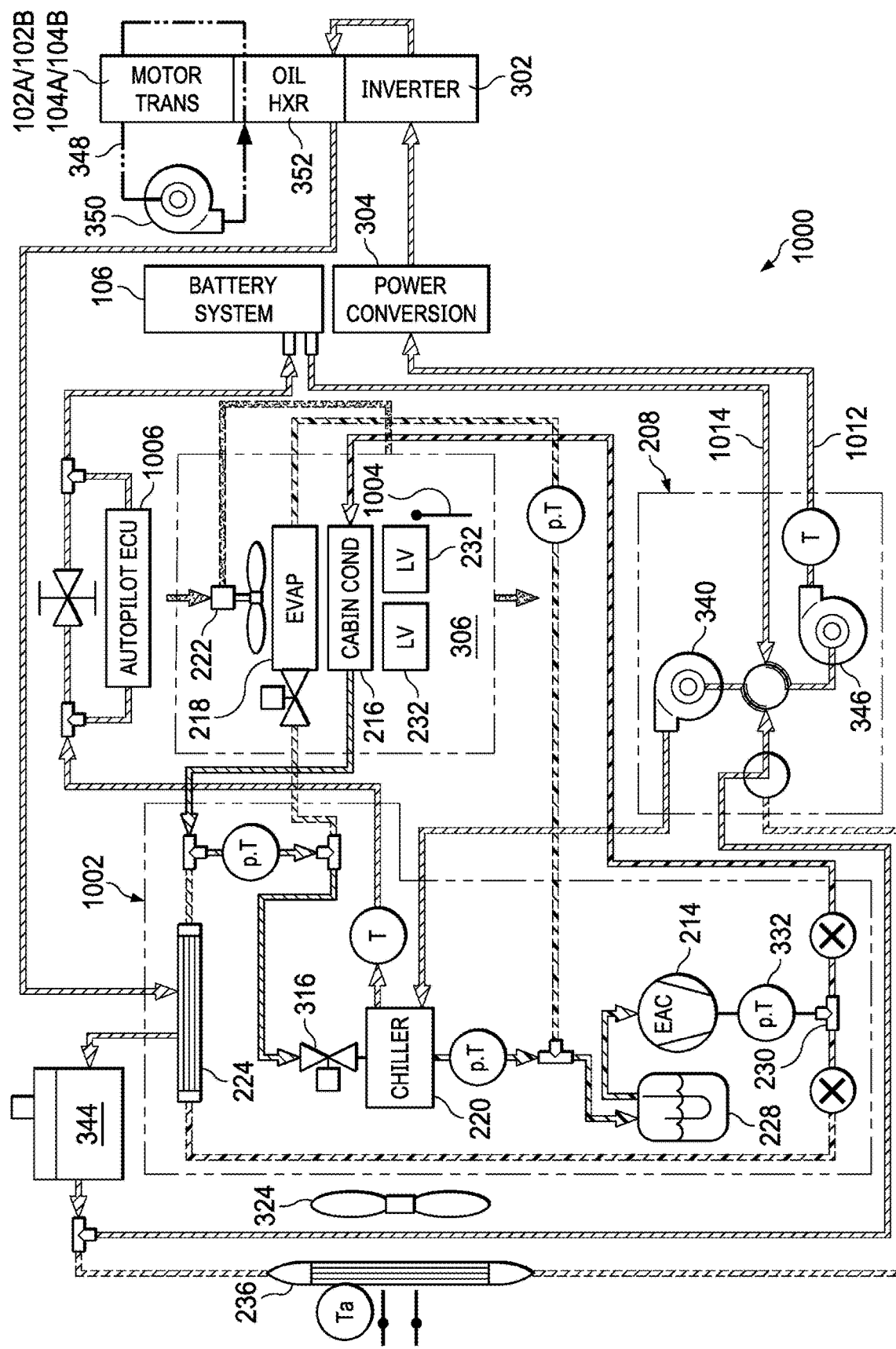
FIG. 10 is a schematic diagram illustrating another vehicle thermal management system of a described embodiment configured in a first heating mode—pure vehicle heat pump system mode serving the cabin.

FIG. 10 is a schematic diagram illustrating another vehicle thermal management system of a described embodiment configured in a first heating mode—pure vehicle heat pump system. In this first heating mode, the vehicle heat pump system 202 draws heat from the battery system coolant loop 204, which is in-turn thermally connected to the drive train coolant loop 206, and efficiently (COP>>1) heats the cabin to maximize range. The battery system 106 and drive train components naturally produce thermal energy while driving; this low-grade thermal energy serves as the primary heat source and is considered to be "free" from a cycle efficiency perspective—it is produced whether or not a vehicle heat pump system 202 is present. The battery system 106, drive unit, and other large components with thermal connectivity to the coolant loops 204 and 206 also serve as sources whenever they are warmer than ambient in a similarly "free" manner. The cabin is the sink, and the load is proportional to comfort needs.

The battery system coolant loop 204 and the drive train coolant loop 206 are typically placed in series by the coolant valve system 208 when the components of the loops 204 and 206 are comparable in temperature; otherwise, the valve 208 state is parallel, which isolates the battery system 106 from the rest of the coolant loop. Parallel operation of the coolant loops 204 and 206 is useful when the battery system 106 has been preconditioned or is otherwise warmer than the rest of the components of the loops. The "low-side" of the vehicle heat pump system 202 cycle cools the battery system coolant loop 204 via the refrigerant to battery coolant loop chiller 220. The vehicle heat pump system 202 cycle runs in sub-cool control mode, partially filling the accumulator 228 with liquid refrigerant mixed with oil; this provides enhanced chiller 220 performance and oil return. The compressor 214 operates in a normal, maximum efficiency mode. The "high-side" of the vehicle heat pump system 202 cycle delivers higher-temperature thermal energy to the cabin via the refrigerant to air cabin condenser 216. The refrigerant 3-way valve 230 routes all of the compressor 214 discharge refrigerant to the cabin condenser 216. The cabin internal recirculation door/duct 234 is closed (nominal state), the global recirculation state can be either fresh or recirculation, and the cabin blower 222 runs in an efficient mode. The low-voltage cabin air-heater 232 is off.

Figure 11:
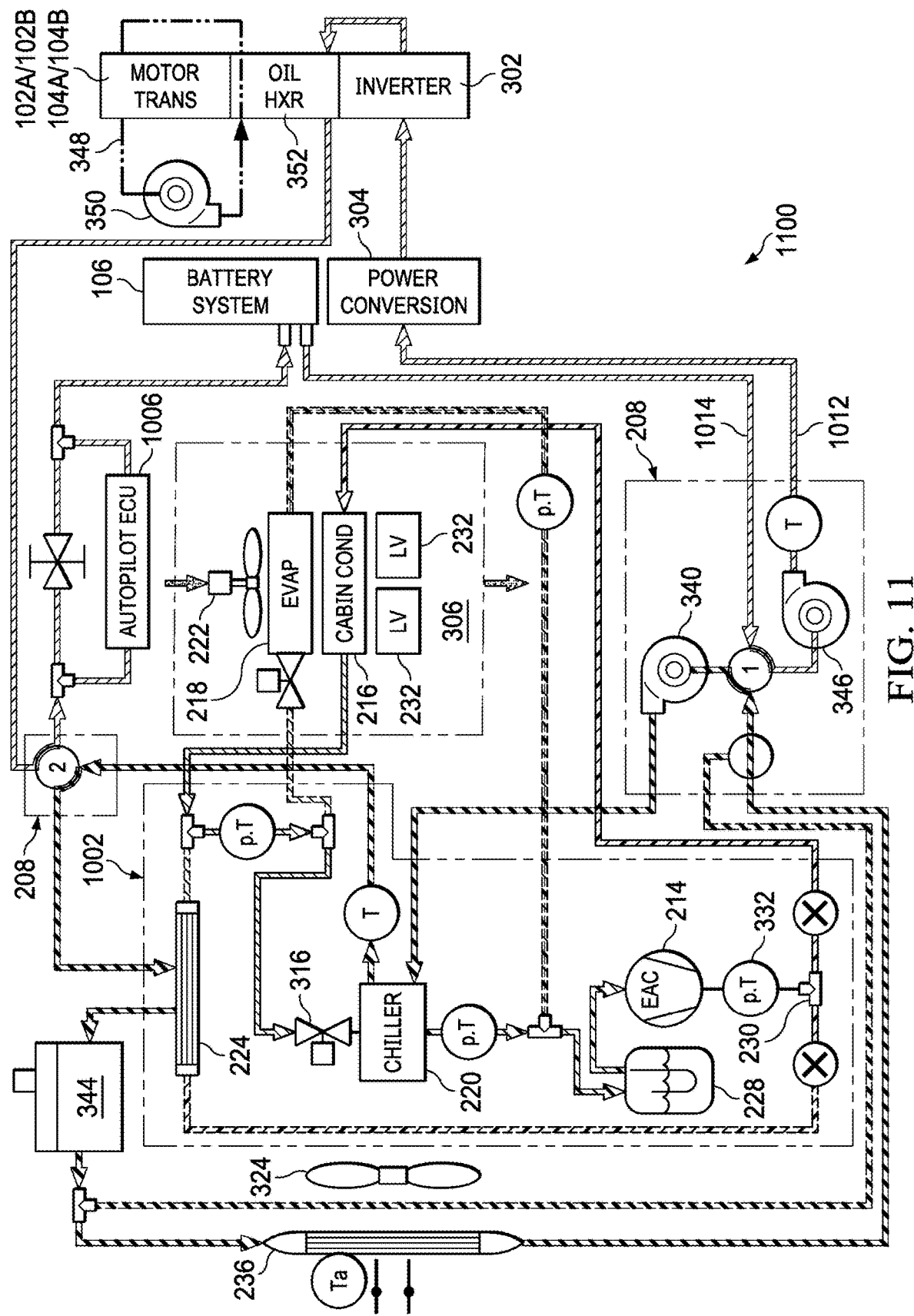
FIG. 11 is a schematic diagram illustrating the vehicle thermal management system of FIG. 10 configured in a first heating mode—pure vehicle heat pump system mode with an eight-way valve directing coolant flow serving the cabin.

FIG. 11 is a schematic diagram illustrating the vehicle thermal management system of FIG. 10 configured in a first heating mode—pure vehicle heat pump system mode with an eight-way valve directing coolant flow serving the cabin. The recirculating coolant variation on compressor 214 as a heater mode also adds a new mode wherein the vehicle heat pump system 202 can source directly from ambient without impacting the battery system coolant loop 204. The 8-way valve 208 position places the chiller 220, a pump, a drive train liquid-cooled condenser 224 (inactive) and the radiator 236 in a closed loop. The chiller 220 cools this loop down until the temperature is less than ambient air flowing over the radiator 236. Thermal energy from ambient is therefore sourced from the radiator 236, flowing into the vehicle heat pump system 202. Useful net heating at COP>1 flows into the cabin via the cabin condenser 216. Critically, the valve 208 places the battery system 106 and drive unit on a separate loop, enabling normal waste heat and natural warm-up of the battery system 106.

Figure 12:
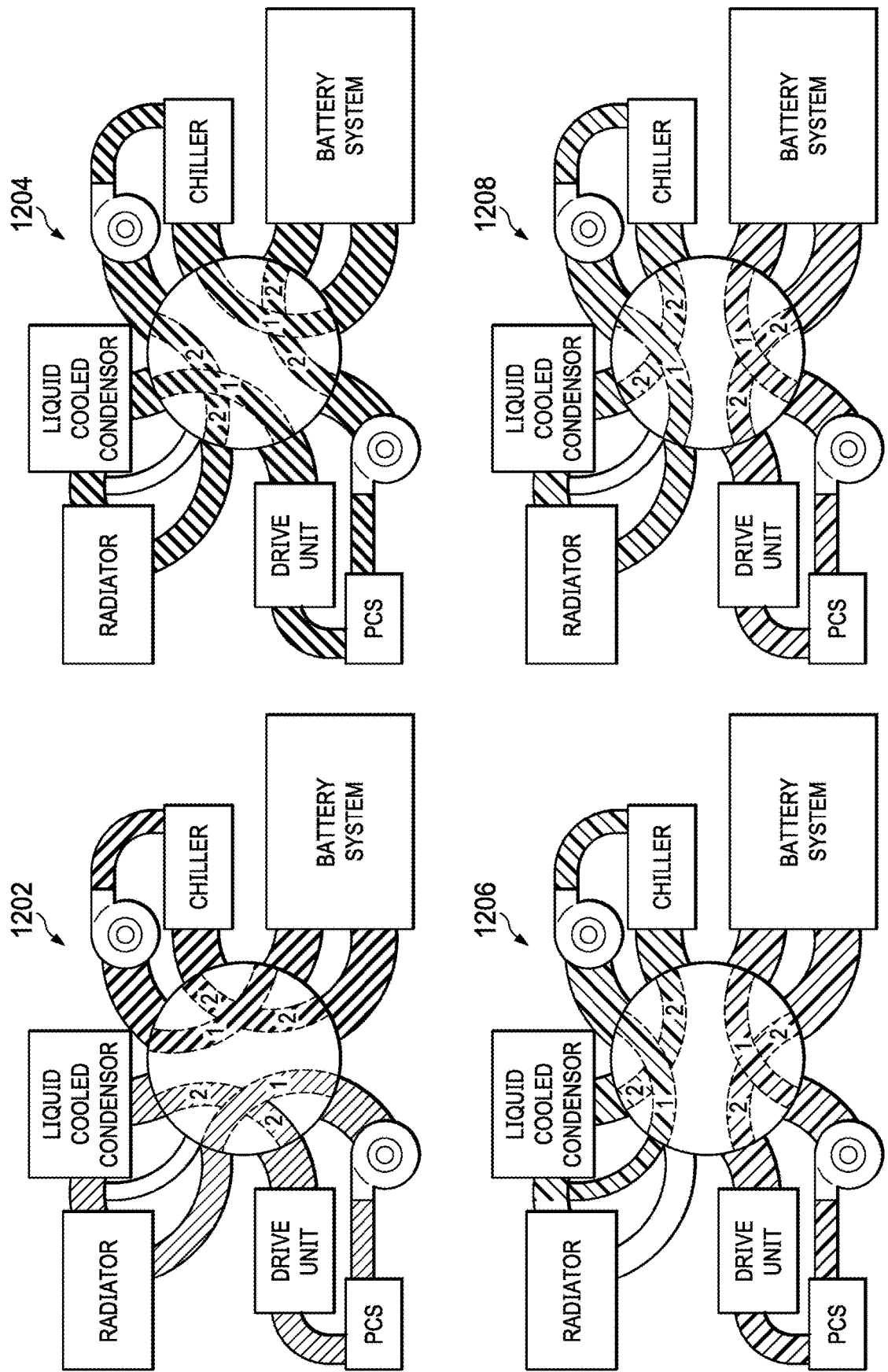
FIG. 12 is a schematic diagram illustrating four differing configurations of an eight-way valve directing coolant flow according to embodiments of the present disclosure.

FIG. 12 is a schematic diagram illustrating four differing configurations of an eight-way valve directing coolant flow according to embodiments of the present disclosure. A first configuration 1202 is normal parallel, with the battery system coolant loop 204 and the drive train coolant loop 206 operating in parallel. A second configuration 1204 is normal series, with the battery system coolant loop 204 and the drive train coolant loop 206 operating in series. A third configuration 1206 is a mode in which the compressor 214 operates as a heater with recirculating coolant. A fourth configuration 1208 is with the heat pump operating to source heat from the ambient air via the radiator 236, with the ambient air being modestly cold.

Figure 13:
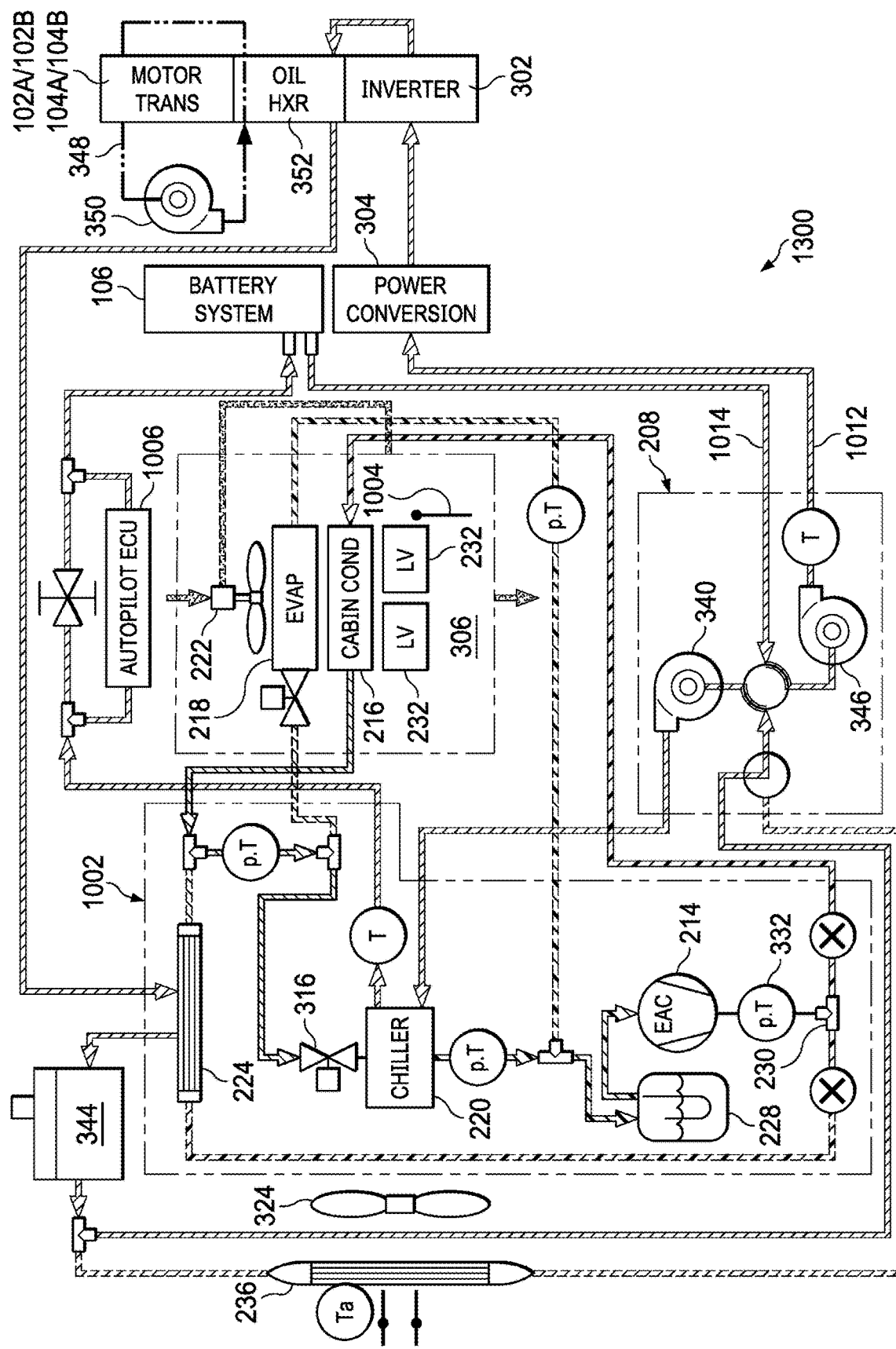
FIG. 13 is a schematic diagram illustrating the vehicle thermal management system of FIG. 10 configured in a second heating mode—sourcing battery heat and utilizing a low voltage electric cabin heater to provide supplemental heating to the cabin.

FIG. 13 is a schematic diagram illustrating the vehicle thermal management system of FIG. 10 configured in a second heating mode—blended vehicle heat pump system mode extracting moisture from the cabin. In the second heating mode of FIG. 13, the vehicle heat pump system 202 cycle runs in a blended mode, partly sourcing from the battery system coolant loop 204 as in the first heating mode, but also partly using electrical power directly from the LV cabin heater 232. The effective COP of the second heating mode of FIG. 13 depends on the relative utilization of the chiller 220 (COP>>1) and the LV cabin heater 232 (COP=1). The objective is to either provide more cabin heating than is available from the first mode (e.g., battery system coolant loop 204 is too cold to meet the comfort heating needs), or to allow the battery system 106 to heat up more rapidly by drawing less energy from the battery system coolant loop 204. The configuration is the same as the first heating mode, with the exception that the LV cabin heater 232 is now active. This mode is also needed whenever the passenger and the driver comfort requests differ; the LV cabin heater 232 cores can provide left/right differential heating.

Figure 14:
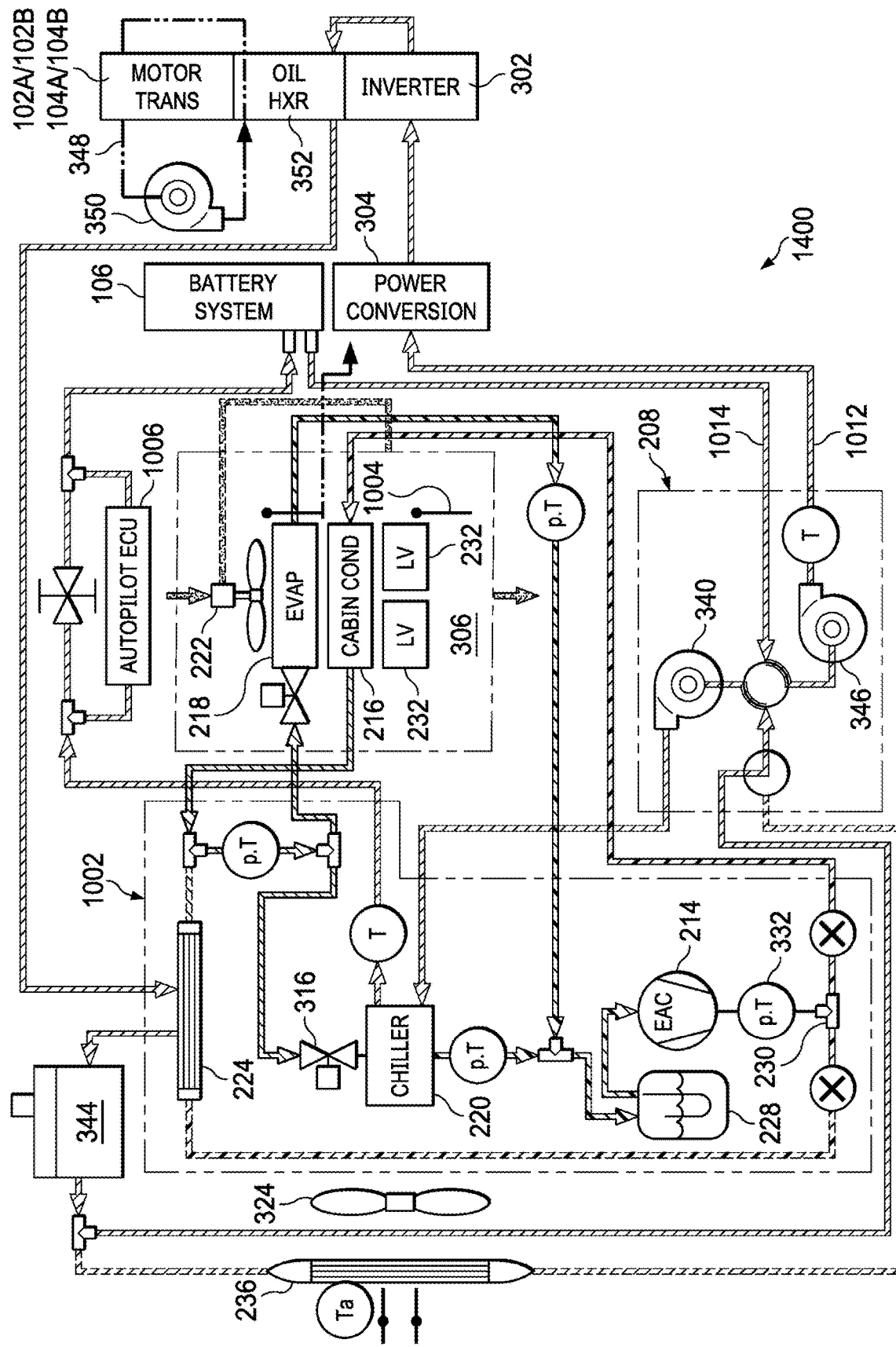
FIG. 14 is a schematic diagram illustrating the vehicle thermal management system of FIG. 10 configured in a second heating mode—blended vehicle heat pump system mode extracting some energy from ambient air, and some from the battery to heat the cabin.

FIG. 14 is a schematic diagram illustrating the vehicle thermal management system of FIG. 10 configured in a second heating mode—blended vehicle heat pump system mode extracting some energy from ambient air, and some from the battery to heat the cabin. With the alternative blending mode of FIG. 14, a cabin evaporator 218 outlet air extractor resides inside the HVAC case. This enables the vehicle heat pump system 202 to partially source ambient air; cold exhaust is rejected to ambient instead of going into the cabin. However, since not all of the cold air can be diverted (unless a more complex internal ducting scheme is implemented), some of it enters the cabin. The portion of the air that is not rejected to ambient essentially contributes at COP=1, or compressor 214 as heater mode. Therefore, this overall mode is considered to be a blend, where the relative amounts of cold air rejected to ambient via the new extractor vs. sent into the cabin sets the blending ratio between COP>>1 and COP=1 states.

Figure 15:
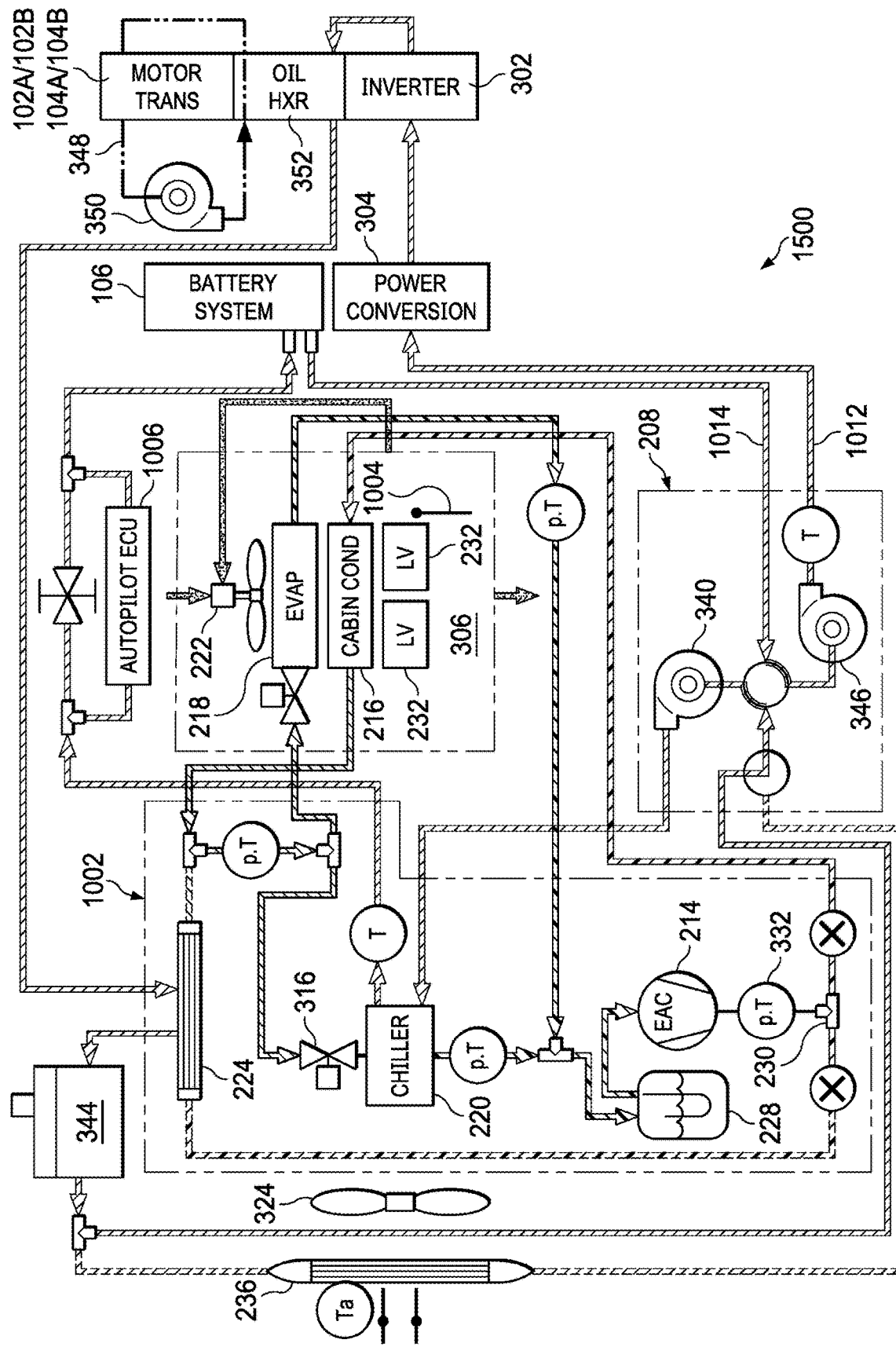
FIG. 15 is a schematic diagram illustrating the vehicle thermal management system of FIG. 10 configured in a third heating mode—blended vehicle heat pump system mode extracting heat from the battery system, using the low voltage electrical heater, and using the evaporator/HVAC case in an internally recirculating mode.

FIG. 15 is a schematic diagram illustrating the vehicle thermal management system of FIG. 10 configured in a third heating mode—blended vehicle heat pump system mode extracting heat from the battery system, using the low voltage electrical heater, and using the evaporator/HVAC case in an internally recirculating mode. In the third heating mode of FIG. 15, the vehicle heat pump system 202 cycle builds on the blend capability of the second mode to provide even more heating power for the cabin. If the LV cabin heater 232 and the available pure vehicle heat pump system 202 chiller 220 sourcing are insufficient, the third heating mode activates the cabin evaporator 218 and the internal recirculation duct in order to consume more compressor 214 power; the net effect is to provide more incremental COP=1 heating to the cabin. The third heating mode is considered a blend state because there is finite chiller 220 load, which contributes at COP>>1. Efficiency is compromised in order either to help heat the battery system 106 or to meet high comfort load needs but is still higher than a baseline LV cabin heater 232. The configured state of mode three is the same as mode two, with the exception that the cabin evaporator 218 is active and the internal recirculation duct is not fully closed. The cabin evaporator 218 cools the incoming air stream, which is now a mix of either global fresh/recirculation air from the cabin and cabin condenser 216 exhaust. This additional cooling load on the refrigeration cycle causes the compressor 214 to consume more power, and both the cabin evaporator 218 cooling and additional compressor 214 power appear energetically at the cabin condenser 216. Therefore, the cooling cancels out, leaving only an incremental additional compressor 214 power load to augment cabin heating (at COP=1). The internal recirculation duct actuator serves as a metering device, routing more air internally as needed to move the compressor 214 cycle closer to the limit. Sub-cool control is the default cycle scheme, but superheat arbitration may be required when the temperature levels of the battery system 106 and the cabin differ significantly.

Figure 16:
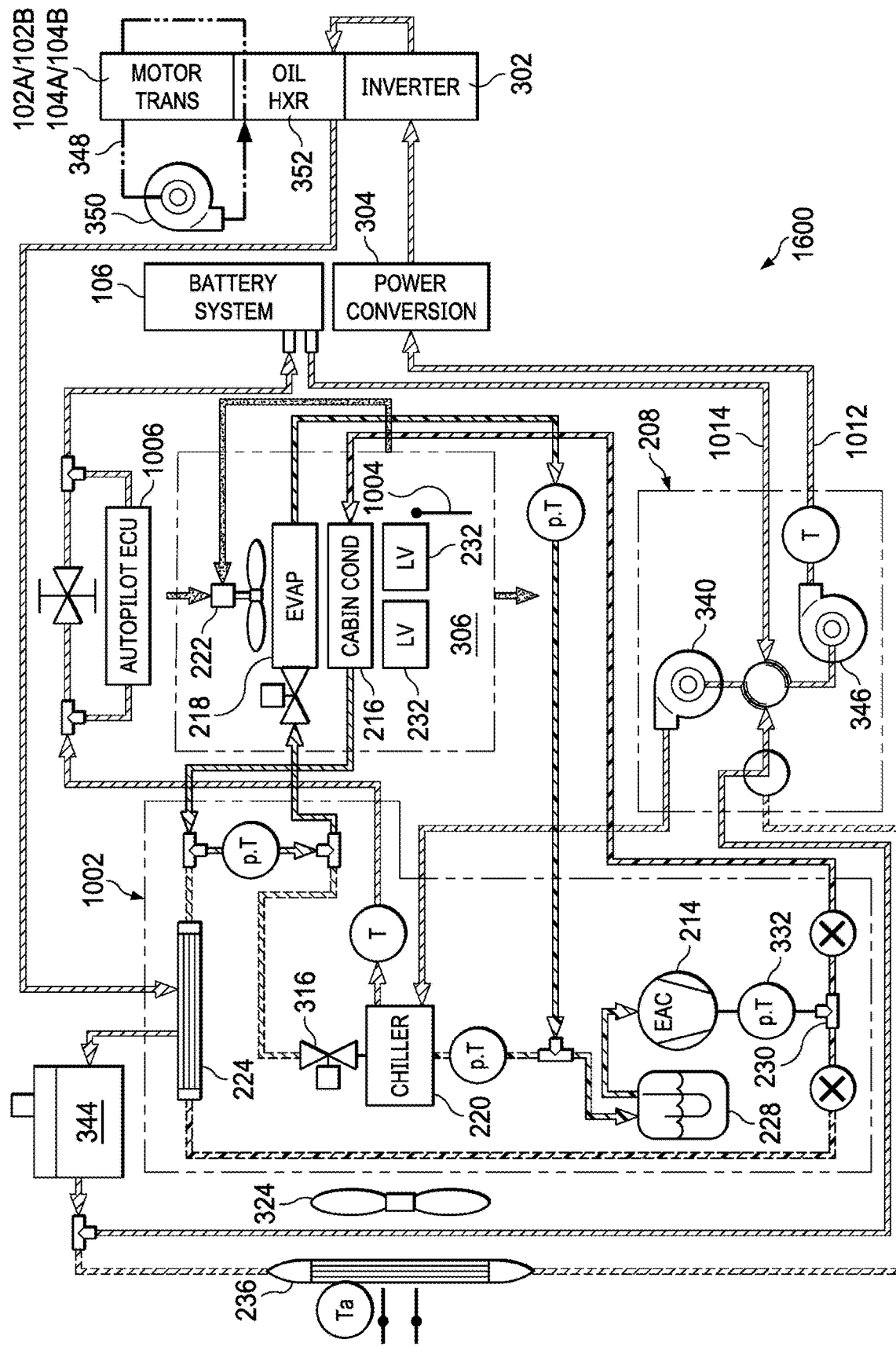
FIG. 16 is a schematic diagram illustrating the vehicle thermal management system of FIG. 10 configured in a fourth heating mode—the compressor configured as a heater to heat the cabin.

FIG. 16 is a schematic diagram illustrating the vehicle thermal management system of FIG. 10 configured in a fourth heating mode—the compressor configured as a heater to heat the cabin. The fourth heating mode configures the vehicle heat pump system 202 cycle in such a way as to provide COP=1 heating power without interacting with the battery system coolant loop 204. The objective is to provide high heating capacity to the cabin in extreme ambient conditions, e.g., when the battery system coolant loop 204 is so cold that sourcing from it would not be feasible. This mode isolates the refrigeration cycle (critically the suction side) from extreme cold and quickly enables high heating power at COP=1. Using the novel internal HVAC case internal recirculation duct, a controllable amount of air-flow (actuated door) leaving the cabin condenser 216 is directed back to the cabin evaporator 218. The heating/cooling partially cancel out and energetically only the compressor 214 work is net delivered to the cabin. Therefore, the compressor 214 is thermodynamically placed inside the cabin acting as if it were a high-voltage heater, even though it physically resides outside the cabin; this permits removal of the high voltage cabin air heater. The sources are the cabin air, the LV cabin heater 232, and incremental electrical power consumed by either the compressor 214 or the compressor 214 and the cabin blower 222 configured in a deliberately inefficient state as described above. The cycle configured state is the same as the third heating mode, with the exception that the chiller 220 is inactive (no thermal connection to the battery system coolant loop 204), and the compressor 214/cabin blower 222 are configured in a deliberately inefficient mode in order to consume more electrical power to heat the cabin. The internal duct control is critical; too much internal air recirculation could starve the cabin of air-flow and lead to a poor comfort experience or fogging, but too little internal air recirculation could "snuff out" the exponential feed-back during startup. The optimal internal recirculation maximizes cycle heating power while maintaining minimum comfort needs during startup. As discussed earlier, the accumulator 228 and EXV control maximizes flooding (within compressor 214 limits) for max power.

Figure 17:
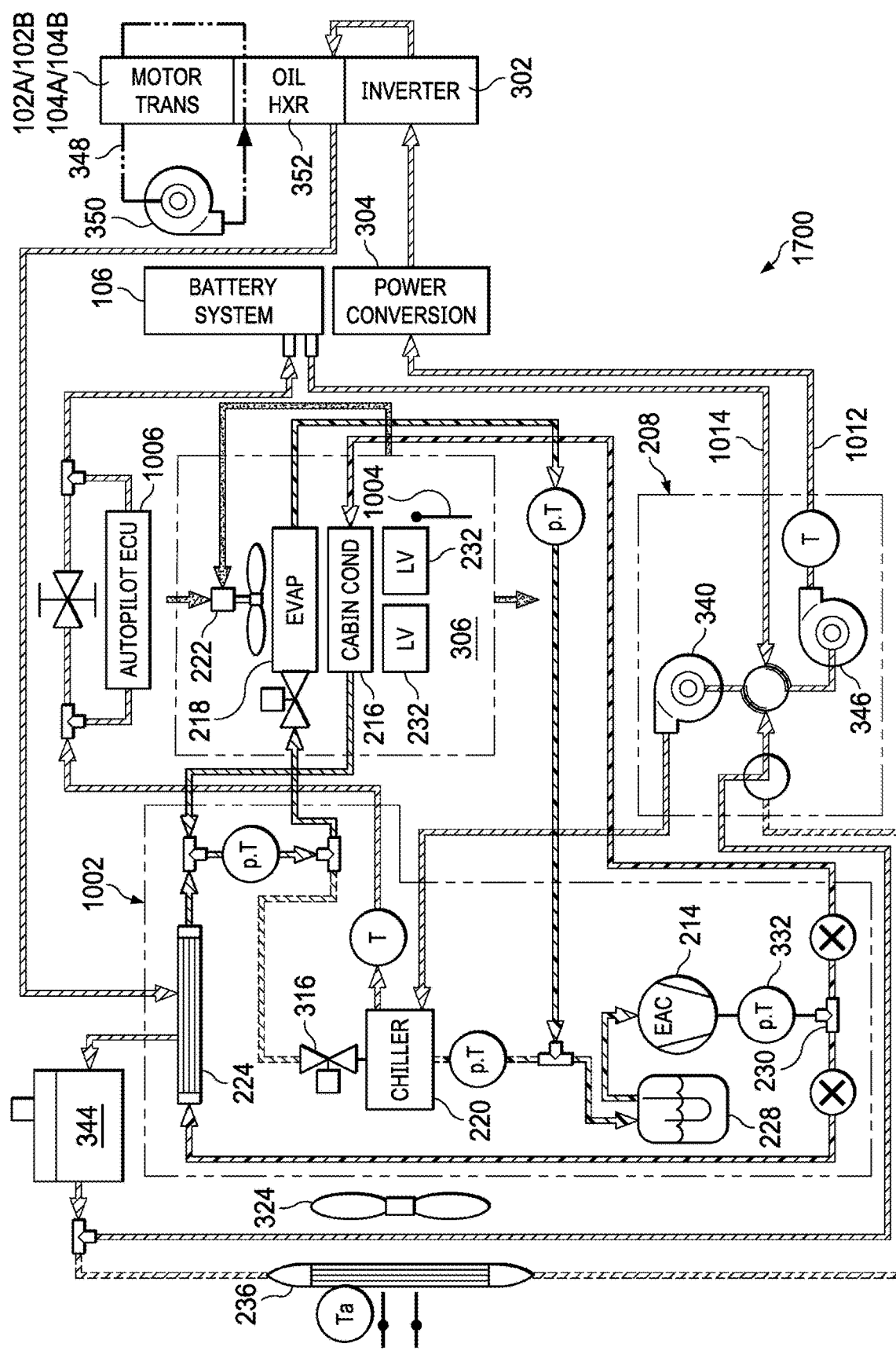
FIG. 17 is a schematic diagram illustrating the vehicle thermal management system of FIG. 10 configured in a fifth heating mode—the compressor configured as a heater to heat the cabin and the battery system.

FIG. 17 is a schematic diagram illustrating the vehicle thermal management system of FIG. 10 configured in a fifth heating mode—the compressor configured as a heater to heat the cabin and the battery system. The fifth heating mode is similar to the fourth heating mode; if excess heating power is available (cycle not at a limit, comfort needs met), the drive train refrigerant to drive train liquid-cooled condenser 224 can be activated to help heat the battery system 106. The objective is to assist battery system 106 heating, typically to enable/improve charging or improve discharge power/regen. The cycle configuration is the same as the fourth heating mode, with the exception of the drive train liquid-cooled cabin condenser 216 (now active) and the refrigerant 3-way valve 230 (splitting hot refrigerant between the cabin and the battery system coolant loop 204). The 3-way valve 230 is controlled in such a way as to ensure sufficient cabin heating, e.g., by only directing hot refrigerant to the liquid-cooled cabin condenser 216 when excess heating power is present. The internal HVAC case recirculation door/duct 234 and the compressor 214 dictate the overall heating power.

Figure 18:
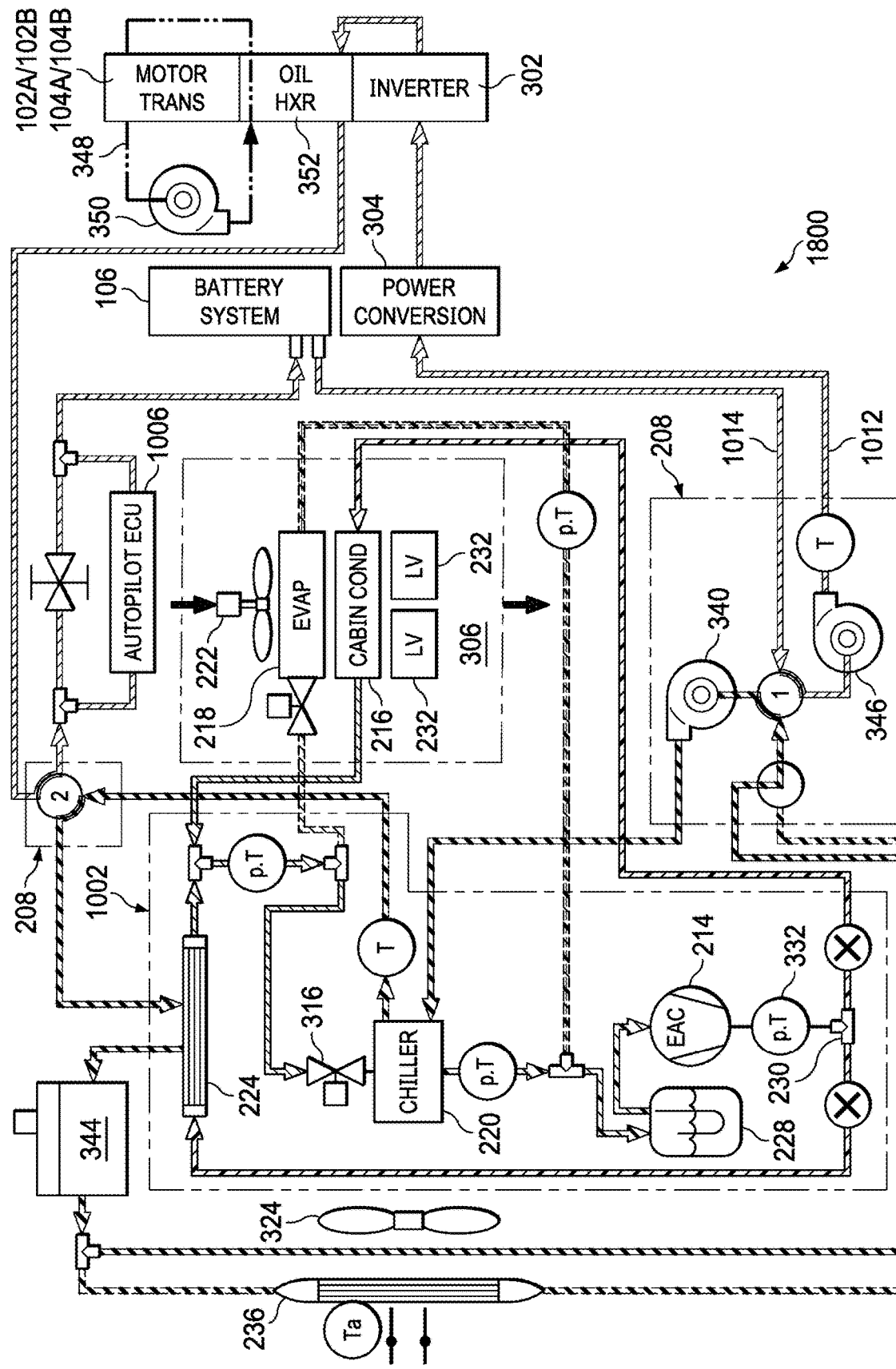
FIG. 18 is a schematic diagram illustrating the vehicle thermal management system of FIG. 10 configured in a heating mode with recirculating coolant mode using an 8-way valve to heat the cabin and/or battery.

FIG. 18 is a schematic diagram illustrating the vehicle thermal management system of FIG. 10 configured in a heating mode with recirculating coolant mode using an 8-way valve to heat the cabin and/or battery. The 8-way valve 208 is configured in such a way as to place the chiller 220, a pump, the drive train liquid-cooled condenser 224 (now active) in series and also bypass the radiator 236. The chiller 220 cools the recirculating loop, but the cabin condenser 216 is controlled (via the three-way refrigerant valve) in such a way as to exactly cancel this cooling load out. The remaining thermal energy is equal to the compressor 214 electrical power, and this heats the cabin via the cabin condenser 216. In order to also heat the battery system 106, the three-way valve is controlled to put more energy into the liquid-cooled cabin condenser 216 (beyond the chiller 220 draw) instead of the cabin, and the 8-way valve operates in a partial series/parallel state, mixing a small amount of hot coolant from the recirculating loop with colder coolant on the battery system coolant loop 204 and the drive train coolant loop 206.

Figure 19:
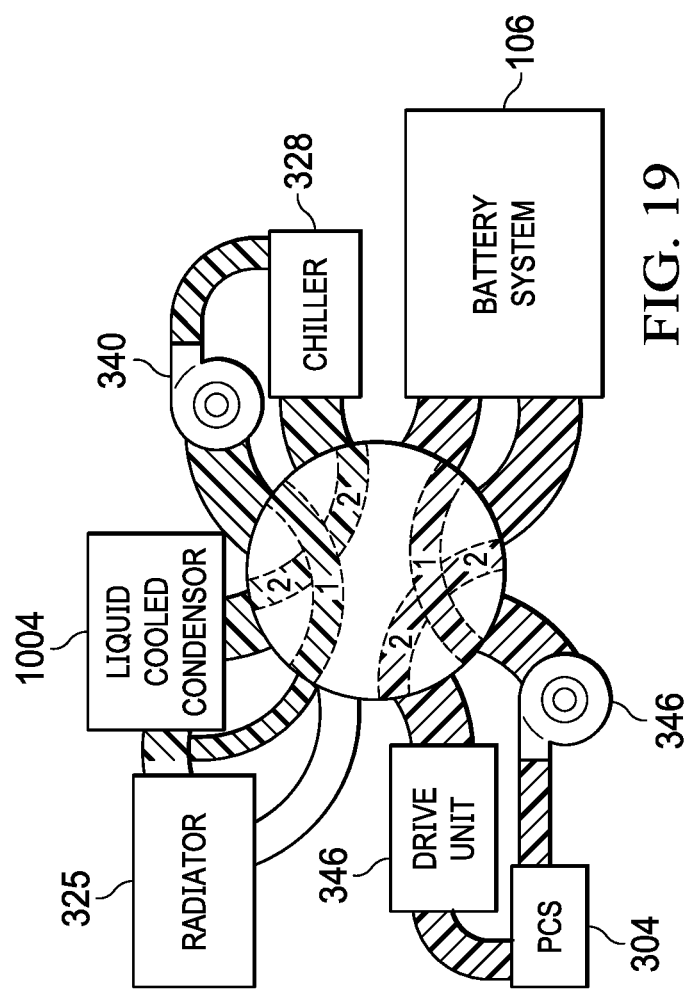
FIG. 19 is a schematic diagram illustrating the vehicle thermal management system of FIG. 18 with additional detail regarding the configuration of the 8-way valve.

FIG. 19 is a schematic diagram illustrating the vehicle thermal management system of FIG. 18 with additional detail regarding the configuration of the 8-way valve. As shown, the vehicle heat pump system 202 draws heat from the ambient but not from the radiator 236 while driving the compressor 214 in an inefficient mode so that it adds heat to the recirculating refrigerant. As is also shown, the battery system coolant loop 204 and the drive train coolant loop 206 operate in series without exchange of heat with the cabin heap pump system 202 via chiller 220.

Figure 20:
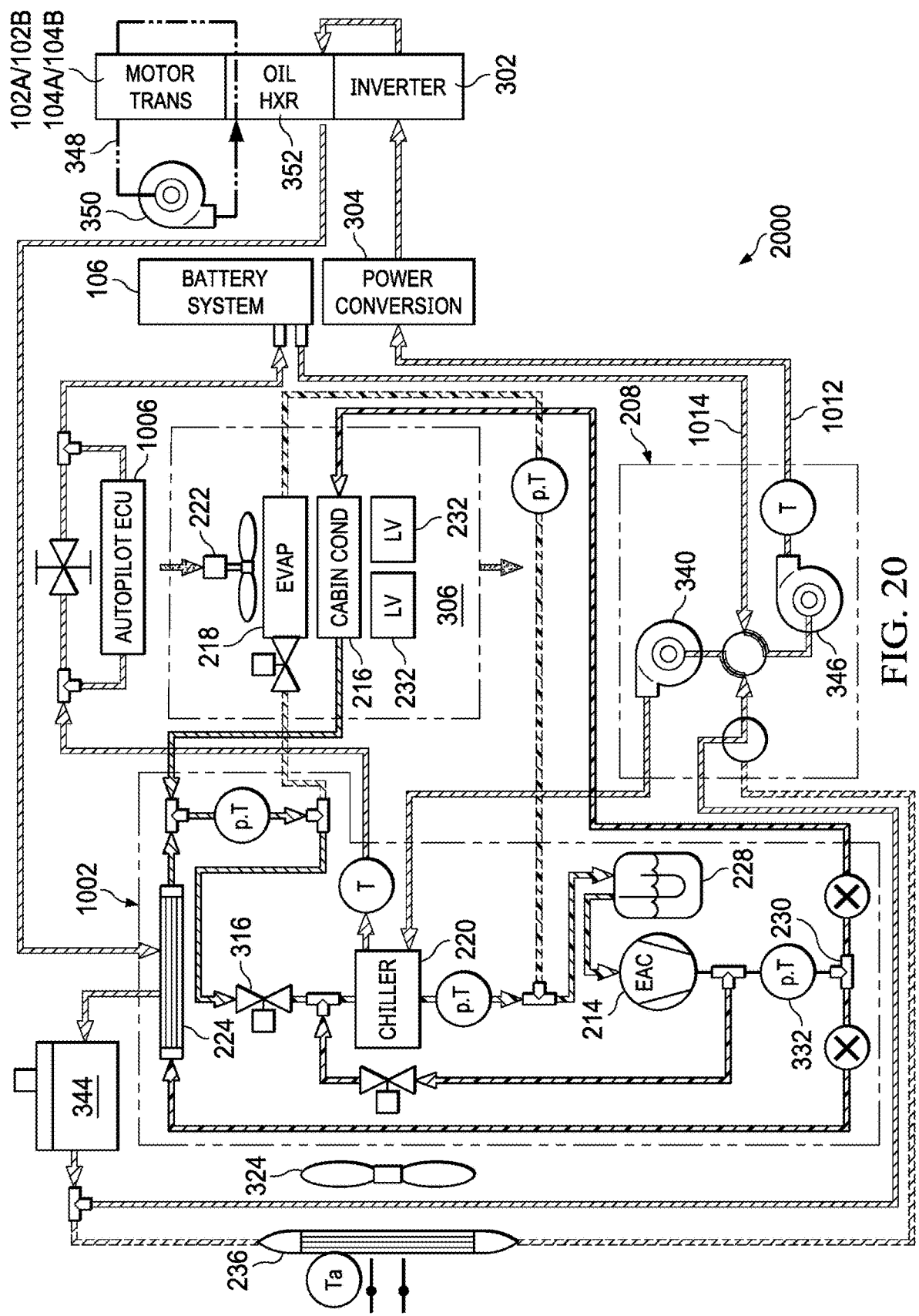
FIG. 20 is a schematic diagram illustrating the vehicle thermal management system of FIG. 10 configured in a heating mode with recirculating refrigerant to heat the cabin and/or battery.

FIG. 20 is a schematic diagram illustrating the vehicle thermal management system of FIG. 10 configured in a heating mode with recirculating refrigerant to heat the cabin and/or battery. The internal refrigerant recirculation valve is controlled in such a way as to exactly cancel out the apparent cooling power flowing through the chiller 220 and generate a mixed low-pressure state ranging from a vapor quality of 0.8 to superheated at the compressor 214 inlet. Since the recirculating advective energy flow exactly cancels the apparent cooling power in the chiller 220, the compressor 214 power is left to heat the cabin via the cabin condenser 216. The refrigerant three-way valve 230 can also send some of the available compressor 214 discharge refrigerant (e.g., net heating power) to the drive train liquid-cooled condenser 224 in order to help heat the battery system 106.

Figure 21A:
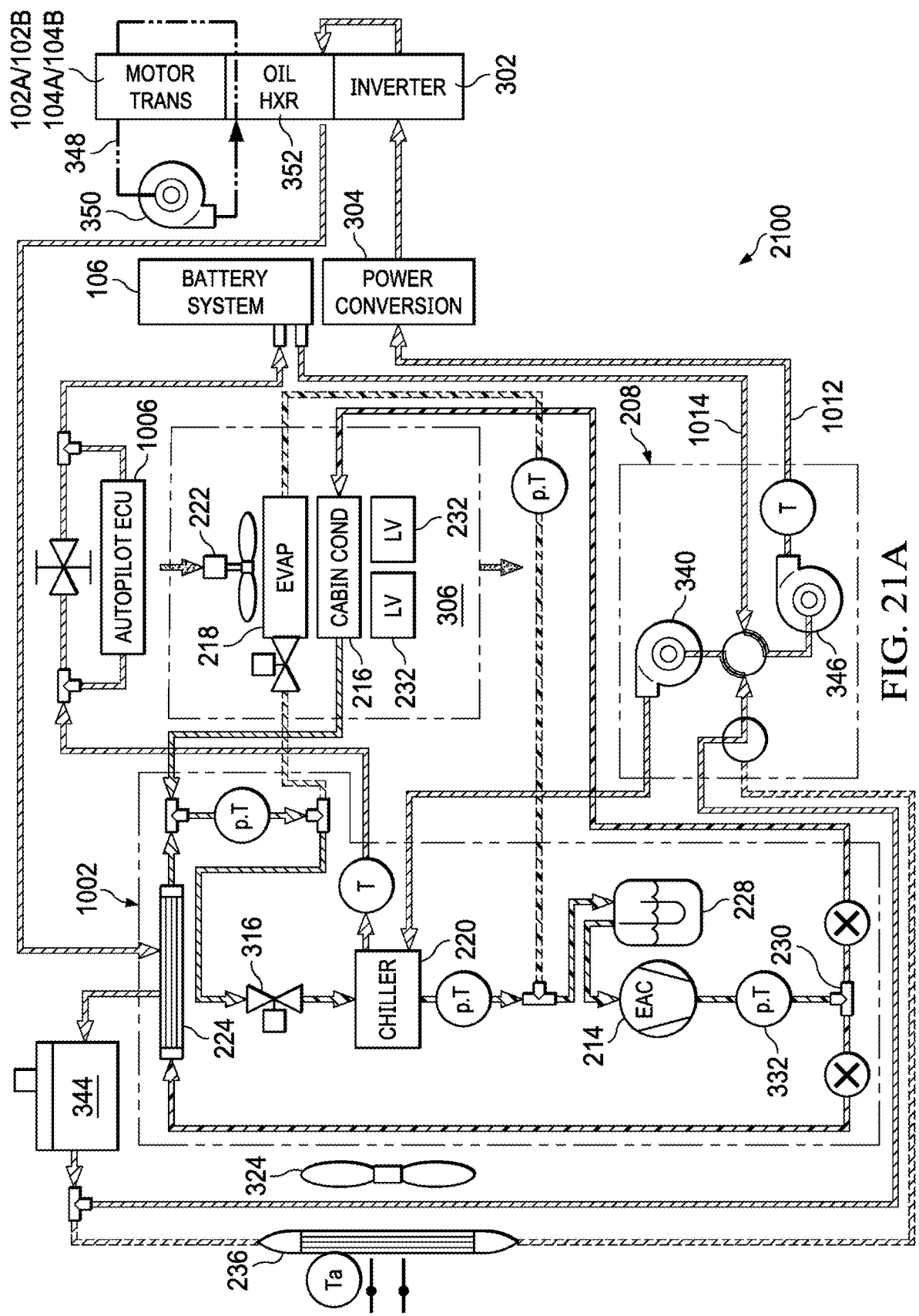
FIG. 21A is a schematic diagram illustrating the vehicle thermal management system of FIG. 10 configured in a heating mode with the compressor configured as a boiler to heat the cabin and/or battery.

FIG. 21A is a schematic diagram illustrating the vehicle thermal management system of FIG. 10 configured in a heating mode with the compressor configured as a boiler to heat the cabin and/or battery. High liquid-content refrigerant over-flows the accumulator 228 and enters the global scroll inlet of the compressor 214. There, it flows over the motor/inverter of the compressor 214 which is configured in an extreme version of waste heat mode to such an extent that it will fully boil the refrigerant before it enters the true scroll inlet of the compressor 214. The outlet of the compressor 214 can be routed either to the cabin condenser 216, the liquid-cooled cabin condenser 224 (for the battery system 106) or a combination of both.

Figure 21B:
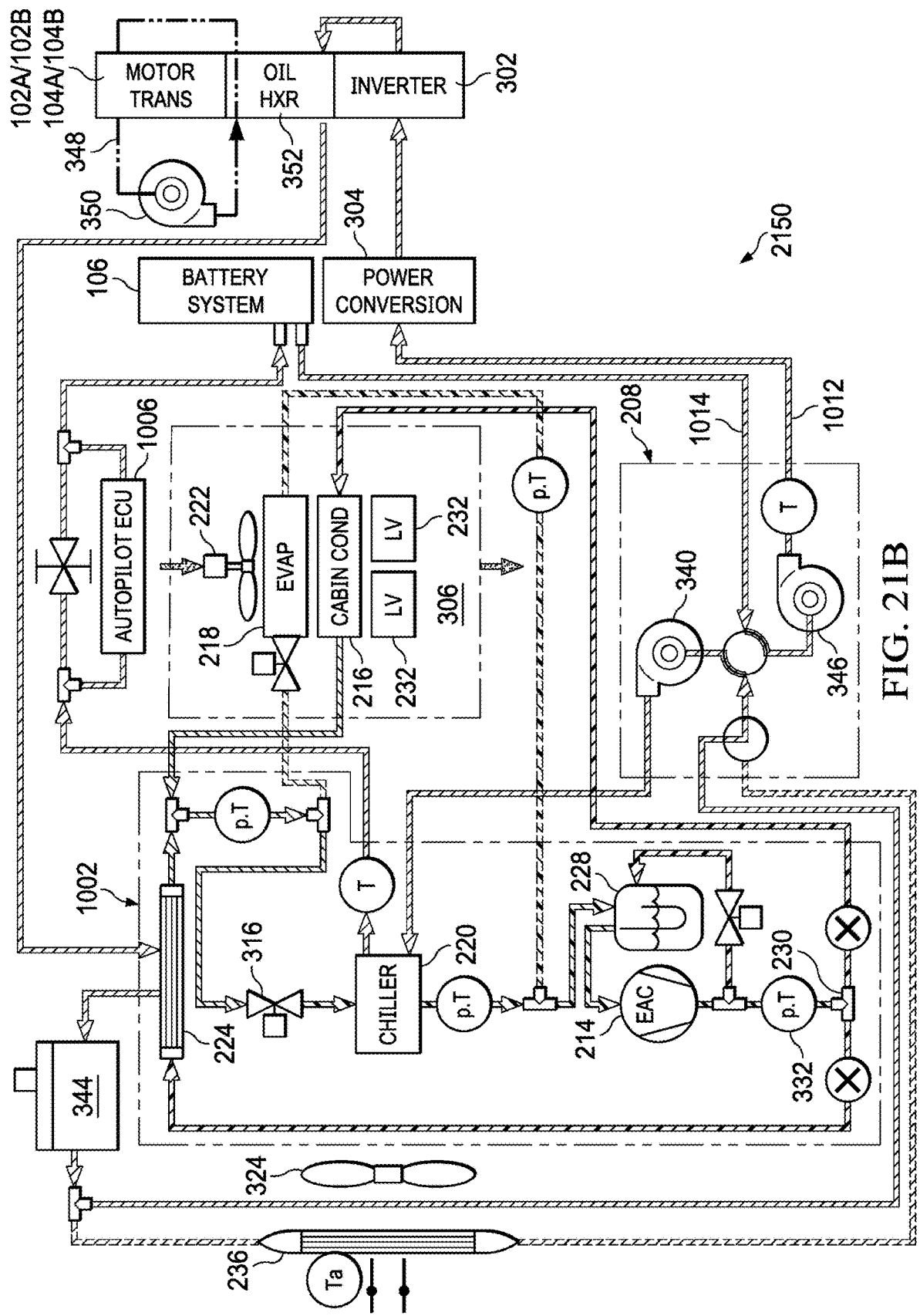
FIG. 21B is a schematic diagram illustrating the vehicle thermal management system of FIG. 21A configured in a heating mode with an alternative way of recirculating refrigerant to heat the cabin and/or battery.

FIG. 21B is a schematic diagram illustrating the vehicle thermal management system of FIG. 21A configured in a heating mode with an alternative way of recirculating refrigerant to heat the cabin and/or battery. The configuration of FIG. 21B is similar to the configuration of FIG. 21A but with the compressor 214 recirculating refrigerant to the accumulator 228.

Figure 22:
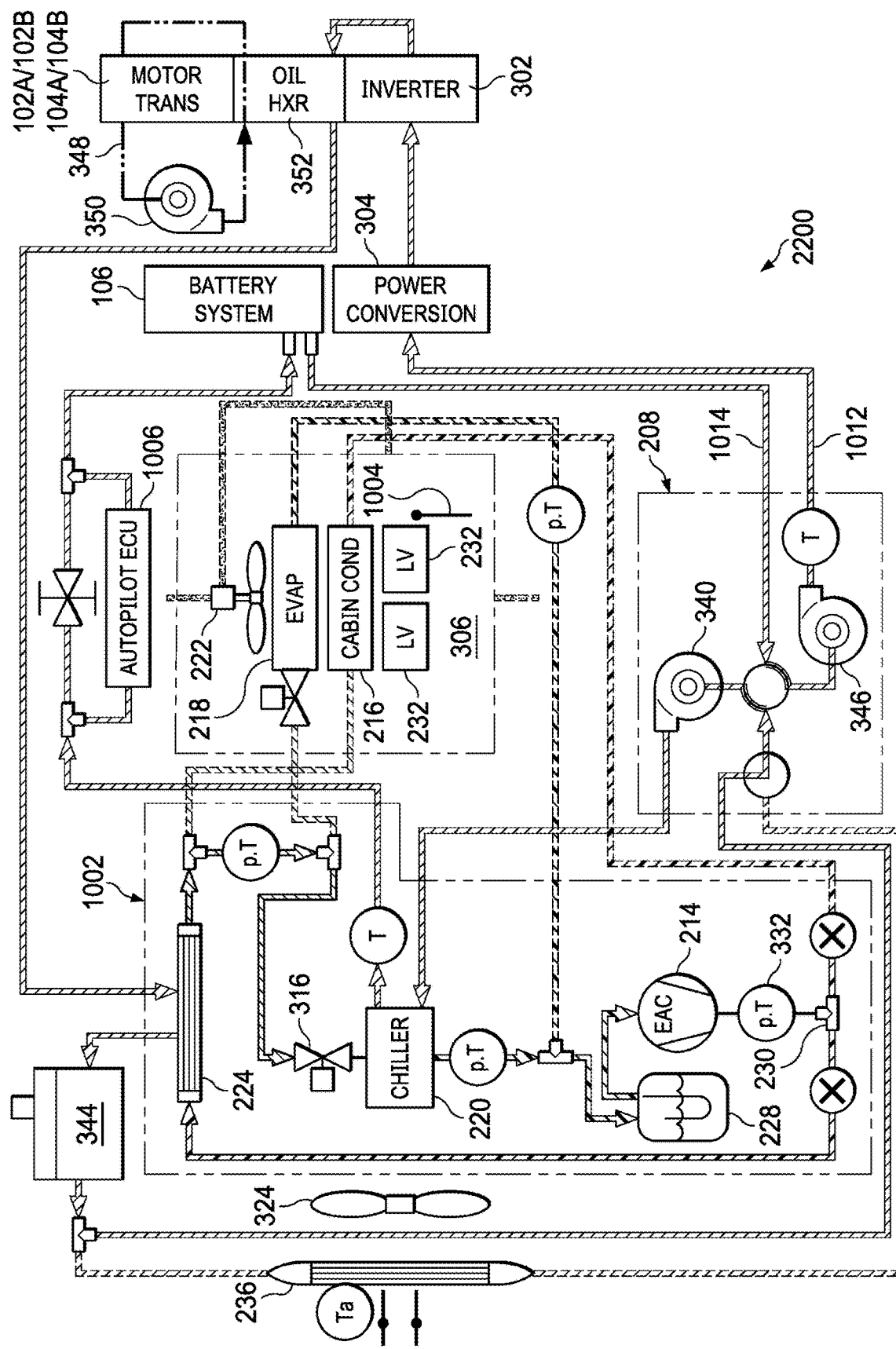
FIG. 22 is a schematic diagram illustrating the vehicle thermal management system of FIG. 10 configured in a sixth heating mode with the compressor configured as a heater for the battery system.

FIG. 22 is a schematic diagram illustrating the vehicle thermal management system of FIG. 10 configured in a sixth heating mode with the compressor configured as a heater for the battery system. As contrasted to the fourth and fifth heating modes, the sixth heating mode focuses purely on the battery system coolant loop 204 and isolates the cabin. The objective is to rapidly heat the battery system 106 in a compressor 214 as heater mode manner. This could be particularly useful when speed is priority, or when plugged into a charger in extremely cold ambient conditions. The heat source is the refrigerant and the heat sink is the battery system coolant loop 204 via chiller 220; but the sink is the refrigerant to drive liquid-cooled condenser 224. Since the five-way valve 208 allows the chiller 220 and drive train liquid-cooled condenser 224 to be thermally connected, this effectively works just as the fourth heating mode. Cooling from the chiller 220 is delivered to the drive train liquid-cooled condenser 224, cancelling out; the compressor 214 power consumption is therefore net heating the battery system coolant loop 204. The three-way refrigerant valve 230 directs all refrigerant to the drive train liquid-cooled condenser 224, and all components inside the cabin are inactive.

Figure 23:
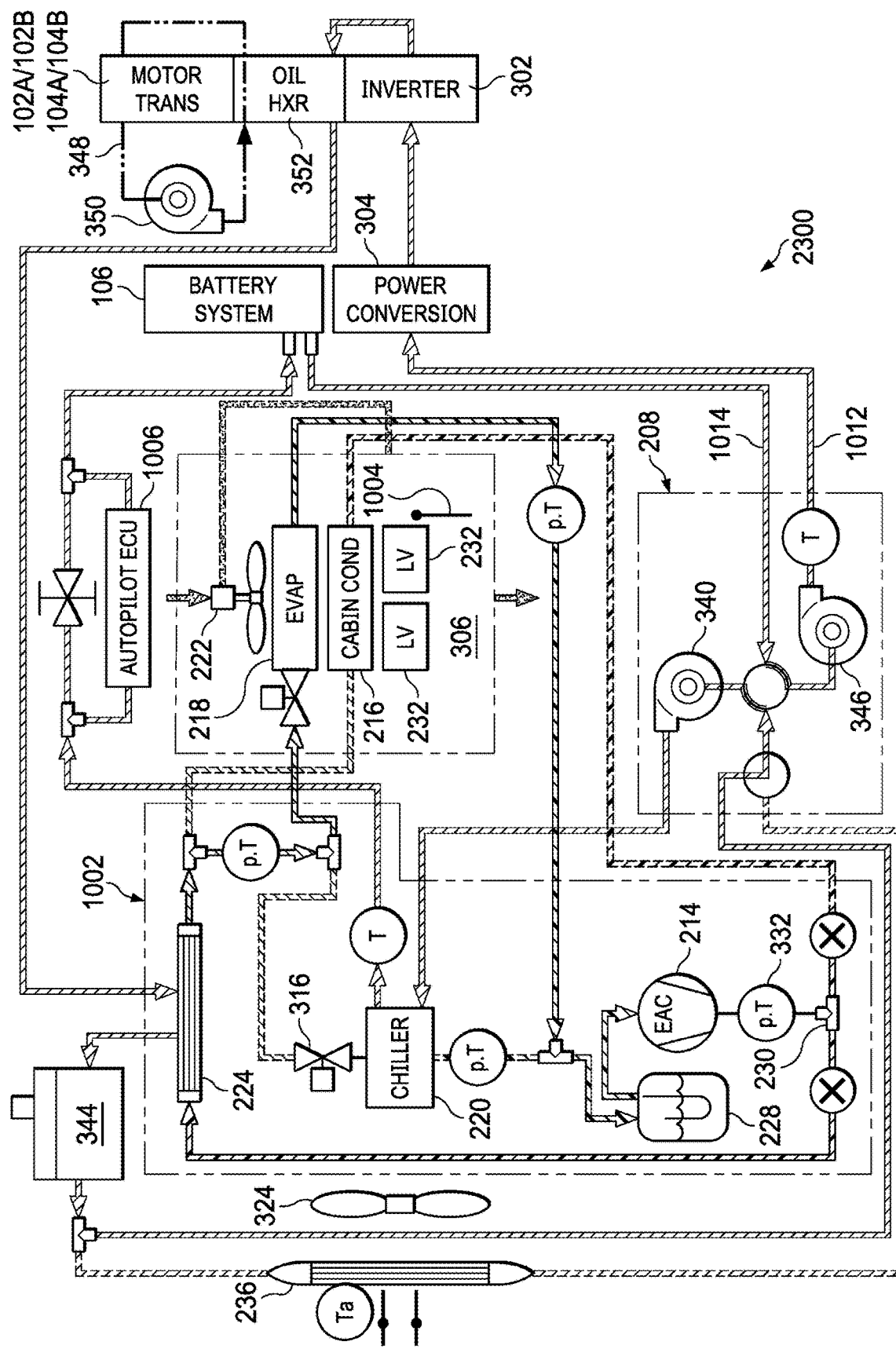
FIG. 23 is a schematic diagram illustrating the vehicle thermal management system of FIG. 10 configured in seventh and eighth heating modes supporting preconditioning with the battery system by sourcing ambient air via the cabin evaporator.

FIG. 23 is a schematic diagram illustrating the vehicle thermal management system of FIG. 10 configured in seventh and eighth heating modes supporting preconditioning with the battery system by sourcing ambient air via the cabin evaporator. The seventh heating mode applies during precondition states, e.g., before or after a drive. The goal is to efficiently heat the battery system 106 by sourcing ambient air via the cabin evaporator 218 (COP>>2) at relatively low load/pressure ratio. This would likely be used when plugged into a charger but is efficient enough such that it could be viable even when not plugged in, e.g., it is still likely a net positive range value add because of the high efficiency of the vehicle heat pump system 202 cycle in this low-pressure ratio state. A preheated battery system 106 is inherently useful for battery performance (DC resistance, regen, discharge power, charging capability), but it can also serve as a thermal storage medium to be used as a source to heat the cabin while driving, e.g., in the first through thirds heating modes. Ambient air serves as the source, flowing through the HVAC case (in fresh) through the cabin evaporator 218 (where it is cooled by refrigerant) and exits via the air extractors. This places the cabin slightly below ambient temperature, so care must be taken to provide enough time to either flood the cabin with fresh ambient air or initiate a cabin preconditioning routine before a driver returns. The drive train liquid-cooled cabin condenser 216 serves as the sink, which is thermally connected to the battery system coolant loop 204 via the 5-way valve 208 (series). The compressor 214 operates in a normal, maximum efficiency mode. The refrigerant 3-way valve 230 routes all flow to the drive train liquid-cooled condenser 224, and the accumulator 228 is active (sub-cool mode).

The eighth heating mode differs from to the seventh heating mode in that cabin air is recirculated within the cabin. The eighth heating mode, while nearly identical to the seventh heating mode, applies transiently after a drive when the cabin is warm and a return trip is not expected for at least an hour. The objective is to recover high temperature thermal energy from a warm cabin and store it in the battery system 106, rather than letting it quickly escape to ambient. Since the cabin and battery system 106 temperatures are comparable, the efficiency is extremely high. The configured state of the vehicle heat pump system 202 cycle is the same as in the seventh heating mode, with the exception that the cabin is in a global recirculation mode, sealing in as much thermal energy as possible while the vehicle heat pump system 202 transfers it to the battery system 106. Although the seventh heating mode can generally run in a steady-state manner (indefinitely), the eighth heating mode runs for a finite period of time, depending on how thoroughly warmed the cabin thermal mass is at the end of the drive. The eighth heating mode is effective on time scales between the cabin and the battery system 106; if a return trip is too soon, it may have been better to leave the cabin alone, and if the return trip happens much too late, most of the energy recovered and stored in the battery system 106 escapes anyway.

Figure 24:
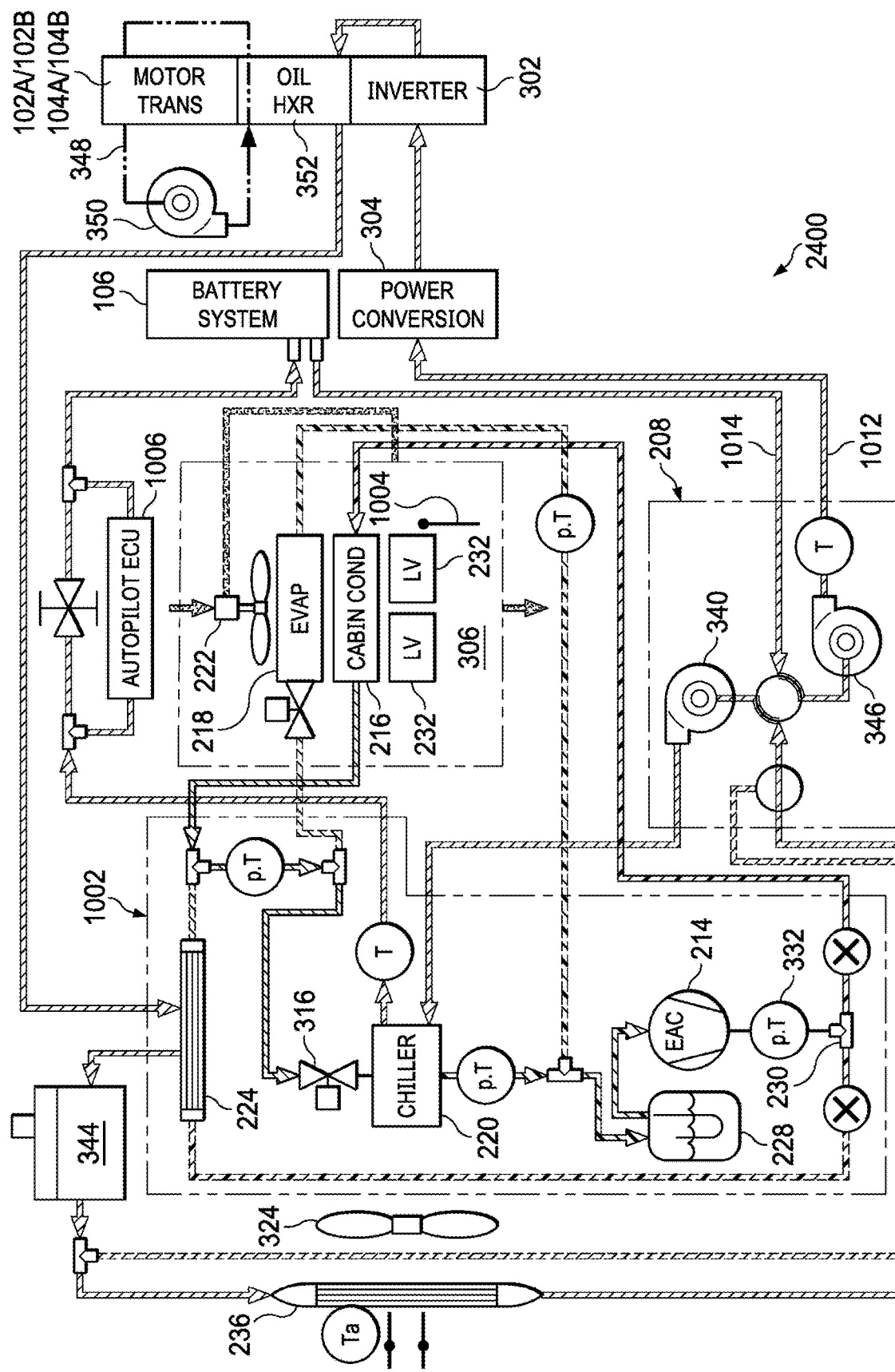
FIG. 24 is a schematic diagram illustrating the vehicle thermal management system of FIG. 10 configured in a ninth heating mode supporting preconditioning in efficiently heating the cabin collecting heat via the radiator.

FIG. 24 is a schematic diagram illustrating the vehicle thermal management system of FIG. 10 configured in a ninth heating mode supporting preconditioning in efficiently heating the cabin collecting heat via the radiator. The ninth heating mode provides an alternative way to precondition the cabin by directly sourcing ambient (rather than indirectly in a two-step process via the battery system 106). The objective is to efficiently precondition the cabin when the ambient temperature is modest, because this mode will result in a battery system 106 that is slightly cooler than ambient. The ambient serves as the source via the radiator 236. The battery coolant chiller 220 cools the battery system coolant loop 204, which is thermally connected to the drive train coolant loop via the 5-way valve. Therefore, the vehicle heat pump system 202 cycle sources ambient by chilling the coolant at the inlet of the radiator 236, and ambient air warms it back up. The compressor 214 operates in a normal, efficient mode. The cabin condenser 216 is the sink, providing heat to the cabin. The accumulator 228 is filled (sub-cool control) and the 3-way refrigerant valve routes all refrigerant to the cabin condenser 216. A concise way to read the diagram: ambient air provides heat to the radiator 236, which is in-turn sourced by the battery system coolant loop 204 chiller 220, and then delivered to the cabin.

Figure 25:
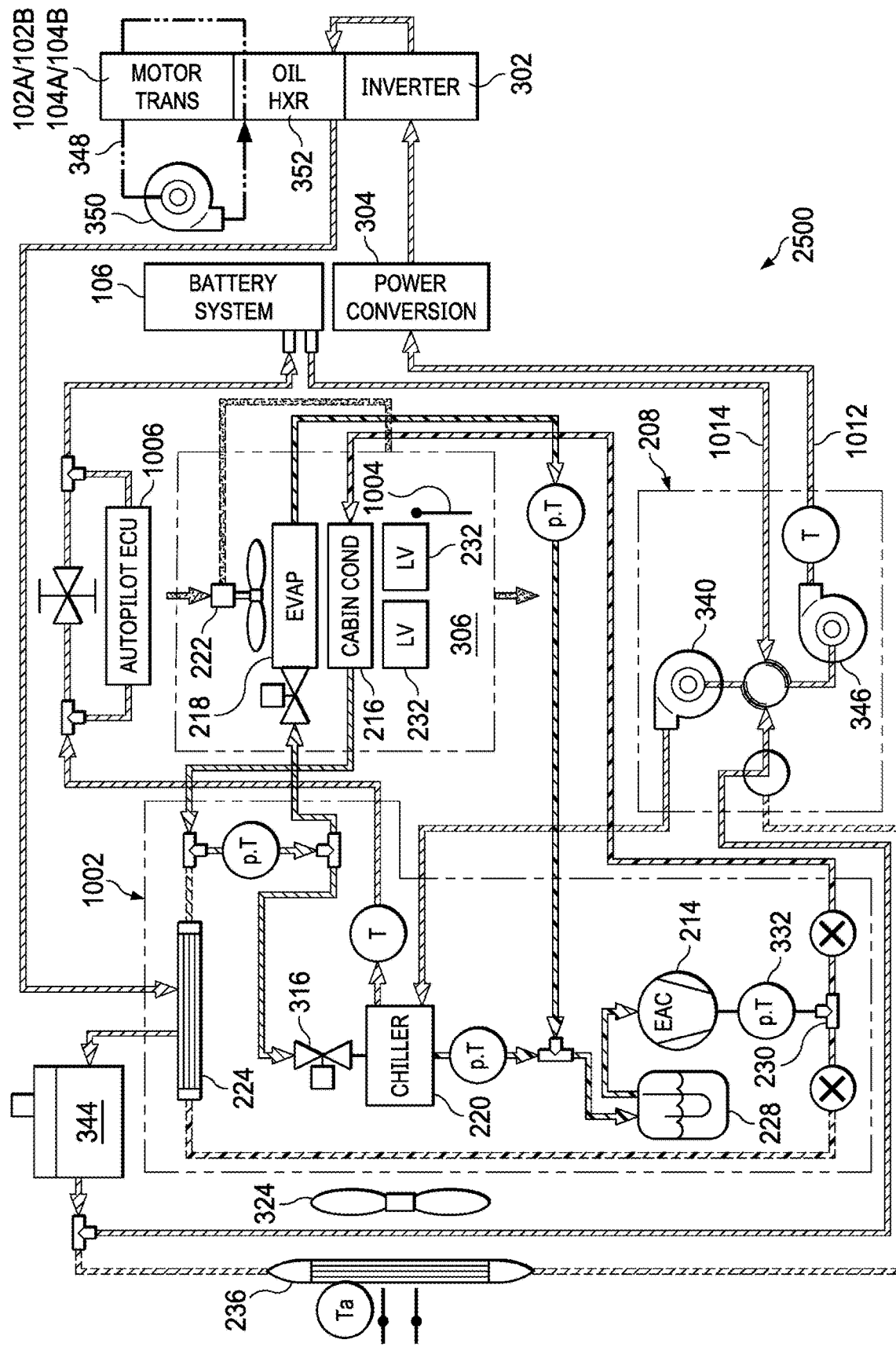
FIG. 25 is a schematic diagram illustrating the vehicle thermal management system of FIG. 10 configured in a tenth heating mode supporting cabin defogging operations.

FIG. 25 is a schematic diagram illustrating the vehicle thermal management system of FIG. 10 configured in a tenth heating mode supporting cabin defogging operations. The tenth heating mode provides an unconventional way of removing humidity from the cabin (to avoid fogging) by deliberately partially freezing the cabin evaporator 218 core. The objective is to enable global cabin recirculation mode under conditions where typically fresh mode is required. This significantly reduces the advective heat load on the cabin; instead of continuously adding cold/dry air to the cabin and then heating it, we stay in recirculation and continuously remove any new sources of humidity from a nearly sealed-off volume. The suction pressure of the cycle must be able to run low enough to get under the ambient dew-point. The battery system coolant loop chiller 220 provides net heating, acting as a source. The cabin evaporator 218 inside the cabin is also a source in the compressor 214 as a heater mode sense, and also is a humidity sink in this mode. The rest of the system runs in a similar manner as heating mode three, with the exception that the global cabin state is recirculation.

Figure 26A:
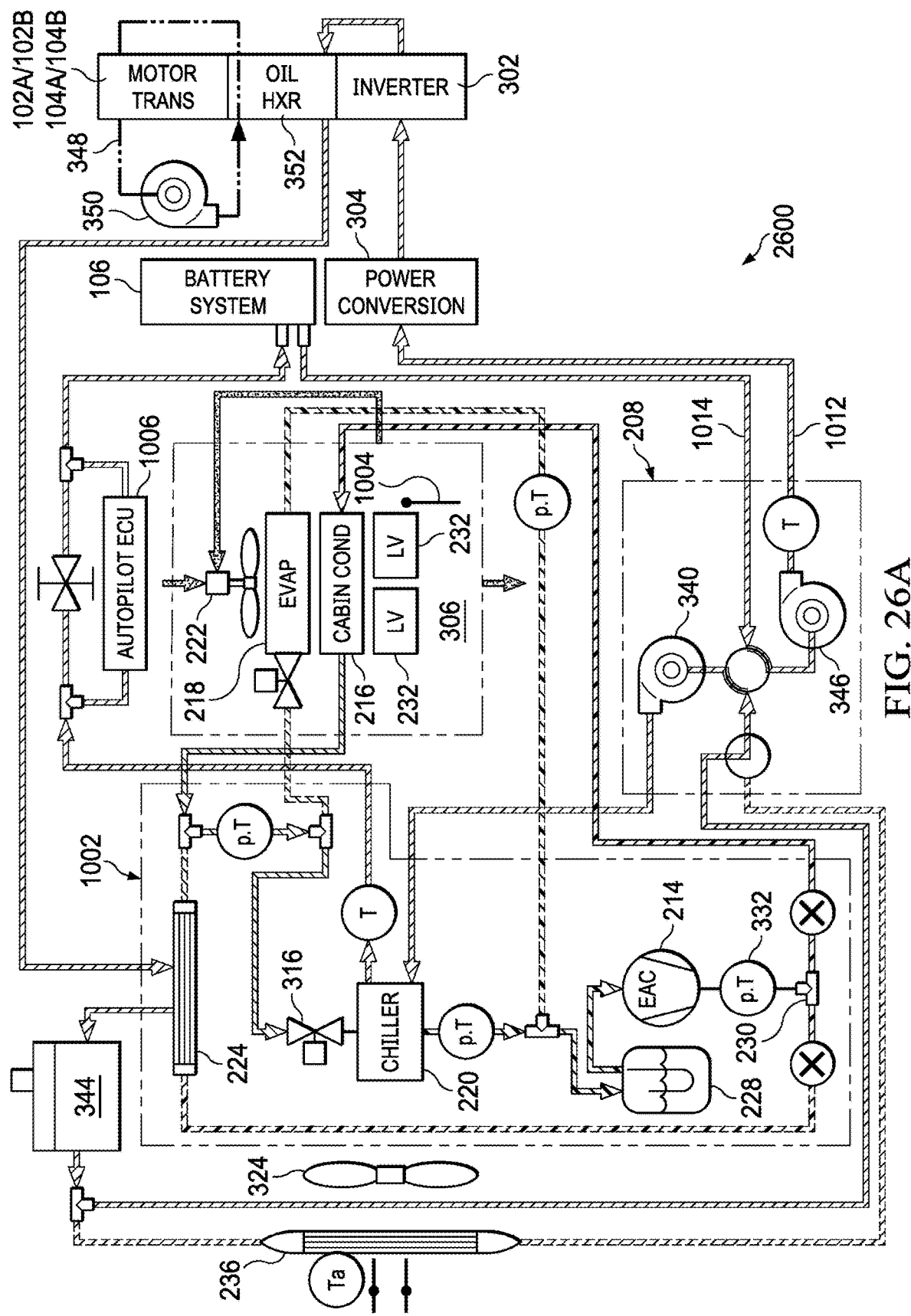
FIG. 26A is a schematic diagram illustrating the vehicle thermal management system of FIG. 10 configured in an eleventh heating mode supporting frost removal operations.

FIG. 26A is a schematic diagram illustrating the vehicle thermal management system configured in an eleventh heating mode supporting frost removal operations. The eleventh heating mode serves as a means to remove frost from the cabin evaporator 218. Frost accumulation is tolerable on a finite time-scale until the frost starts to significantly block air-flow and/or impede heat transfer/moisture removal. The internal recirculation duct 1004 could be temporarily fully opened to flood the cabin evaporator 218 with a high volume of hot air leaving the cabin condenser 216, melting the frost (which must leave the cabin as liquid and not get re-entrained into the air), and refreshing the cabin evaporator's 218 ability to remove moisture from the cabin, e.g., there is snow/ice on occupant's shoes slowly melting. The compressor 214 and cabin blower 222 operate in an inefficient state in an attempt to generate as much heat as possible and reduces the "thawing" time. The internal recirculation door pops open and regulates air-flow.

Figure 26B:
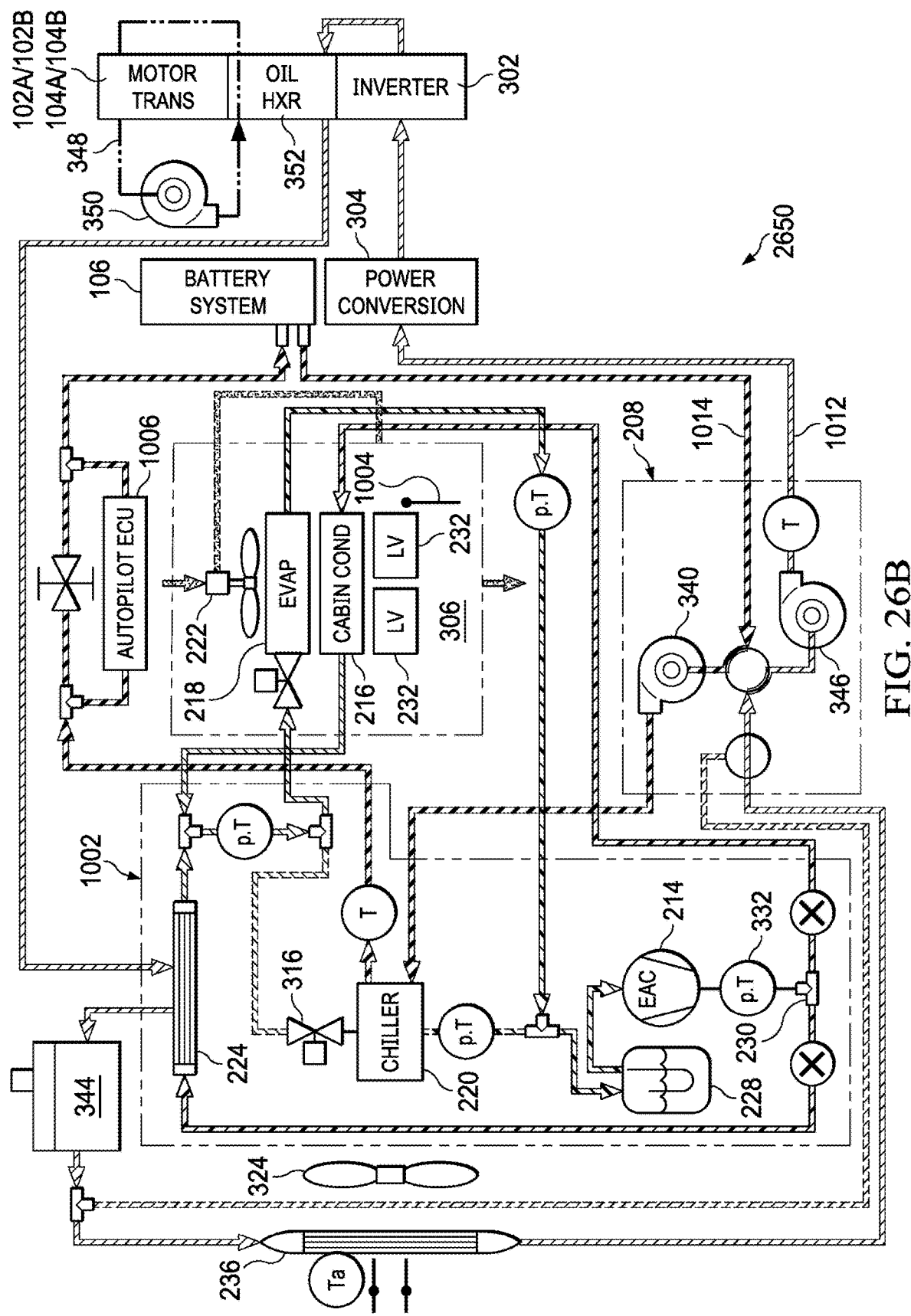
FIG. 26B is a schematic diagram illustrating the vehicle thermal management system of FIG. 10 configured in a twelfth heating mode supporting efficient dehumidification with reheat.

FIG. 26B is a schematic diagram illustrating the vehicle thermal management system of FIG. 10 configured in a twelfth heating mode supporting efficient dehumidification with reheat. The twelfth heating mode 2750 applies during warm cabin dehumidification. During cabin cooling conditions of moderate temperature/load, the incoming air must be cooled to remove humidity for comfort. However, it is often the case that the temperature required to remove humidity is too cold, and so additional energy is expended to reheat the air to a higher temperature. Since the vehicle heat pump system 202 has a cabin condenser 216 inside the cabin, the rejection available from cooling/dehumidifying the air is already available with minimal energy. This mode may have additional degrees of freedom with the internal recirculation duct 1004. The system runs in essentially a conventional AC/cooling mode, with the exception that the cabin condenser 216 is active for reheat. The refrigerant three-way valve 230 regulates the compressor 214 discharge refrigerant and provides only enough refrigerant to reach the duct target. Excess refrigerant is sent to the drive train liquid-cooled condenser 224, which is rejected through the radiator 236.

Figure 27:
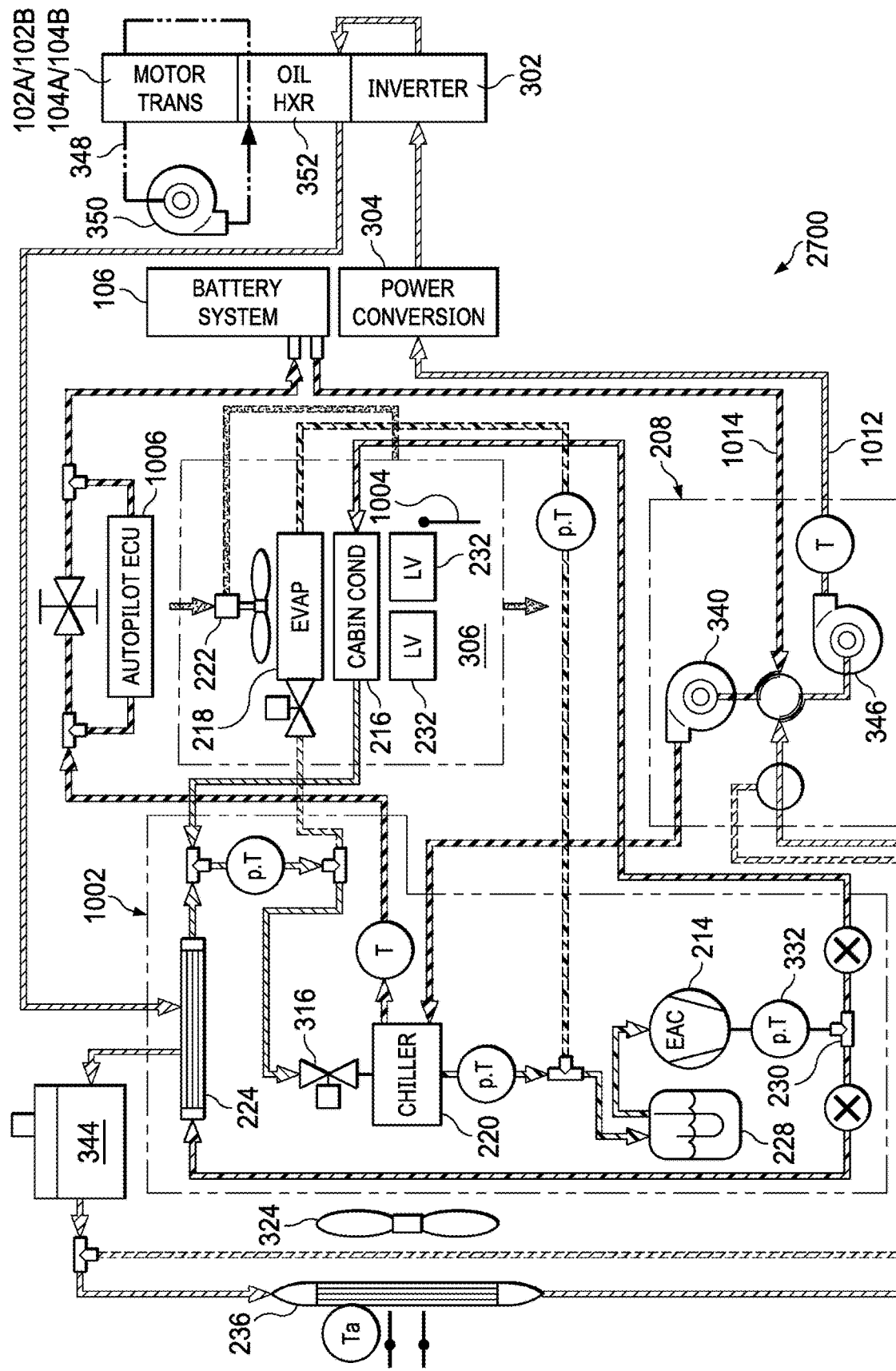
FIG. 27 is a schematic diagram illustrating the vehicle thermal management system of FIG. 10 configured in a first cooling mode assisting during supercharging operations.

FIG. 27 is a schematic diagram illustrating the vehicle thermal management system of FIG. 10 configured in a first cooling mode assisting during supercharging operations. The first cooling mode 2800 provides additional refrigeration cycle rejection capacity in order to boost peak supercharge rates. Since we have an additional cabin condenser 216 inside the cabin, and an additional air stream from the internal HVAC case recirculation door/duct 1004, we have the opportunity to offload rejection when desirable. An obvious case could be supercharging in extreme ambient conditions, e.g., 43° C. and above. The refrigeration cycle does not have sufficient rejection capability to sustain nominal peak charge rates when relying on the drive train liquid-cooled condenser 224 and radiator 236 alone. However, if there are no occupants in the cabin (or if peak charge rates are desired at all costs), then the drive train liquid-cooled condenser 224 could be used to help off-load the cabin condenser 216. The vehicle heat pump system 202 runs in the same manner as the conventional supercharge cooling mode, with the exception that the cabin condenser 216 is now active and the cabin blower 222 is running at maximum speed and with a fresh global cabin state. The 5-way valve 208 is in parallel to isolate the battery system coolant loop 204 from the rest of the coolant loop. The refrigerant 3-way valve 230 is controlled in such a way as to maximize the overall rejection capability of the refrigeration cycle. Given the outside fan speed and temperature, the cabin blower 222 speed and air-off temperature read from the cabin evaporator 218, there is an optimal valve setting that maximizes rejection. After peak supercharge has passed, the cabin blower 222 runs in fresh air mode (with the cabin condenser 216 off) to cool cabin back down to ambient.

Figure 28:
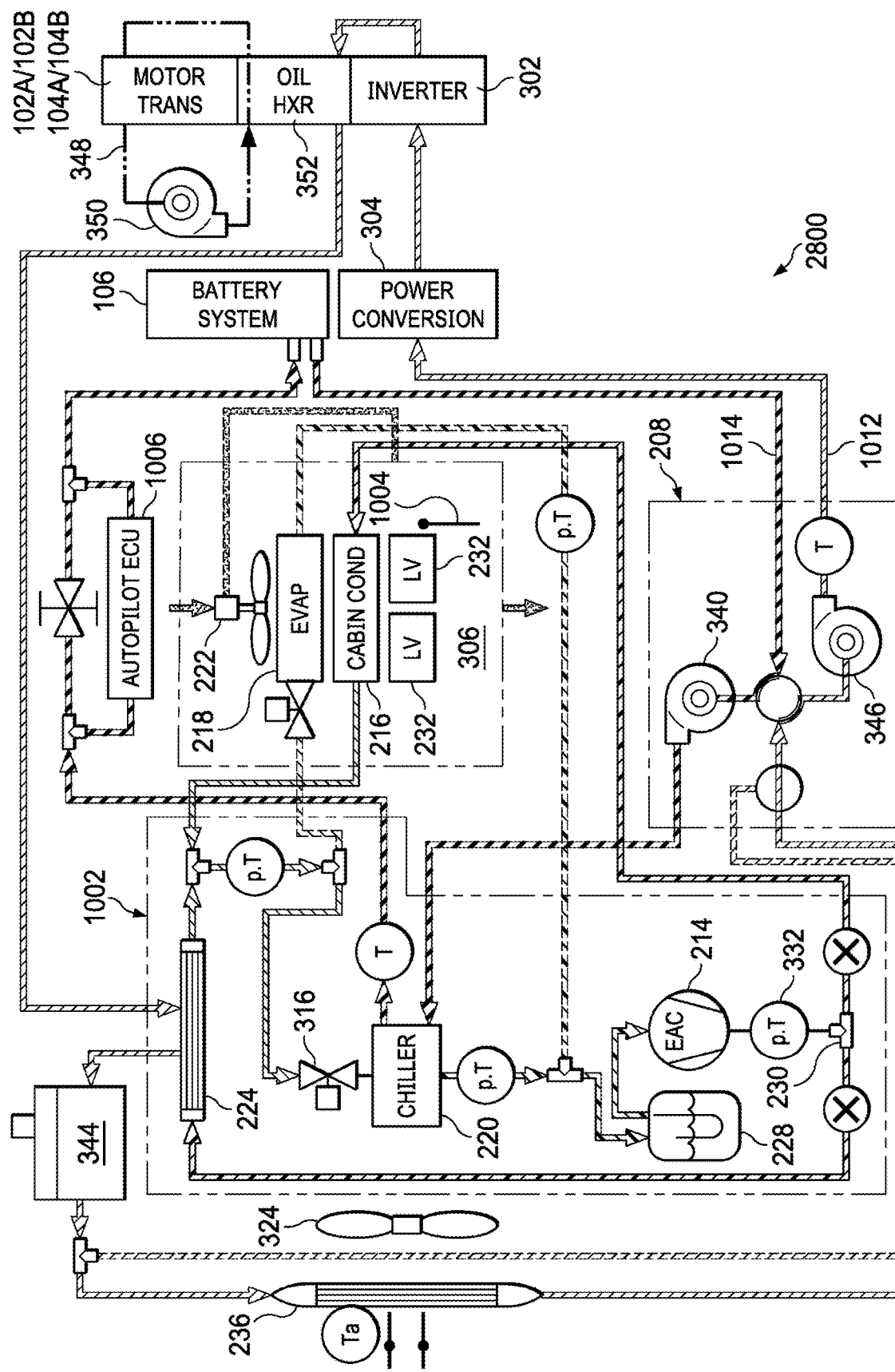
FIG. 28 is a schematic diagram illustrating the vehicle thermal management system configured in a second cooling mode providing peak powertrain performance assist.

FIG. 28 is a schematic diagram illustrating the vehicle thermal management system configured in a second cooling mode providing peak powertrain performance assist. The second cooling mode 2900 improves peak powertrain performance by using the same concepts as in the first cooling mode 2800. The cabin condenser 216 could be used to help cool powertrain components during a performance drive, e.g., Vmax, hill climbing, or at the track. The cycle state is the same as the first cooling mode, with the exception that the 5-way valve 208 may be in a blend of series and parallel, depending on which component is limiting.

Figure 29:
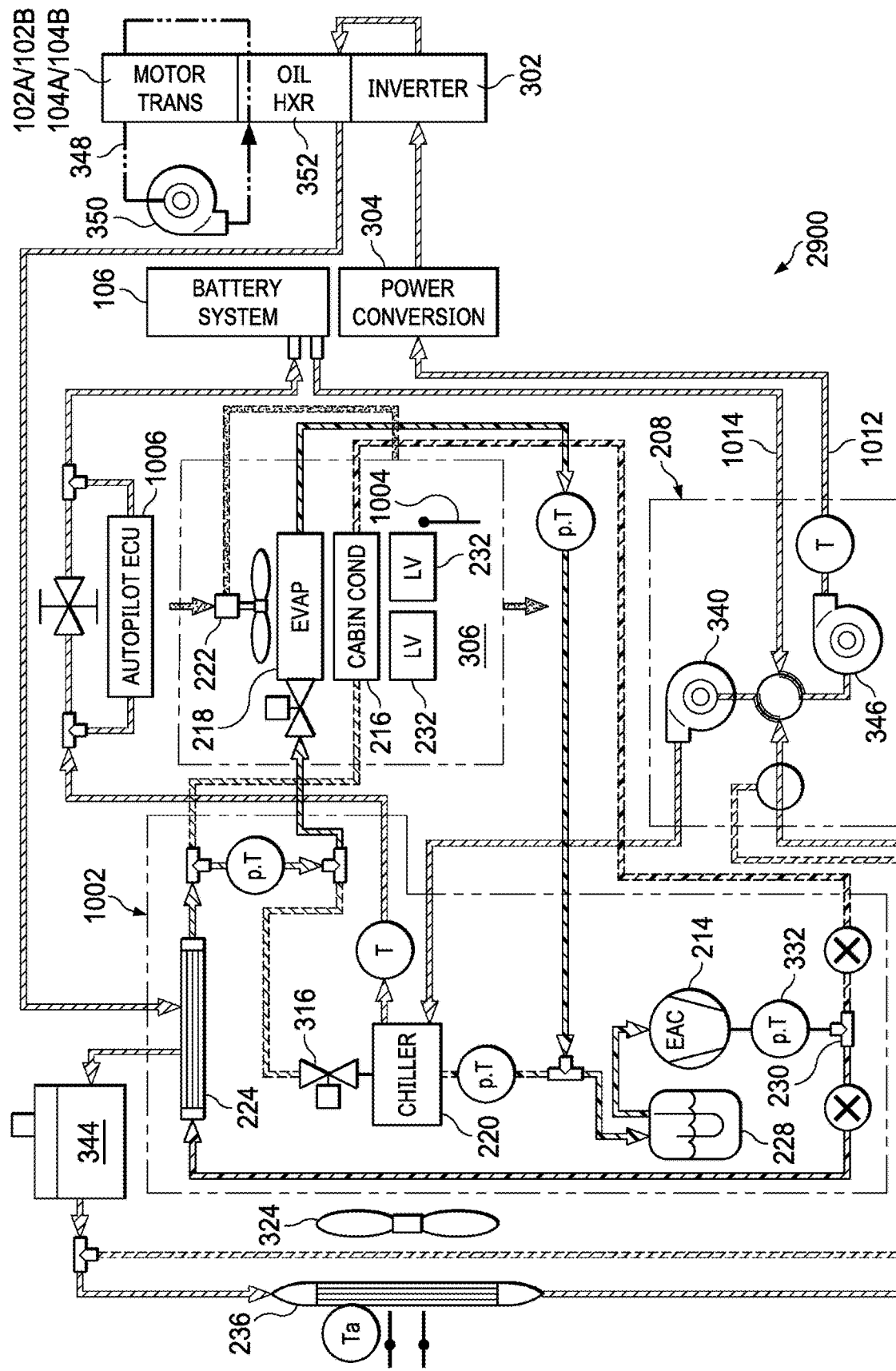
FIG. 29 is a schematic diagram illustrating the vehicle thermal management system of FIG. 10 configured in a third cooling mode to provide quieter HVAC cabin pull-down.

FIG. 29 is a schematic diagram illustrating the vehicle thermal management system of FIG. 10 configured in a third cooling mode to provide quieter HVAC cabin pull-down. The third cooling mode 3000 improves the cooling power to noise ratio during HVAC cabin pull-downs. During HVAC cabin pull-downs, e.g., cooling a cabin after a long soak in the sun on a hot day, there is typically quite a lot of noise coming from the external fan 324 and the compressor 214. The vehicle heat pump system 202 architecture provides an opportunity to use the battery system 106 as a heat sink in order to reduce external fan noise and also compressor 214 RPM/noise. Instead of rejecting all of the liquid cooled condenser 224 load to ambient, some of that load could be delivered to the battery system 106 (if sufficiently cool). This would immediately reduce the external fan 324 speed/noise, lower the discharge pressure, increase the refrigeration specific cooling power, and therefore also reduce the compressor 214 speed/noise. The cabin condenser 216 is not operational. The 3-way valve 230 routes all of the refrigerant to the drive train liquid-cooled condenser 224. The radiator 236 rejects part of the load, and the rest of the load goes to the battery system 106 via the 5-way valve 208 (series).

Figure 30:
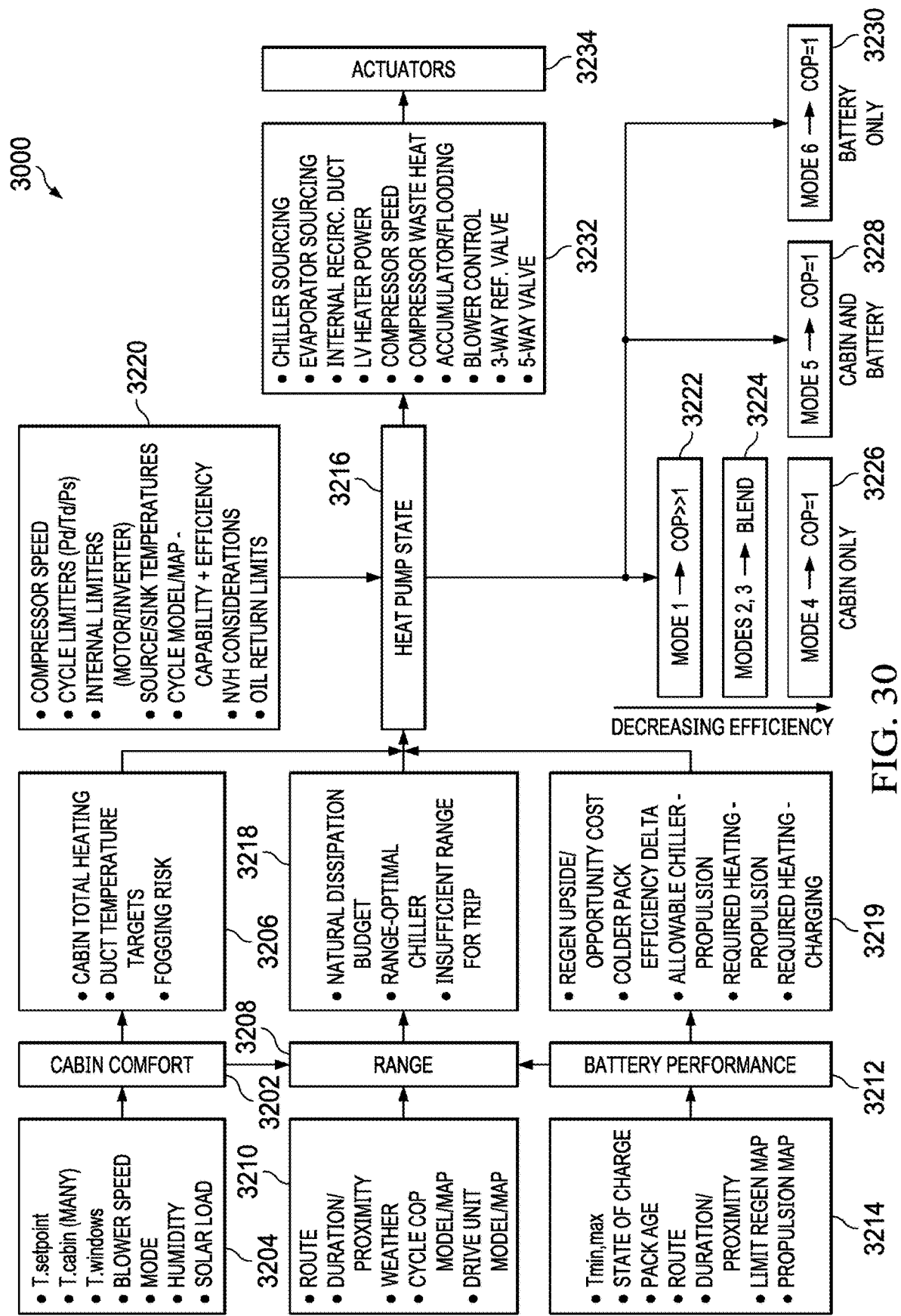
FIG. 30 is a block diagram illustrating operation of the vehicle thermal management system configured in balancing competing objectives.

FIG. 30 is a block diagram illustrating operation of the vehicle thermal management system configured in balancing competing objectives. The cabin comfort module 3202 accepts raw signals 3204 from the HVAC vehicle controller and produces a target total heating requirement at a target duct temperature 3206. The cabin comfort module 3202 also flags fogging risk, which might change how the vehicle heat pump system 202 operates. These key outputs are consumed by a range module 3208, and the vehicle heat pump system 202 state machine. The range module 3208 consumes high-level data 3210 describing the trip, cabin comfort estimates from the cabin comfort module 3202, and battery performance arguments from a battery performance module 3212. The range module 3208 attempts to quantify the optimal chiller 220/vehicle heat pump system 202 sourcing profile that balances range arguments from both the cabin and the battery system 106, and also flags when the projected range cannot meet the current trip as planned. The battery performance module 3212 consumes raw data 3214 from the battery system 106, as well as arguments describing the planned trip and establishes heating/cooling limits 3219 with respect to propulsion and future charging needs. The battery performance module 3212 also provides a means to quantify range impact with respect to regen opportunities and baseline DC resistance vs. temperature—that is, it helps determine the right amount of blending between COP>>1 and COP=1 vehicle heat pump system 202 cycle modes. Finally, the battery performance module 3212 flags if it needs heating immediately to meet the planned propulsion trip profile or if a charge is imminent.

A vehicle heat pump state module 3216 parses requirements and recommendations 3206 from the cabin comfort module 3202, input 3218 from the range module 3208, and heating/cooling limits 3219 from the battery performance module 3212. Then, the vehicle heat pump state module 3216 assesses the current state of the sources/sinks, the limitations on the refrigeration cycle itself, and the capability/efficiency of the cycle, together 3220. Based on these inputs, the vehicle heat pump state module 3216 selects a mode of operation that attempts to honor a hierarchy of requirements, namely that any firm heating requests ought to be met by trading efficiency for capacity. Cabin comfort is considered to be firm, unless range is flagged as insufficient for the trip or if NVH considerations limit compressor 214 speed (currently done during pull-downs). Battery heating flags for propulsion (e.g., cannot meet the speed/grade profile) and charging (e.g., won't be able to charge at the end of the trip) are firm. The vehicle heat pump state module 3216 will default to Mode 1 3222, and then work towards progressively more blending in Modes 2 and 3, 3224, (COP tending to 1) as the needs outstrip the means. Mode 4, 3226, is used last. If the battery system 106 also urgently requires heating, either mode 5, 3228, or mode 6, 3230, is immediately selected. The mode prescribes the general configured strategy for the hardware actuators. Overall, this control loop is executed repeatedly as the drive/trip proceeds and adapts. A physics-based, computationally efficient module (or a simpler look-up table map) forms the backbone of the feed-forward, predictive optimal control scheme. The vehicle heat pump state module 3216 also controls the various components 3232 of the system via actuators 3234.

Figure 31A:
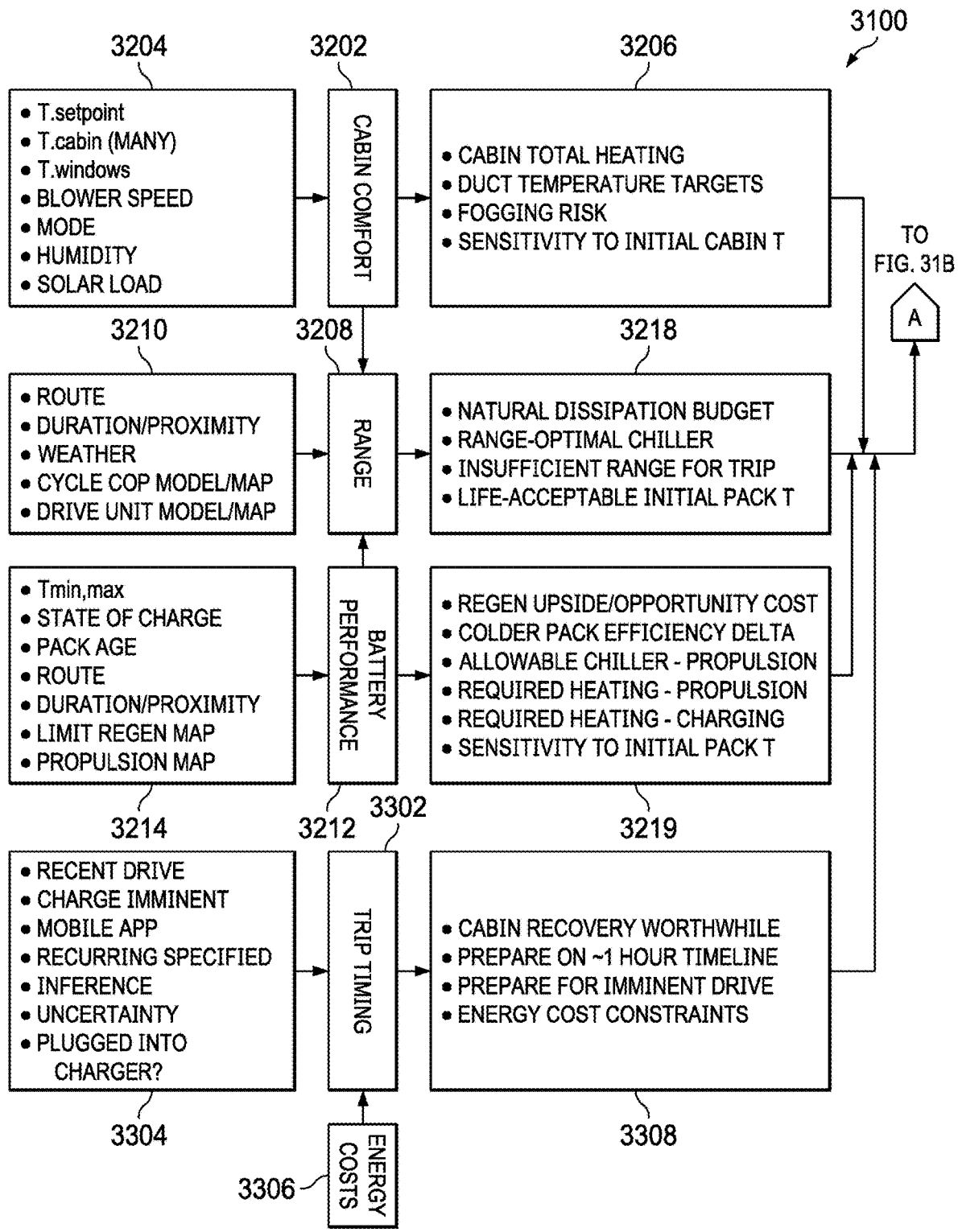
FIGS. 31A and 31B are block diagrams illustrating operation of the vehicle thermal management system configured in a preconditioning mode.
Figure 31B:
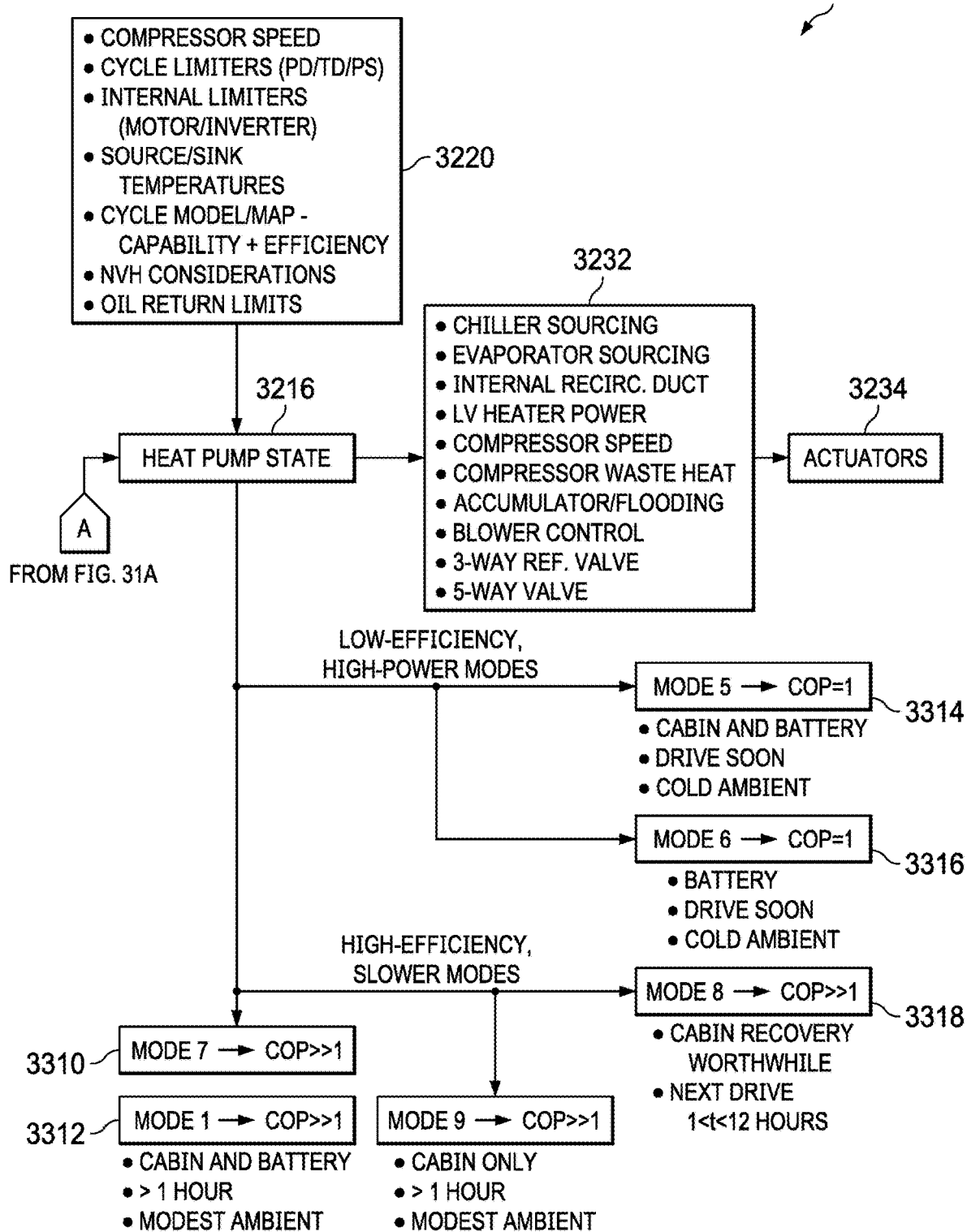

FIGS. 31A and 31B are block diagrams illustrating operation of the vehicle thermal management system configured in a preconditioning mode. FIGS. 31A and 31B will be referred to jointly herein. The Cabin comfort module 3202 works similarly as before, but now quantifies how the cabin loads might vary as the initial cabin temperature changes. Next, the battery performance module 3212 now provides a sensitivity to initial pack temperature. Finally, the range module 3208 provides an ideal initial pack temperature target based on cell-life constrains. New modules that describe the energy costs associated with preconditioning, as well as critical details pertaining to recent or future trips. The trip timing module 3302 accepts information 3304 that specifies when the next trip might occur and/or provides key objectives such as "a supercharge event is expected soon" or "there was a recent drive and the cabin is hot, it is worthwhile to attempt to recover this energy" and produces an output 3308. Energy cost preferences 3306 specified by the user serve to limit the extent of precondition; this provides an upper bound against uncertainty. Preconditioning routines can be initiated via the Tesla Mobile App, through a recurring calendar app in-vehicle, or via an adaptive inference scheme. The latter might recognize when you are at work and figure out your typical departure times (if enabled).

The vehicle heat pump state module 3216 accepts outputs from the cabin comfort module 3202, the range module 3208, the battery performance module 3212, and the trip timing module 3302 and selects an appropriate precondition mode or mode routine. There are many permutations that span the key input argument space of [cabin, cabin and battery, battery only], [Recent trip, Drive in an hour, Drive imminent], [Efficiency, Capacity]. FIGS. 31A and 31B only show a simplified sub-set of the more common configured conditions. The most useful and probably common preconditioning routine will be used when both the battery system 106 and the cabin require preheating, the ambient is modest (−10° C. or higher), and there is roughly an hour of time available before the anticipated departure. In this configuration, the vehicle heat pump system 202 executes Mode 7, 3310, first, which sources ambient air via the cabin evaporator 218, and heats the battery system 106 beyond the passive target at COP>>1. Next, the vehicle heat pump system 202 switches to Mode 1, 3312, and draws down some of the thermal energy from the pack to warm the cabin, bringing the pack close to or below the passive target, depending on how much energy is needed. Another common case could be one where a drive is imminent, the ambient is significantly colder than −10° C., and both the cabin and the battery system 106 require heating. Here, a high-power, low-efficiency mode 5, 3314, is effective, particularly when plugged into a line charger. Other modes having COP=1 include mode 6, 3316, and mode 7, 3318.

Figure 32:
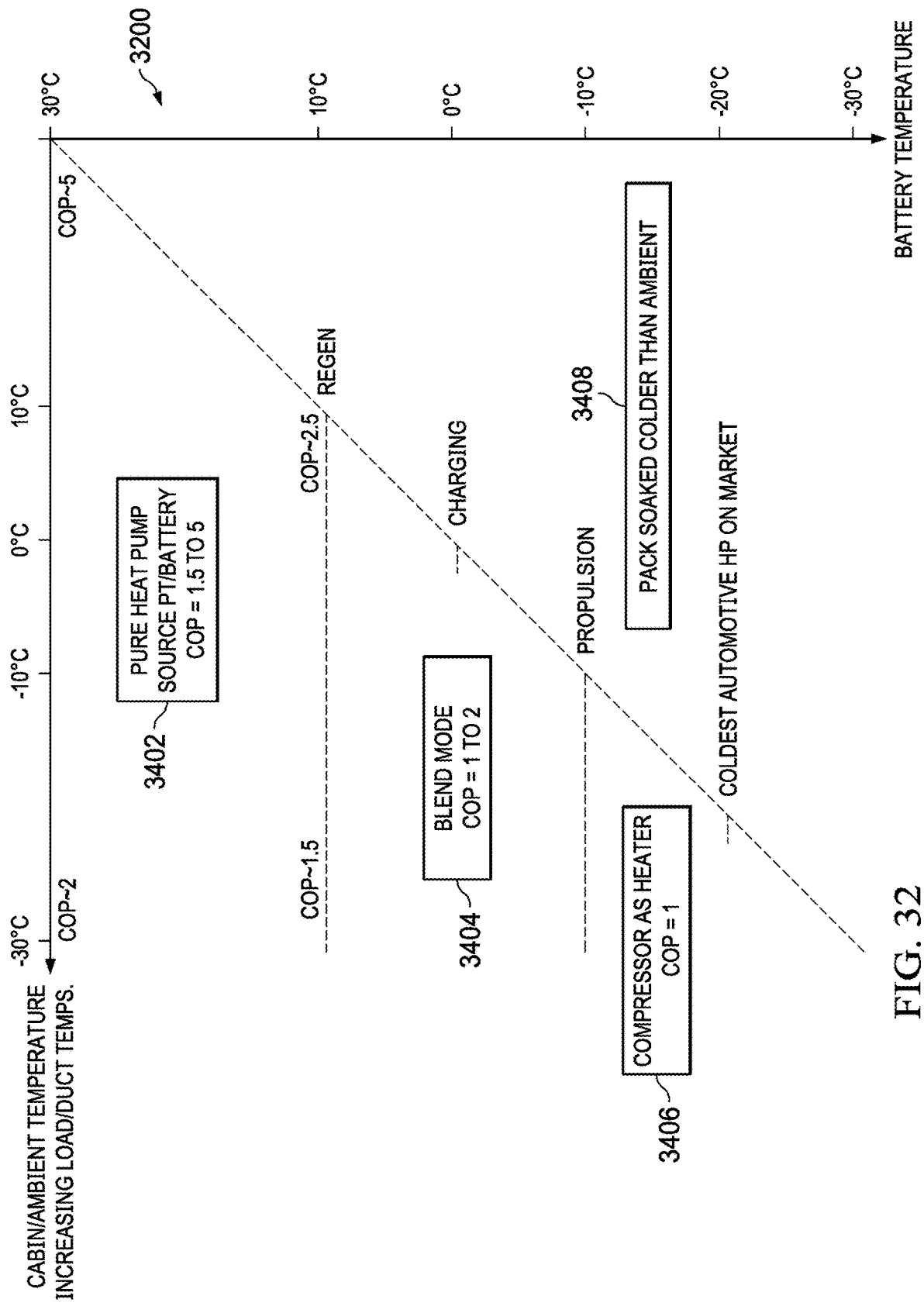
FIG. 32 is a graph illustrating operational states of the vehicle thermal management system.

FIG. 32 is a graph illustrating operational states of the vehicle thermal management system. In particular, FIG. 32 shows how the vehicle thermal management system performs as a function of both ambient temperature (horizontal axis) and battery system 106 temperature (vertical axis). FIG. 32 also illustrates some key battery temperature milestones that indicate step changes in driving experience. An operational sourcing strategy considers and optimally balances competing battery performance/efficiency/life objectives and cabin comfort requirements. The goal is to always meet cabin comfort requirements, regardless of ambient, by dynamically blending between efficiency (COP>>1) and capacity (COP=1); the latter configured state is novel and described later. A key point: by drawing from the battery system coolant loop 204 and from the drive train coolant loop 206, the system efficiently warms the cabin without having to always grapple with extremely cold ambient conditions, unlike conventional vehicle heat pump systems. Further, by drawing from within (recirculating air, coolant or refrigerant), the system provides adequate heating power, even if tending towards COP=1, in extreme ambient conditions.

When the vehicle sits for a long time in an extremely cold environment, e.g., more than 12 hours, the system is strictly bound by the limitations of ambient temperature. Therefore, the system's ability to deliver efficient, as well as high-capacity heating is less dependent on the ambient conditions. Indeed, the vehicle heat pump system 202 architecture does not have a dedicated external/ambient sourcing cabin evaporator, nor does it use reversing valves to repurpose an externally-located cabin condenser 216; unusually, it has no purpose-build external sourcing components.

The vehicle thermal management system of the present disclosure consumes information about the current state of the vehicle and thermal system, any available information from trip planner, and attempts to optimally control the cabin heating scheme by evolving the vehicle module forward in time. For a given trip, the particular trajectory of the battery system 106 temperature vs. time can be optimized knowing when the passive target will be achieved, the expected power/regen profile of the route, and if a supercharge event is likely at the end of the drive. A route with a longer duration, steady/low cabin heating needs, significant regen opportunities and relatively higher speed/battery loads would prioritize letting the battery system 106 heat up (driving experience, some range) and deprioritize efficient cabin heating at first (but still maintain adequate comfort by running in a mode closer to COP=1).

On the other hand, a shorter drive with unsteady/higher cabin heating needs, at lower average speed/powertrain dissipation, fewer regen opportunities would be better off prioritizing cabin heating; holding or even drawing down the battery system 106 temperature would likely be better because there are fewer advantages to having a warm pack, and more upside to efficiently heat the cabin. Further, the pack thermal energy can be efficiently replenished after the drive using an efficient vehicle heat pump system 202 mode. Flexibility of the vehicle heat pump system 202 configured state, a computationally-efficient in-situ module, and some expectations of the future will enable a superior overall driving experience.

Extremely cold ambient conditions are unlikely to be encountered for a majority of the miles driven. However, these cases generate the highest heating requirements, posing a severe problem for conventional vehicle heat pump systems. Adequate heating power in these cases sets the worst-case, highest-performance configured point for any heating system. The compressor 214 is the key component of any thermodynamic vapor compression cycle, e.g., a vehicle heat pump system 202. Automotive scroll compressors are inherently volumetric-limited machines; the density at the compressor inlet generally dictates the heating power of the system at a given thermodynamic configured point and compressor 214 speed. Heating the suction side increases the refrigerant saturation pressure/density and allows the compressor 214 to "breath" more refrigerant through the cycle and therefore provide heating to the cabin and battery. For example, heating R134a refrigerant from minus 30° C. to minus 20° C. increases the vapor inlet density to the compressor 214 by 48% which in turn increases the cycle flow-rate and therefore heating rate by 48%, to first order. Prior vehicle heat pump systems do not attempt to solve this problem, they retain a high-voltage heater; if the ambient or vehicle heat pump system 202 source is too cold, these systems rely on the high voltage heater to provide sufficient capacity. That is, conventional vehicle heat pump systems retain an additional HV electrical heater simply to cover the corner cases. Given that such a heater is expensive ($152) and adds more HV safety requirements for the cabin, it is desirable to remove it.

The present disclosure considers efficiency on average, e.g., −10° C. and above where the majority of miles are driven but retains capacity in the extreme by sacrificing efficiency and configured with the COP approaching an electrical heater. The characteristic range vs. temperature curve will depend on the split between natural waste heat available plus thermal energy in the battery system 106 along with the capability of the vehicle heat pump system 202. If there is insufficient natural thermal energy available, or the price of sourcing such energy is too high for the battery system 106, then the vehicle heat pump system 202 starts to blend in the use of the compressor 214 as a heater. The essential point is that the system of the present disclosure can operate in a superposition of purely electrical heating (COP=1) and efficient vehicle heat pump system 202 (COP>>1) states; these states favor electrical (COP=1) mode as the battery system coolant loop 204, cabin, and ambient all concurrently tend towards minus 30° C. It is important to emphasize that even if it is minus 30° C. outside, the battery system coolant loop 204 might have already achieved a passive target of 30° C., and therefore the vehicle heat pump system 202 can operate in an efficient mode.

The present disclosure uses low vehicle heat pump system 202 capacity in extreme ambient conditions by configuring the cycle in such a way as to isolate the suction side from extreme cold and repurpose the compressor 214 as a high-voltage electrical heater. Generally, we create a "thermodynamic short-circuit" connecting the "high-side", e.g., the hot/rejecting components of the vehicle heat pump system 202 cycle to the "low-side", e.g., the cold/sourcing components; energetically, this unlocks compressor 214 power consumption which can be routed as useful heat. The thermal link can be established by recirculating air, coolant or refrigerant; each have different pros and cons, particularly when viewed as a whole considering heating power/ramp capability, packaging/manufacturing complexity, and noise. This mode is capable of heating either the cabin via a cabin condenser 216, or the battery system 106 via a liquid-cooled cabin condenser 216 at an equivalent efficiency as an electrical heater (COP=1).

During air recirculation operations, compressor 214 input power is transferred to a closed system, the cabin, even though the compressor 214 may be physically outside of the cabin. By sourcing exclusively from a warmer than ambient source, this guarantees the vehicle heat pump system 202 access to the adequate suction conditions as the cabin warms up. The process is exponential; the temperature rise rate is proportional to the heating power which is in turn proportional to the temperature itself. During a very cold startup, even though the initial heating power is small compared to the required needs for cabin comfort, it is deposited within a nearly closed off, low thermal mass loop; heating occurs rapidly. During warm-up, the density at the inlet rises which allows the compressor 214 to process more mass flow, which adds more heat to the cabin, which further increases the rise rate. The key is to manage the cabin evaporator 218 air inlet temperature either with cheap, low voltage electrical heaters to help speed things up, or by manipulating the HVAC case/cabin blower 222 in a particular way, e.g., withholding and managing cold air exchange. Therefore, the vehicle heat pump system 202 needs to overcome only corner cases of the corner cases, where both the cabin and the battery system 106 are soaked completely to extremely cold ambient, but only for a short period of time. An additional low-voltage cabin heater 232 can provide approximately 1 kW of heating power to "spark" the startup compressor 214 as heater mode process. The suction side is somewhat linked or tied to conditions inside the cabin, and that the net heating power is always equal to the power consumed by the compressor 214. Therefore, it is desirable to be uncoupled to the cold heating target as much as possible, and for the compressor 214 power input to be as large as possible, relative to the internal (cancelling out) heating/cooling terms.

A key additional/enabling feature for the air recirculation method is an internal duct with an actuator inside of the HVAC case that can route a controlled amount of cabin condenser 216 exhaust air directly back to the cabin blower 222, bypassing the cabin. This significantly reduces thermal mass on the loop (faster warm-up), increases air-flow on the cabin evaporator 218 and cabin condenser 216 (provides more control of the cycle limits to maximize heating power), decouples the global cabin recirc/fresh mode (effective for defogging), and provides an additional control degree of freedom for blend mode. For example, at time=0, the internal door will route almost all of the air directly back to the cabin blower 222, e.g., bypassing the cabin. However, as the internal loop warms up and heating power is unlocked, the door starts to close and therefore deliver hot air to the cabin and in turn accepts cold return air from the cabin. By controlling the internal recirculation door and the cabin evaporator 218, we can operate the compressor 214 as heater mode either in pure electrical capacity mode (COP=1) or we can use it as a heating supplement alongside the chiller 220 (COP>1). Recirculating air is technically the most straightforward/lowest risk of the three methods but claims the most packaging space. Further, since the suction side is still somewhat coupled to the cabin/ambient air itself (particularly when large amounts of net fresh air are required for defog), the performance is the lowest. Air to refrigerant heat exchangers similarly impose a "suction pressure tax", e.g., they are not as good as refrigerant to coolant or refrigerant to refrigerant. Finally—the "noise metric" is similarly the worst of the recirculation methods. The noise improves with rising suction pressure and also with a larger relative share of electrical power consumption by the compressor 214 relative to the total rejection in the cabin condenser 216. Recirculating air will run the lowest suction pressure, and therefore the highest RPM for a given heat requirement.

Counter-intuitively, when configured in pure compressor 214 as heater mode (COP=1), it is often better for the compressor 214 to be less thermodynamically efficient, e.g., to operate at a lower isentropic efficiency. In very cold startup conditions, the suction side sets the heating power of the cycle, and consequently, the high-side states are usually very far from their limits, e.g., discharge pressure/temperature. Further, the internal components are generally cool (because compressor 214 load is low), e.g., the stator, rotor, inverter IGBTs and so on. If the isentropic efficiency of the compressor 214 could be adjusted dynamically, it would enable the maximum electrical power to be drawn for a given suction state by driving the cycle to simultaneous high and low-side limits, or internal compressor 214 component limits (motor stator/rotor, inverter). In other words, for a given compressor 214 inlet state, we can consume and thus deliver more heat by configured it in a less efficient (but precisely controlled) manner. This leverages the compressor 214 as a high voltage heater mode and maximizes the heating power for a given suction side state.

The present disclosure proposes to deliberately reduce the motor/inverter efficiency of the compressor 214 in an attempt to transfer even more heat to the cabin in these extreme cold startup conditions—this makes the scheme more robust in colder startup conditions. The upside/purpose stems from the initial positive feedback physics of the compressor 214 as heater mode—any additional heat early on, particularly for a small closed loop, greatly improves warm-up speed. This improvement requires the compressor 214 motor to be operated at a sub-optimal point, e.g., with poor phasing between the rotating magnetic field generated by the stator windings and the permanent magnets on the rotor. This is commonly referred to as the phase angle, and in theory any motor controller ought to be able to vary the slip angle in search of higher (or in our case lower) efficiency either by conducting "field weakening" (the generated field partially cancels out the permanent magnets, or "field strengthening" (the generated field partially enhances the permanent magnets. The IGBT's in the inverter can also be driven in such a way as to consume more power than required, up to their internal thermal limits, or more IGBTs can be added for this purpose. The motor and power electronics are directly cooled by the refrigerant flow, so any additional heat added here will end up in the cabin. A new control scheme will drive the discharge temperature to the 130° C. limit and/or the discharge pressure to the 26-bar limit, but also respect any internal component temperature limits, e.g., the rotor, stator or inverter FETs.

The baseline compressor 214 as a heater uses recirculating air changes when waste heat mode is active. In one particular example, waste heat capability provides an additional 15% heating power. Since added electrical waste power in this context essentially comes without an additional noise penalty, it's clear that waste heat also improves the noise per watt of heating power. In the limit, waste heat provides all of the heating power and the compressor 214 spins just fast enough to shuttle refrigerant around the loop, reducing the noise to nearly that of a conventional (silent) air PTC heater.

Control of the refrigerant inlet vapor quality maximizes the permissible heating power via compressor 214 waste mode. Since the refrigerant passes over the motor/inverter first before it gets to the actual scroll inlet, and since we now propose to add more thermal energy deliberately, this means we can tolerate more liquid at the global inlet, e.g., upstream of the actual scroll inlet. The accumulator 228 provides additional flooding, e.g., more than what is normally permissible, and an EXV prevents damage from excessive liquid. Lower inlet quality also increases mass flow-rate (lower vapor quality means higher density) which allows for even more waste energy to be added to the refrigerant and shifts the enthalpy burden of the cycle from the chiller 220/cabin evaporator 218 (suffering from low suction pressure) to the compressor 214 itself (now acting basically as a boiler+compressor 214). Higher inlet density/volumetric heating power for a given compressor 214 RPM also implies improved NVH for a given heat load; we can generally run slower across the heating map. In the best theoretical case, we estimate that deliberate additional flooding and perfect control can increase the electrical waste heating power of the compressor 214 by about a factor of two. That is, for the same extremely low suction pressure, we might come close to doubling our COP=1 heating power, assuming all internal compressor 214 components are within acceptable limits. The baseline compressor 214 as heater using recirculation air might improve with more aggressive waste heat mode capability. If the compressor 214 can waste enough to allow for a 0.8 global inlet vapor quality, the overall heating improves by about 50% and running at a higher suction pressure with more electrical waste heat make-up (quieter). Increasing liquid fraction has even more waste heat and therefore heating power upside.

Analogously, the HVAC case cabin blower 222, which is capable of consuming approximately 400 W, can also be deliberately run in an inefficient manner to improve heating power. Lower pressure, intake air is used to cool the motor and drive electronics. Since the value of any heat added early in the warm-up process is immense, these additional features are critical to providing adequate warm-up capacity in extremely cold-soaked cabin conditions.

Compressor as heater mode thermodynamically works when the "high side" is thermally "short circuited" to the "low-side" in a controllable way. There are two other working fluids, e.g., possible thermal connections, available; coolant and refrigerant. One clear downside of recirculating air is that it is thermally linked to the cabin (in recirc.) or the ambient (when some fresh air is required for defogging). That is, recirculating air has some significant limitations on how high the suction pressure and therefore heating power can go as the cabin warms up. For example, even if a significant fraction of hot cabin condenser 216 exhaust is recirculated back to the inlet, the cabin evaporator 218 must still operate at a suction pressure that is "below" the mixed air temperature. Even if no defog/fresh cold air is required, some air must still be allowed to leave and mix with the cabin (because this is how the cabin is heated) and cold air enters in return. Further, the cabin blower 222 must run faster to provide adequate net air-flow to the cabin—the more internal recirculation is needed, the faster the cabin blower 222 must run to hold minimum net air-flow, and therefore the more noise. Air to refrigerant heat exchangers also generate the worst suction pressure for a given temperature level—for a given allowable heat exchanger size. The packaging constraints within the HVAC case (as well as pressure drop limitations) make it difficult to overcome this limitation.

In an alternative operation, coolant is recirculated directly between the drive train liquid-cooled condenser 224 and the chiller 220. Normally, this implies an additional pump and valve, assuming the valve is managing the powertrain and battery system coolant loop 204. An alternative, more complex 8-way valve can provide a way to valve off a closed loop consisting of the drive train liquid-cooled condenser 224, the chiller 220 and a pump; this loop is thermally isolated from the battery system 106, powertrain, and has low thermal mass. The 8-way valve can be thought of (and schematically depicted) as two 4-way valves acting independently, but likely will be constituted as a single part. Therefore, the apparent schematic complexity is actually constrained to the scope of a slightly larger component.

Suction pressure is only loosely related to the loop temperature at startup, and quickly takes on a value determined by the relative loads (internal vs. net) and UA values of the heat exchangers. Most importantly, the suction pressure does not depend on the cabin temperature nor the ambient temperature and does not need to change to accommodate defog scenarios. Suction and discharge pressures settle around an equilibrium internal loop temperature that is much higher than the cabin air or ambient temperature. Since coolant to refrigerant heat exchangers perform far better than refrigerant or coolant to air, this means the suction pressure will be rather high very early on in the warm-up process. Essentially, recirculating coolant establishes an independent, walled off thermal zone where the refrigeration loop configured in compressor 214 as heater mode can rapidly reach high power and then release net heating power to the cabin/battery as required.

Another way to "short circuit" the high side to the low side is to implement an additional connection from the compressor 214 outlet to the EXV outlet of the chiller 220 and therefore recirculate refrigerant. The recirculating path could be an additional AC valve, but ideally will be integrated into the super manifold heat exchanger assembly directly. The idea is to send a precise amount of hot, high-pressure refrigerant leaving the compressor 214 and mix it with cold, low-pressure refrigerant before it enters the chiller 220. Since the compressor 214 outlet has a low Joule-Thompson coefficient, it acts similarly to an ideal gas and therefore does not significantly cool upon expansion prior to mixing. If the mixing is energetically balanced, the outlet state is all vapor/warm and ready for compression. The suction pressure is not dependent on any external temperature (besides initial conditions) and the thermal mass is very low, and therefore ought to warm up rapidly. This connection requires a valve in order to control the recirculation power. An advantage of this method is that there is actually no low-side cooling occurring—mixing hot/cold refrigerant directly is thermally equivalent to extremely high performing heat exchangers in the other recirculating methods. Therefore, this scheme allows for a relatively high and arbitrary suction pressures. The recirculation valve allows for optimization of total power; some of the power comes from waste mode (electrical in nature) and some comes from the mechanical compression power. Closing off the valve will result in a lower suction pressure, higher RPM, and higher mechanical power. But if waste heat capability is relatively high, the valve can be more open and raise the suction pressure, reducing the RPM, mechanical power and therefore noise. Heating power and noise change as the suction pressure increases and more waste heat is available from the motor/inverter. Another potential benefit—oil return might be enhanced because more oil bypasses the external components after leaving the compressor 214 and flows right back to the inlet. Also, since it is warm, it may help move cold oil sitting in the low-side components.

An extreme version of compressor 214 waste heat mode is to use the motor/inverter as a high-power refrigerant boiler, e.g., the global scroll inlet is mostly liquid. If the waste heat capability is strong enough, compressor 214 as boiler mode can enable a relatively high suction pressure even when the cabin evaporator 218/cabin condenser 216 is exposed to very cold fresh air-flow. That is, it can operate in a manner that is agnostic to cabin, battery or powertrain temperature. Therefore, this concept removes the need to recirculate energy from the high to the low side when configured in compressor 214 as heater mode; it is simpler from a BOM/packaging perspective. Further, since a very high fraction of the total heating provided comes from an electrical source, compressor 214 as boiler mode will be the quietest. In the limit, waste heat takes up nearly all of the heat load and the compressor 214 mainly serves to shuttle refrigerant around the loop—this is approaching essentially a PTC heater in terms of noise. Noise and heating power per RPM change as waste heat capability improves.

This concept requires extremely high losses relative to the nominal max power of the motor/inverter. Therefore, adequate thermal management of internal components (stator, back-iron, rotor, and inverter) is critical. Further, it's highly likely the inverter will need to be upgraded in order to supply more phase current. High phase-current requirements, limits on flux density, and internal conduction resistance all need to be considered from a cost and reliability perspective—and it's likely that the overall motor inverter requires a fundamentally different design. High liquid content at the scroll global inlet poses many controls and reliability challenges. A control scheme must be robust enough to protect the true scroll inlet from excessive liquid injection—if there is a transient imbalance between heating and refrigerant flow-rate, excessive liquid could immediately destroy the compressor 214. One idea is to move the accumulator 228 between the true scroll inlet and the motor inverter, providing a passive buffer against excessive liquid ingestion. It's also possible that higher liquid content at the global scroll inlet could wash away critical oil films and cause lubrication issues.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A vehicle thermal management system configured for inclusion in a vehicle, the vehicle thermal management system comprising:
    a vehicle heat pump comprising a cabin cooling system and a radiator;
    a coolant valve system configured to operate in a plurality of modes, wherein each mode is associated with one or more coolant loops, and wherein each coolant loop connects a different subset of the cabin cooling system, the radiator, a battery coolant loop, and a drive train coolant loop; and
    control electronics configured to select between the plurality of modes, wherein selection of a mode causes adjustments of serial and/or parallel connections between individual coolant loops associated with the selected mode.

2. The vehicle thermal management system of claim 1, wherein the coolant valve system is an eight-way valve.

3. The vehicle thermal management system of claim 1, wherein the control electronics are configured to select between the plurality of modes based on inputs comprising one or more of range information, heating and/or cooling limits associated with a battery, and a temperature associated with a cabin of the vehicle.

4. The vehicle thermal management system of claim 1, wherein the cabin cooling system comprises a compressor, a cabin condenser, a cabin evaporator, and a cabin blower.

5. The vehicle thermal management system of claim 1, wherein a first mode is associated with a particular coolant loop which connects the battery system coolant loop and the drive train coolant loop, such that the battery system coolant loop and the drive train coolant loop are serially connected.

6. The vehicle thermal management system of claim 5, wherein the cabin cooling system is connected to the particular coolant loop, and wherein heat from the particular coolant loop is used to heat a cabin of the vehicle.

7. The vehicle thermal management system of claim 5, wherein the vehicle heat pump draws heat from the particular coolant loop.

8. The vehicle thermal management system of claim 1, wherein a second mode is associated with two coolant loops operating in parallel, the two coolant loops comprising the battery system coolant loop and the drive train coolant loop.

9. The vehicle thermal management system of claim 1, wherein the cabin cooling system comprises a cabin heater, wherein a third mode is associated with a particular coolant loop which connects the battery system coolant loop and the drive train coolant loop, and wherein the vehicle heat pump draws heat from the particular coolant loop and the cabin heater.

10. The vehicle thermal management system of claim 9, wherein the third mode is configured for selection based on a cabin heating request exceeding that which is available via the particular coolant loop or based on a battery of the vehicle being required to heat within a threshold amount of time.

11. The vehicle thermal management system of claim 1, wherein a third mode is associated with a particular coolant loop which connects the battery system coolant loop and the drive train coolant loop, wherein the vehicle heat pump draws heat from the particular coolant loop, the cabin heater, and the cabin cooling system operating in an internally recirculating mode.

12. The vehicle thermal management system of claim 1, wherein the cabin cooling system comprises a cabin heater, a cabin evaporator, and a cabin compressor,
    wherein a third mode is associated with a particular coolant loop which connects the battery system coolant loop and the drive train coolant loop, wherein the vehicle heat pump draws heat from the particular coolant loop, the cabin heater, and the cabin compressor,
    and wherein the cabin evaporator is operated to consume power associated with the cabin compressor.

13. The vehicle thermal management system of claim 1, wherein a fourth mode is associated with a particular coolant loop which connects the battery system coolant loop and the cabin cooling system, and wherein the vehicle heat pump provides heat to the battery system coolant loop which is usable to heat a battery of the vehicle.

14. The vehicle thermal management system of claim 13, wherein heat from ambient is sourced via a cabin evaporator included in the cabin cooling system.

15. The vehicle thermal management system of claim 13, wherein a cabin of the vehicle is placed in a global recirculation mode, such that heat is sealed in the cabin while the vehicle heat pump provides heat to the battery.

16. The vehicle thermal management system of claim 1, wherein the cabin cooling system comprises a compressor, wherein a fifth mode is associated with a first coolant loop and a second coolant loop, wherein the first coolant loop causes heat to be drawn from ambient and from the compressor operated in an inefficient mode, and wherein the second coolant loop connects the battery system coolant loop and drive train coolant loop.

17. The vehicle thermal management system of claim 1, wherein the radiator is usable to extract heat from ambient.

18. The vehicle thermal management system of claim 1, wherein the control electronics are configured to select between the plurality of modes based on information from a controller associated with the cabin cooling system, a measure associated with fogging in a cabin of the vehicle, and range information associated with the vehicle.

19. The vehicle thermal management system of claim 1, wherein the control electronics are further configured to use information indicating an upcoming charging event.

20. A method implemented by a vehicle thermal management system comprising control electronics, the vehicle thermal management system being configured for inclusion in a vehicle, wherein the method comprises:
    obtaining input information from a controller associated with a cabin cooling system, a measure associated with fogging in a cabin of the vehicle, and range information associated with the vehicle; and
    selecting between a plurality of modes based on the input information, wherein the vehicle thermal management system further comprises:
        a vehicle heat pump comprising the cabin cooling system and a radiator, and a coolant valve system configured to operate in the plurality of modes, wherein each mode is associated with one or more coolant loops, wherein each coolant loop connects a different subset of the cabin cooling system, the radiator, a battery coolant loop, and a drive train coolant loop, and wherein selection of a mode causes adjustments of serial and/or parallel connections between individual coolant loops associated with the selected mode.

\* \* \* \* \*